(12) United States Patent
Wehner et al.

(10) Patent No.: US 7,741,390 B2
(45) Date of Patent: Jun. 22, 2010

(54) COORDINATION-POLYMERIC TRIETHANOLAMINEPERCHLORATO (TRIFLATO)METAL INNER COMPLEXES AS ADDITIVES FOR SYNTHETIC POLYMERS

(75) Inventors: Wolfgang Wehner, Zwingenberg (DE); Trupti Dave, Zwingenberg (DE); Thomas Wannemacher, Taufkirchen (DE)

(73) Assignee: Artemis Research GmbH & Co. KG, Augsburg (DE)

( * ) Notice: Subject to any disclaimer, the term of this patent is extended or adjusted under 35 U.S.C. 154(b) by 0 days.

(21) Appl. No.: 11/964,671

(22) Filed: Dec. 26, 2007

(65) Prior Publication Data

US 2009/0131564 A1 May 21, 2009

(51) Int. Cl.
*C08K 5/34* (2006.01)
*C08G 73/02* (2006.01)

(52) U.S. Cl. ...................................... 524/100; 525/185
(58) Field of Classification Search .................. 524/100
See application file for complete search history.

(56) References Cited

U.S. PATENT DOCUMENTS 5,204,473 A * 4/1993 Winter et al. ............... 546/188
2004/0204522 A1* 10/2004 Austen et al. .................. 524/99
2005/0095420 A1* 5/2005 Berni et al. .................. 428/323

OTHER PUBLICATIONS

Naiini et al., Inorg. Chem., 1994, 33 (10), 2137-2141.*

* cited by examiner

*Primary Examiner*—Ling-Siu Choi
*Assistant Examiner*—Hui Chin
(74) *Attorney, Agent, or Firm*—Muncy, Geissler, Olds & Lowe, PLLC

(57) ABSTRACT

Stabilizer system for chlorinated polymers, especially PVC, comprising at least one coordination-polymeric triethanolamineperchlorato(triflato)metal inner complex comprising the monomer unit of the formula (A)

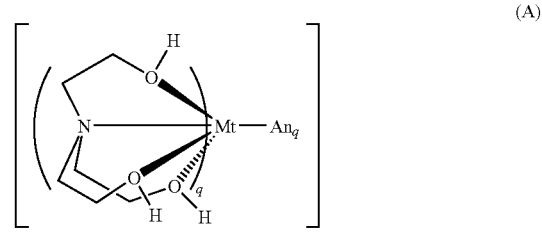

(A)

The stabilizer system may additionally comprise substituted cyanoacetylureas or/and 6-aminouracils or/and 3-aminocrotonic esters or/and hydantoins or/and monomeric or polymeric dihydropyridines or alkaline earth metal hydroxides or/and hydrotalcites or/and dawsonites or/and zeolites or/and glycidyl compounds or/and cyanamides or/and cyanoguanidines or/and melamines. In addition, phosphites or/and sterically hindered amines or/and NOR-HALS compounds may be present.

31 Claims, 1 Drawing Sheet

COORDINATION-POLYMERIC TRIETHANOLAMINEPERCHLORATO(TRIFLATO)METAL INNER COMPLEXES AS ADDITIVES FOR SYNTHETIC POLYMERS

The present invention relates to compositions composed of synthetic polymers and coordination-polymeric triethanolamineperchlorato(triflato)metal inner complexes, and to stabilizer systems comprising the inner complexes. The invention further relates to selected inner complexes and to their preparation.

It is known that halogenated plastics or moulding materials produced therefrom lead to degradation or decomposition reactions when they are exposed to thermal stress or come into contact with high-energy radiation, for example ultraviolet light.

To stabilize PVC, for example, before processing, heavy metal stabilizers based on Cd, Pb, Sn and Zn or toxicologically less dangerous metals such as barium have been used to date in industry. In these cases, the already harmful effect—with regard to improved absorbability and compatibility in warm-blooded organisms—is additionally increased by conversion to organic metal compounds based on fatty acids, e.g. laurates, stearates and oleates, or by virtue of transformation to organo derivatives (organometallic compounds or metal organyls), especially in the case of tin. Specifically in the latter case, the alkylation of the metal to form a metal-carbon bond which is hydrolysis-stable even under metabolic conditions provides a gastric juice-resistant system which is capable of overcoming the blood-brain barrier in order to develop a possibly neurotoxic potential.

These problems affect not only the users of finished PVC articles but also their manufacturers, which incorporate such heavy metal stabilizers in the PVC substrate. Also affected are the producers of these stabilizers themselves, which convert heavy metal precursors to precisely these stabilizers.

In addition to the toxic effect on warm-blooded organisms, these metals and their (organic) compounds or organo compounds have "ecotoxic action", i.e. a harmful effect on fish, crabs and other seawater and freshwater organisms; see "List of Priority Hazardous Substances" agreed at the Third North Sea Conference (The Hague, March 1990). This list includes zinc as well as lead, cadmium, arsenic and mercury. See also Guideline 2000/60/EC (Determination of the List of Priority Substances in the Field of Water Policy—last update November 2001) and the "Progress Report" of the Fifth North Sea Conference (Bergen, March 2002), which states that, among others, the objective values for zinc were not met. In addition, in the sewage sludge directive of the German Federal Environment Office (BGB1. I p. 1492, last update 25 Apr. 2002), maximum amounts for heavy metals, specifically Pb, Cd, Cr, Cu, Ni, Hg and Zn, are fixed. It is also possible for inorganic heavy metal salts, through the mechanism of biomethylation present in nature, to be converted to highly neurotoxic compounds. What should be contemplated here are especially trimethyllead and trimethyltin compounds. Organic stabilizers based on the elements C, H, N, O are converted in refuse incineration to $CO_2$, $H_2O$ and ammonium compounds, all of which are biocompatible. Heavy metal compounds, in contrast, are not degraded, and are thus persistent and therefore bioaccumulate.

The substitution of heavy metal stabilizers by organic compounds should therefore be an important contribution to achieving this aim. In the UK and Denmark, the use of Pb stabilizers in PVC drinking water pipes was banned at the end of 2002 and 2003 respectively. In Denmark, this ban is additionally combined with the requirement not to use Sn stabilizers instead of PB stabilizers. Other countries such as Sweden, Norway and Finland wish to follow this ban. An EU-wide lead ban is currently being negotiated in the competent authorities.

There is thus a need for organic ("green") stabilizers which are free of heavy metals/heavy metal compounds or other toxicologically unsafe metals/metal compounds, and are especially free of lead, tin and barium.

Alkali metal or alkaline earth metal perchlorate salts in the presence of metal soaps are costabilizers for flexible PVC which have been known for some time, especially in the motor vehicle sector, and this additive is intended to retard PVC discoloration in backmoulded PU injection mouldings (JP 59184240, JP 6219732, JP 03097748, U.S. Pat. No. 4,957,954, EP 273766 A, JP 03126745).

Later, it was found that the addition of inorganic perchlorate salts leads to an improvement in the efficacy of organically stabilized (heavy metal-free=Zn- and Pb-free) rigid PVC (EP 768336 A2).

A further inorganic perchlorate salt-containing stabilizer is likewise known from Japan. This is an anion-modified hydrotalcite. It is likewise used principally in flexible PVC (EP 522810 A2).

Recently, two applications which describe the replacement of inorganic perchlorate salts by onium salts, specifically ammonium perchlorate salts, have been published (DE 10160662 A1, DE 10214152 A1). Two further applications for uses in the PVC sector likewise come from Japan; they comprise, inter alia, compounds including triethanolammonium (TEA) perchlorate (JP 61009451) or trialkylethanolammonium perchlorate surfactants (JP 1090242), which can find use as antistats. In addition, there exists another larger group of Japanese patents which claim tetraalkylammonium perchlorate surfactants as antistatic components in PVC. Also worthy of mention in this connection are DE 2540655A and the publication by S. Riethmayer in Gummi, Asbest, Kunststoffe (GAK), [4], 298-308 (1973).

A further modification (on an inorganic basis) of alkali metal perchlorate salts is accomplished by addition of calcium hydroxide (DE 10124734 A1). This dry mixture is obtained by an "in situ" process from aqueous perchlorate salt solution and burnt lime.

It is also known that melamine and hydantoin can be blended with perchlorate salts and these mixtures can be used as PVC thermal stabilizers (JP 53016750). However, the examples cited there usually use large amounts of plasticizer or immensely high proportions of calcium stearate and/or large amounts of inorganic fillers. For the stabilization of rigid PVC, though, these systems are unsuitable.

Moreover, it is known that primary alkanolamines can be complexed with zinc glutamate or sulphate. Also described in EP 394547 A2 are stabilizer systems for PVC which include liquid alkali metal or alkaline earth metal perchlorate complexes with polyols as components. N-containing polyols as complex ligands and complexes in solid form are not claimed. It is also known that alkanolamines can be used together with perchlorate salts as PVC thermal stabilizers (WO 02/48249). Solid solutions or complexes or even inner complexes are not described there. In addition, solutions of metal perchlorate salts in glycols or glycol ethers as stabilizer constituents are claimed (WO 94/24200). In addition, absorbates of alkali metal or alkaline earth metal perchlorates on zeolites or calcium silicate have been described many times before in patents, such as in EP 768336 A2 and U.S. Pat. No. 5,034,443, and also in U.S. Pat. No. 5,225,108. However, these are mentioned specifically as stabilizer components in EP 1404756 A1.

All of these publications are characterized by further numerous disadvantages:
1. Virtually all inorganic perchlorate salts melt at above 250° C., usually above 300° C., and decompose as they do so. They are therefore difficult to disperse homogeneously in the polymer substrate and difficult to digest. Moreover, owing to their granularity, they often form spots and inclusions in the finished moulded article. Fine grinding of the perchlorate salts, which might provide a remedy, is technologically difficult to carry out.
2. Inorganic perchlorate salts are in most cases hygroscopic and cake or agglomerate in the course of storage. This is shown by the fact that magnesium perchlorate is even used as a desiccant.
3. Inorganic perchlorate salts on supports, such as calcium silicate or zeolites, are not usable universally. Transparent rigid PVC products cannot be produced with these additives.
4. Aqueous solutions or solutions of these salts in an organic solvent can be used in principle, but, firstly, water in the stabilizer system leads to incompatibility and interreaction in the polymer, and to bubble formation. Secondly, addition of organic solvents in rigid PVC leads to a lowering of the Vicat value (80° C.), and to volatile organic vapours in the course of extrusion and calendering (VOC problems).
5. Particular organic perchlorate salts, specifically primary, secondary and tertiary amine perchlorates are dangerous to handle owing to their tendency to decompose spontaneously as NH perchlorates, and ammonium perchlorate, as the last member in this series, is even used as a rocket fuel component. Moreover, amine perchlorates are not optimal in relation to their melting points. Quaternary ammonium perchlorates have not been described before as thermal stabilizers for PVC, but have only a modest performance as such stabilizers.
6. The amines on which the amine perchlorates are based generally have a highly degrading effect in PVC (e.g. nicotinic esters, formamide and trioctylamine).

Quaternary ammonium perchlorates which have been proposed as PVC antistats and whose thermally stabilizing action in PVC is mentioned should be treated with scepticism, since it has been found that precisely this compound class has thermally degrading action in PVC.

It is therefore an object of the present invention to provide compositions and stabilizer systems which alleviate the disadvantages of the prior art at least partly.

The object is achieved by a composition comprising at least one synthetic polymer and at least one coordination-polymeric triethanolamineperchlorato(triflato)metal inner complex comprising the monomer unit of the formula (A):

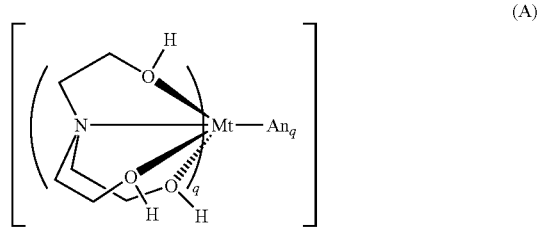

where
Mt=Li, Na, K, Mg, Ca, Sr, Ba and Zn;
An=OClO$_3$ or OS(O$_2$)CF$_3$;
q=1 or 2.

Furthermore, the object is achieved by a stabilizer system for synthetic polymers, comprising a coordination-polymeric triethanolamineperchlorato(triflato)metal inner complex comprising the monomer unit of the formula (A):

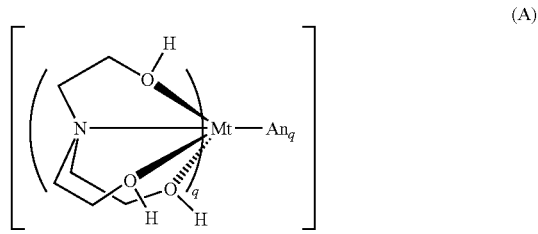

where
Mt=Li, Na, K, Mg, Ca, Sr, Ba and Zn;
An=OClO$_3$ or OS(O$_2$)CF$_3$;
q=1 or 2.

Figure 1A:
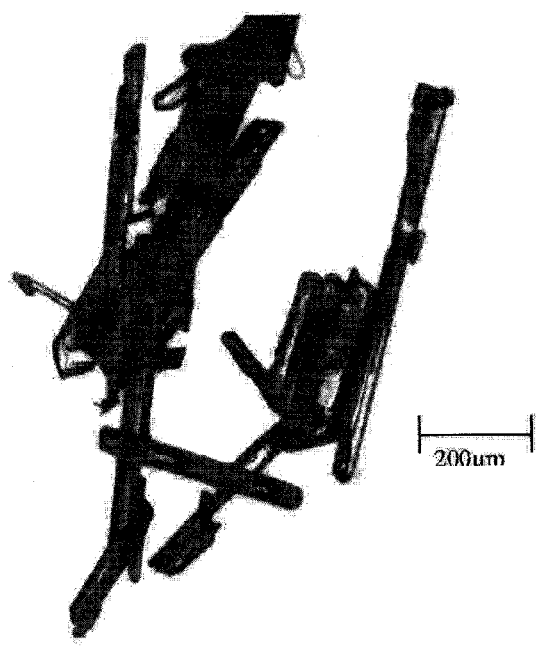
FIG. 1a is a micrograph of a TEAP crystal at a first scale.

It has been found that the inventive inner complexes (A) do not have at least some of the disadvantages outlined in points 1-6. For instance, the novel compounds often exhibit a sharp m.p., and usually also melt at a lower temperature and without decomposition. The melting points are higher than 80° C. but usually below 200° C., i.e. they have no adverse effect on the Vicat (80° C.) value of the finished moulding and melt homogeneously at the processing temperatures, which prevents spot formation and solid particle inclusion. It is thus possible to produce transparent PVC articles. Homogeneous product distribution is ensured in the course of hot mixing. The powder blends are not tacky owing to the lack of hygroscopicity, do not cake, do not agglomerate and are free-flowing. The products can be stored under air without loss of quality. The solids do not have any sharp-edged crystals, i.e. do not have an abrasive effect in the course of processing. The incorporation into a stable cage structure (metallatrane cage or aza cage) phlegmatizes the perchlorate group.

The thermally stabilizing action of these inner complexes, particularly in the form of two-substance and three-substance combinations with initial colour improvers (ICIs) and hydrogen chloride scavengers (SCVs) is enhanced significantly compared to that mentioned in the prior art (PA). These product properties were surprising. Perchlorato-TEA inner complexes (TEA=triethanolamine) of lithium, sodium, strontium and barium have been described before in J. G. VERKADE et al., *Inorg. Chem.* 33, 2137 (1994). For some of these inner complexes, an X-ray structural analysis (XSA) has already been carried out. For the sodium and barium inner complexes, the following stoichiometry is found [(TEA)NaOClO$_3$]$_n$ and [(TEA)$_2$Ba(OClO$_3$)$_2$]$_2$, the degree of oligomerization or polymerization being evident from the XSA. The inner complexes are anhydrous. In the case of the sodium inner complex[1] with the m.p. of 129-130° C., the XSA shows the following image: the sodium cation has four ligands in the coordination sphere; a TEA group acts as a tetradentate, non-bridging κ-N O$^3$ ligand, two bridging non-chelating TEA groups (μ-ligands) and a perchlorate anion with monodentate bonding. This gives rise to a total coordination number of seven for sodium. Since the perchlorate anion functions as a perchlorato ligand, these substances are included in the class of the inner complexes. Surprisingly, such inner complexes are suitable in stabilizer systems for synthetic polymers and in compositions comprising them. The synthetic polymer is preferably a halogenated polymer, especially PVC. Owing to the particular suitability for halogenated polymers, reference is made to them below in the description of the invention. However, it should be emphasized that non-halogenated synthetic polymers can also be stabilized in the context of the present invention. The suitability of such a complex structure is also surprising because the prior art (D. S. VAN ES in *Catalytic Heat Stabilizers: Fact or Fiction?*—9$^{th}$ Intern. PVC Conf., Brighton, April 2005) states that perchlorate salts stabilize PVC effectively only when a "bare" perchlorate anion and hence a likewise "bare" metal cation are present. This can be equated with a non-coordinating perchlorate anion and a non-coordinating metal cation, which cannot be reconciled with the structural features outlined for (A). All inventive compounds are solids and comprise TEA as a tertiary alkanolamine as a complex ligand.

[1]) abbreviated to TEAP in this patent document.

It was also surprising that this specific ligand property of TEA, since the introduction of additional methyl groups (conversion from the tertiary alkanolamine TEA to the tertiary alkanolamine TIPA) changes this complexation feature to such an extent that an attempt to prepare and isolate solid homologous TIPA complexes fails. It is likewise impossible to introduce a single methyl group or a long-chain (surfactant) radical into the TEA ligand, since the stable inner complex (cage) structure is disturbed here too.

The present invention further provides inner complexes of the formula (A), as specified above, where Mt=Li, Na or Ca; q=1 or 2 and An=OClO$_3$ or OS(O$_2$)CF$_3$; preferably, Mt=Li, Na; q=1 and An=OClO$_3$.

The present invention further provides inner complexes in which Mt=Ca and q=2.

The following inner complexes are listed (where the following abbreviations are used: perchlorato=Pc and triflato=Tf):

[(TEA) NaPc] [A-1], [(TEA) NaTf] [A-2], [(TEA) LiPc] [A-3], [(TEA) LiTf] [A-4], [(TEA) KPc] [A-5], [(TEA) KTf] [A-6], [(TEA)$_2$ Mg(Pc)$_2$] [A-7], [(TEA)$_2$ Mg(Tf)$_2$] [A-8], [(TEA)$_2$ Ca(Pc)$_2$] [A-9], [(TEA)$_2$Ca(Tf)$_2$] [A-10], [(TEA)$_2$ Sr(Pc)$_2$] [A-11], [(TEA)$_2$ Sr(Tf)2] [A-12], [(TEA)$_2$ Zn(Pc)$_2$] [A-13], [(TEA)$_2$ (Zn/Tf)$_2$] [A-14], [(TEA)$_2$Ba(Pc)$_2$] [A-15], [(TEA)$_2$Ba(Tf)$_2$] [A-16].

The inventive inner complexes (A) are preferably used in the halogenated polymer at appropriately 0.001 to 5 phr, preferably 0.01 to 3 phr and very particularly 0.01 to 2 phr.

The inner complexes (A) may be combined with further substance groups as follows:

Linear or cyclic ureide and/or polyaminocrotonic esters and/or cyanamides of the formulae (B-1) and (B-2) and/or dihydropyridines of the formulae (C-1) and (C-2):

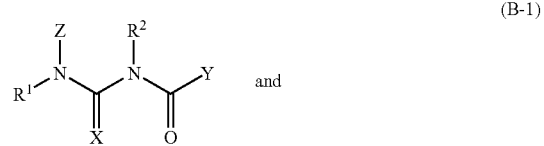

(B-1)

and

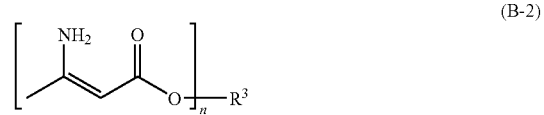

(B-2)

and

(C-1)

and

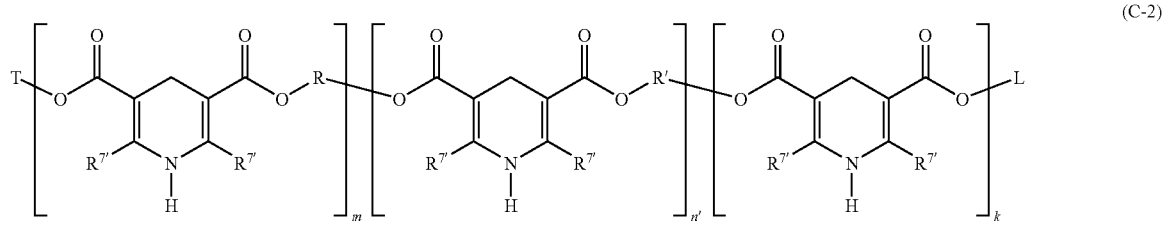

(C-2)

where

X=O or S; Y=CH$_2$CN, Z=H, or Y and Z form the bridging member CH$_2$—C=NH, CR$^5$=C—NHR$^6$ or R$^1$R$^2$C.

R$^1$, R$^2$ are each independently H, C$_1$-C$_{22}$-alkyl, cyclohexyl, (meth)allyl, oleyl, phenyl, benzyl, phenethyl, (tetrahydro)naphthyl, meth (or eth)oxypropyl (or ethyl), CH$_2$—CHOH—R$^{1a}$, CH$_2$—CHOH—CH$_2$X'R$^{1a}$;

X'=O or S;

R$^{1a}$=H, C$_{1-22}$-alkyl, cyclohexyl, (meth)allyl, oleyl, phenyl, benzyl, phenethyl, (tetrahydro)naphthyl or meth (or eth)oxypropyl (or ethyl);

R$^3$=unbranched or branched C$_2$-C$_{20}$-alkylene which may be interrupted by 1 to 4 oxygen or sulphur atoms and/or may be substituted by 1 to 4 OH groups, or dimethylolcyclohexane-1,4-diyl, polyethylene (or -propylene) glycol-α,ω-diyl (preferably, poly=tetra to deca), polyglyceryl-α,ω-diyl (preferably, poly=tetra to deca) or glyceroltriyl, trimethylolethane (or -propane)triyl, pentaerythritoltri (or -tetra)yl, bis(trimethylolethane (or -propane)tri (or -tetra))

yl, diglyceroltri (or -tetra)yl, tetritoltetrayl, triglyceroltri (or -tetra, -penta)yl, pentitolpentayl, dipentaerythritolpenta (or -hexa)yl and hexitolhexayl;

n=2, 3, 4, 5 or 6;

$R^5$=H or $(C_3-C_{10}$-alkylidene$)_{1/2}$; where this alkylidene may be interrupted by up to 2 oxygen atoms or may have up to 2 substituents selected independently from the group consisting of OH, phenyl and hydroxyphenyl;

$R^6$=H, hydroxy-$C_2$-$C_4$-alkyl, 3-$C_1$-$C_{10}$-alkoxy-2-hydroxypropyl, or mono- to trihydroxy-, mono- to tri-$C_1$-$C_4$-alkyl- or/and mono- to tri-$C_1$-$C_4$-alkoxyphenyl, allyl, mono- to trisubstituted phenyl;

$R^7$, $R^{7'}$ are each independently branched and unbranched $C_1$-$C_4$-alkyl, phenyl, cyclohexyl;

W=$CO_2CH_3$, $CO_2C_2H_5$, $CO_2{}^nC_{12}H_{25}$ or $CO_2C_2H_4$—S—$^nC_{12}H_{25}$;

L, T=unsubstituted $C_{1-12}$-alkyl; and m and n' are each integers of 0 to 20, k is 0 or 1 and R and R' are each independently ethylene, propylene, butylene or an alkylene- or cycloalkylenebismethylene group of the —$(C_pH_{2p}$—X"—$)_tC_pH_{2p}$— type where p is an integer of 2 to 8, t is an integer of 0 to 10 and X" is oxygen or sulphur.

The radicals specified in brackets are further alternative radicals; for instance, polyethylene (or -propylene) glycol means polyethylene glycol or polypropylene glycol. This also applies hereinafter.

Likewise surprising was the finding that the combination of inner complexes (A) with aminocrotonates or dihydropyridines (B-2, C-1, C-2) improves the transparency behaviour. For instance, transparencies of more than 90% can be achieved when formulation constituents which otherwise impart transparency are used.

Preferred definitions of the substituents, empirical formulae and indices are as follows:

In the case of (B-1), in all cases, X=O or S. In linear ureides, Y=$CH_2CN$ and Z=H. In the case of cyclic ureides, the bridging member Y—Z=$CH_2$—C=NH in the case of the 6(4)-imino-barbituric acids, the bridging member Y—Z=$CR^5$=C—$NHR^6$ in the case of the aminouracils, and the bridging member Y—Z=$R^1R^2C$ in the case of the hydantoins. In the case of (B-2), n=2, 3, 4, 5 or 6.

The substituents $R^1$ and $R^2$ may be $C_1$-$C_{22}$-alkyl, specifically methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl and docosyl, where these radicals may be branched or unbranched. Preference is given to $C_1$-$C_8$-alkyl, particular preference being given to methyl, ethyl, propyl and butyl. In addition, $R^1$ and $R^2$ may be cyclohexyl, (meth)allyl, oleyl, phenyl, benzyl, phenethyl, methoxyethyl, ethoxyethyl, methoxypropyl and ethoxypropyl. Preference is given to allyl and phenethyl, cyclohexyl, benzyl, methoxypropyl and ethoxypropyl, particular preference to cyclohexyl, benzyl, methoxypropyl and ethoxypropyl.

Preferably, X=O and, more preferably, $R^1$=$CH_3$ and $R^2$=$CH_2$—CHOH—$R^{1a}$, where $R^{1a}$ is preferably H, $CH_3$, $C_2H_5$, or $R^2$=$CH_2$—CHOH—$CH_2OR^{1a}$, where $R^{1a}$ is preferably H or $C_1$-$C_{10}$-alkyl and allyl.

$C_1$-$C_{10}$-Alkyl includes, for example, methyl, ethyl, n-propyl, isopropyl, n-butyl, isobutyl, sec-butyl, tert-butyl, hexyl, heptyl, octyl, 2-ethylhexyl, nonyl, decyl, neodecyl.

$R^5$ is hydrogen or $(C_3-C_{10}$-alkylidene$)_{1/2}$—the index ½ states that the products are bis-products, i.e. alkylidenebis-6-aminouracils. Alkylidene groups include ethylidene, propylidene, butylidene, pentylidene, hexylidene, heptylidene, octylidene, nonylidene and decylidene, and also salicylidene and cinnamylidene. The names apply to linear and branched representatives. Preference is given to propylidene, hexylidene, heptylidene and octylidene. Particular preference is given to hexylidene and heptylidene.

The substituent $R^6$ denotes hydrogen and hydroxy-$C_2$-$C_4$-alkyl. The latter group includes 2-hydroxyethyl, 2- and 3-hydroxypropyl, and 2-, 3- and 4-hydroxybutyl. Preference is given to 2-hydroxyethyl and to 2- and 3-hydroxypropyl. Particular preference is given to hydrogen.

In addition, $R^6$ is allyl or 3-$C_1$-$C_{10}$-alkoxy-2-hydroxypropyl. This includes 3-methoxy-, 3-ethoxy-, 3-propoxy-, 3-butoxy-, 3-pentoxy-, 3-hexoxy-, 3-heptoxy-, 3-octoxy-, 3-nonoxy- and 3-decoxy-2-hydroxypropyl. Preference is given to allyloxy-, 3-butoxy-, 3-octoxy- and 3-decoxy-2-hydroxypropyl.

In addition, the substituent $R^6$ is mono- to trisubstituted phenyl, where the substituents may be hydroxyl or/and $C_1$-$C_4$-alkyl or/and $C_1$-$C_4$-alkoxy, and the combination of hydroxyl with methyl, ethyl, propyl and butyl, and of hydroxyl with methoxy, ethoxy, propoxy and butoxy. Preference is given to the hydroxyl, methyl, butyl, methoxy and ethoxy radical as the substituent. Particular preference is given to the hydroxyl and methoxy group. Preference is given to mono- and disubstitution. However, particular preference is given to monosubstitution. Particular preference is likewise given, in the case of polysubstitution, to the combinations of hydroxyl with meth(eth)oxy or of hydroxyl with monomethyl or dimethyl, and to the combinations of methyl, ethyl, propyl and butyl with methoxy; ethoxy, propoxy and butoxy. Specific examples include: 2-, 3- and 4-hydroxyphenyl; 2-hydroxy-4-methylphenyl; 2-hydroxy-5-methylphenyl; 2-hydroxy-5-t-butylphenyl; and 2-, 3- and 4-meth(eth)oxyphenyl.

The compounds (B-1) may also be present as hydrates. This is preferably the case when Y and Z are $CR^5$=C—$NR^6$; more preferably when $R^1$ or/and $R^2$≠methyl. The hydrates may be present, for example, in the form of the hemi-, sesqui- or dihydrate. High-melting cyclic ureides (m.p.: >180° C.) are preferably used in micronized form (particle size <50 μm).

For (B-2) containing $R^3$ as $C_2$-$C_{20}$-alkylene which may be interrupted by from 1 to 4 oxygen or sulphur atoms or/and may be substituted by from 1 to 4 OH groups, preference is given to ethanediyl-1,2, propanediyl-1,2, propanediyl-1,3, butanediyl-2,3, butanediyl-1,4, $CH_2CH_2OCH_2CH_2$, $CH_2CH_2OCH_2CH_2OCH_2CH_2$, $CH_2CH_2SCH_2CH_2$, $CH_2CH_2OCH_2CH_2$ $OCH_2CH_2OCH_2CH_2$, $CH_2CH_2SCH_2CH_2SCH_2CH_2$, $C_3H_6OC_3H_6$, $C_3H_6OC_3H_6OC_3H_6C_3H_6OC_3H_6OC_3H_6OC_3H_6CH_2$ CHOHCH$_2$OCH$_2$CHOHCH$_2$, CH$_2$CHOHCH$_2$OCH$_2$CHOHCH$_2$OCH$_2$CHOHCH$_2$. Particular preference is given to $CH_2CH_2CH_2CH_2$ and $CH_2CH_2SCH_2CH_2$. Tetritol is preferably erythritol, arabinitol and xylitol; hexitol is preferably mannitol and sorbitol.

Preferred representatives of the individual substance groups are listed below. The list is not restrictive but rather selective.

(B-1)—Linear acylureides (linear ureides, acylcarbamides, acylureas), such as [1] N,N'-dimethyl-, [2] N,N'-diethyl-, [3] N,N'-dipropyl-, [4] N,N'-diallyl-, [5] N,N'-dibutyl-, [6] N,N'-dioctyl-, [7] N,N'-didodecyl- and [8] N,N'-dibenzylcyanoacetureide, [9] N- or N'-monomethyl-, [10] N- or N'-monoethyl-, [11] N- or N'-monopropyl-, [12] N- or N'-monoallyl-, [13] N- or N'-monobutyl-, [14] N- or N'-monopentyl-, [15] N- or N'-monohexyl-, [16] N- or N'-monoheptyl- and [17] N- or N'-monooctyl-, [18] N,N'-monocyclohexyl-[19] N,N'-monobenzyl- and [20] N,N'- monophenylcyanoacetureide. Preference is given to [1], [2], [3], [4], [5], [8], [9], [10], [11], [12], [13], [18], [19] and [20]. Particular preference is given to [1], [4], [8], [12], [18], [19] and [20]. Very particular preference is given to [1].

(B-1)—Cycloacylureides (cyclic ureides, 6(4)-iminobarbituric acids or 6-iminohydrouracils or 6(4)-iminodihydropyrimidine-2,4-diones), such as [21] (CAS No. 17743-04-3) N,N'-dimethyl-, [22] N,N'-diethyl-, [23] N,N'-dipropyl-, [24] N,N'-diallyl-, [25] N,N'-dibutyl-, [26] N,N'-dioctyl- and [27] N,N'-didodecyl-, [28] N,N'-dibenzyl-6(4)-iminobarbituric acid, [29] (CAS No. 17743-03-2 and 17743-02-1) N- or N'-monomethyl-, [30] N- or N'-monoethyl-, [31] N- or N'-monopropyl-, [32] N- or N'-monoallyl-, [33] N- or N'-monobutyl-, [34] N- or N'-monopentyl-, [35] N- or N'-monohexyl-, [36] N- or N'-monoheptyl-[37] N- or N'-monooctyl-, [38] N or N'-monocyclohexyl- or [39] N or N'-monophenyl- and [40] N,N'-monobenzyl-6-iminobarbituric acid. Preference is given to [21], [22], [23], [24], [25], [28], [29], [30], [31][32], [33], [37], [38], [39] and [40]. Particular preference is given to [21], [24], [28], [32], [37], [38], [39] and [40]. Very particular preference is given to [21].

(B-1)—Cycloacylureides (aminouracils or aminopyrimidine-2,4-diones), such as [41] N,N'-dimethyl-, [42] N,N'-diethyl-, [43] N,N'-dipropyl-, [44] N,N'-diallyl-, [45] N,N'-dibutyl-, [46] N,N'-dioctyl- and [47] N,N'-didodecyl-, [48] N,N'-dibenzyl-6-aminouracil, [49] N- or N'-monomethyl-, [50] N- or N'-monoethyl-, [51] N- or N'-monopropyl-, [52] N- or N'-monoallyl-, [53] N- or N'-monobutyl-, [54] N- or N'-monopentyl-, [55] N- or N'-monohexyl-, [56] N- or N'-monoheptyl-, [57] N- or N'-monooctyl-, [58] N- or N'-monocyclohexyl-, [59] N or N'-monobenzyl- and [60] N or N'-monophenyl-6-aminouracil. Preference is given to [41], [42], [43], [44], [45], [48], [49], [50], [51], [52], [53], [57], [58], [59] and [60]. Particular preference is given to [41], [44], [48], [52], [57], [58], [59] and [60]. Very particular preference is given to [41].

Preferred hydrates are the hemihydrate and monohydrate of [42], [43], [44] and [45].

This category also includes the 6-aminouracils substituted on the exocyclic nitrogen atom, such as hydroxyethylamino and hydroxypropylamino derivatives or hydroxyanilino-, methoxyanilino- and ethoxyanilinouracils. Additionally mentioned are [61,62,63] N-2-, -3- and -4-hydroxyphenyl-1,3-dimethyl-6-aminouracil and [64] N-2-hydroxy-4-methylphenyl-, [65] N-2-hydroxy-5-methylphenyl-, [65] N-2-hydroxy-5-tert-butylphenyl-, [66,67,68] N-2-, -3- and -4-methoxyphenyl-, [69,70,71] N-2-, -3- and -4-ethoxyphenyl-1,3-dimethyl-6-aminouracil, [72] N-2-hydroxyethylamino-, [73] N-2-hydroxypropylamino-, [74] N-3-hydroxypropylamino-, [75] N-2-hydroxybutylamino-, [76] N-3-hydroxybutylamino- and [77] N-4-hydroxybutylamino-1,3-dimethyl-6-aminouracil. Preference is given to [61], [64], [65], [66], [69], [72], [73] and [74]. Particular preference is given to [61], [64], [65], [66] and [69]. Very particular preference is given to [61], [66] and [69]. The following should likewise be mentioned here: 5-substituted 6-aminouracils, such as alkylidenebis-6-aminouracils. Also listed are [78] 5-ethylidene-, [79] 5-propylidene-, [80] 5-(2-ethylbutylidene)-, [81] 5-hexylidene-, [82] 5-heptylidene-, [83] 5-octylidene-, [84] 5-benzylidene-, [85] 5-salicylidene-, [86] 5-(3-hydroxy)benzylidene-, [87] 5-(4-hydroxy)benzylidene- and [88] 5-(2-hydroxy)-3-methoxybenzylidene- and [89] 5-pentylidenebis-1,3-dimethyl-6-aminouracil. Preference is given to [80], [81], [82], [83] and [89]. Particular preference is given to [81], [82], [83] and [89]. Very particular preference is given to [81] and [82].

Reaction of N-monosubstituted 6-aminouracils with C-glycidyl compounds and glycidyl (thio)ethers or esters forms N,N'-disubstituted 6-aminouracils. The following are mentioned by name: [90] 1-methyl-3-(3-isopropoxy-2-hydroxypropyl)-, [91] 1-phenyl-3-(3-isopropoxy-2-hydroxypropyl)-, [92] 1-methyl-3-(3-tert-butoxy-2-hydroxypropyl)-, [93] 1-benzyl-3-(3-isopropoxy-2-hydroxypropyl)-, [94] 1-methyl-3-(3-neononylcarboxy-2-hydroxypropyl)-, [95] 1-methyl-3-(2-hydroxypropyl)-, [96] 1-methyl-3-(3-(2-ethylhexoxy-2-hydroxypropyl)-, [97] 1-methyl-3-(2-hydroxyhexyl)-, [98] 1-benzyl-(2-hydroxypropyl)-, [99] 1-methyl-(2-hydroxybutyl)-, [100] 1-benzyl-(2-hydroxybutyl)-, [101] 1-benzyl-(3-isopropoxy-2-hydroxypropyl)-, [102] 1-methyl-3-(2-hydroxyethyl)- and [103] 1-methyl-3-(3-allyloxy-2-hydroxypropyl)-6-aminouracil. Preference is given to [90], [92], [94], [95], [96], [97], [99], [102] and [103]. Particular preference is given to [90], [92], [95], [99], and [103]. Very particular preference is given to [95], [99] and [103].

Certain aminouracils are available in the chemical trade: [1], [9] and [41] are "commodities" and are used as bulk chemicals in industrial caffeine or theobromine synthesis. For 6(4)-iminobarbituric acids, relevant literature syntheses are available.

(B-1)—Hydantoins (imidazolidinediones), hydantoin [103a], 2-thiohydantoin [103b], 5-methylhydantoin [103c], 5-phenylhydantoin [103d], 5-methyl-2-thiohydantoin [103e], 5-phenyl-2-thiohydantoin [103f], 5,5-dimethylhydantoin [103g], 5,5-dimethyl-2-thiohydantoin [103h], 5-methyl-5-phenylhydantoin [103i] and 5-methyl-5-phenyl-2-thiohydantoin [103j]. Preference is given to [103a] and [103b]. Very particular preference is given to [103a].

(B-2) Bisaminocrotonic acid esters of [104] ethylene glycol and [105] propylene glycol and of polyethylene glycols and polypropylene glycols and of [106] glycerol and polyglycerols. Trisaminocrotonic acid esters of [107] glycerol, [108,109] trimethylolethane(propane), [110] triethylol isocyanurate. Tetrakis(aminocrotonic esters) of [111] pentaerythritol, [112,113] bistrimethylolethane(propane), hexakis(aminocrotonic esters) of [114] dipentaerythritol and [115] sorbitol, and [116] butanediyl-1,4- and [117] thiobisethanediyl aminocrotonate.

Preference is given to [104], [105], [108], [109], [111], [113], [116] and [117].

Particular preference is given to [104], [105], [116] and [117]. Very particular preference is given to [116] and [117]. Both compounds are produced on an industrial scale.

(C-1) Monomeric dihydropyridines, such as methyl dimethyldihydropyridinedicarboxylate [118], ethyl dimethyldihydropyridinedicarboxylate [119] and dilauryl dimethyldihydropyridinedicarboxylate [120] (a compound which is produced on the industrial scale).

(C-2) Oligo- and polydihydropyridines which derive from 1,4-butanediol bis-3-aminocrotonate or thiodiglycol bis-3-aminocrotonate and the end members methyl or ethyl 3-aminocrotonate, specifically the bis(dihydropyridines) [121] and [122] (sulphur-free), and also [123] and [124] (sulphur-containing). And also the polydihydropyridines [125] and [126] (sulphur-free), and also [127] and [128] (sulphur-containing). [127] and [128] are commercial products.

Preferred two-substance or multisubstance combinations of at least one initial colour improver (ICI)+at least one booster (A) are:

(B-1): $R^1$ or $R^2$=methyl, ethyl, propyl, butyl, cyclohexyl, allyl, benzyl or hydrogen and (A).

(B-2): Bisaminocrotonic esters of 1,4-butanediol or/and of thiodiglycol and (A).

Specified preferred two-substance or multisubstance combinations are:

1. Two-substance or multisubstance combinations of at least one compound (B-1) with at least one booster (A), specifically:

(B-1) component—linear acylureides:
[1] with [A-1], [A-2], [A-3], [A-4] and [A-5], very particular preference being given to the combination with [A-1].

(B-1) component—cyclic acylureides (6(4)-iminobarbituric acids):
[21] with [A-1], [A-2], [A-3], [A-4] and [A-5], very particular preference being given to the combination with [A-1].

(B-1) component—cyclic acylureides (aminouracils):
[41] with [A-1], [A-2], [A-3], [A-4] and [A-5],
[61] with [A-1], [A-2], [A-3], [A-4] and [A-5],
[66] with [A-1], [A-2], [A-3], [A-4] and [A-5],
[69] with [A-1], [A-2], [A-3], [A-4] and [A-5],
[81] with [A-1], [A-2], [A-3], [A-4] and [A-5],
[82] with [A-1], [A-2], [A-3], [A-4] and [A-5],
[95] with [A-1], [A-2], [A-3], [A-4] and [A-5],
[99] with [A-1], [A-2], [A-3], [A-4] and [A-5],
[103] with [A-1], [A-2], [A-3], [A-4] and [A-5], very particular preference being given to the combination of [41] with [A-1].

(B-1) component—cyclic acylureides (hydantoins)
[103a] with [A-1], [A-2], [A-3], [A-4] and [A-5],
[103b] with [A-1], [A-2], [A-3], [A-4] and [A-5], very particular preference being given to the combination of [103a] with [A-1].

2. Two-substance or multisubstance combinations of at least one compound (B-2) with at least one booster (A), specifically:
[116] with [A-1], [A-2], [A-3], [A-4] and [A-5],
[117] with [A-1], [A-2], [A-3], [A-4] and [A-5], very particular preference being given to the combinations with [A-1].

3. Two-substance or multisubstance combinations of at least one compound (C-1) with at least one booster (A), specifically:
[118] with [A-1], [A-2], [A-3], [A-4] and [A-5],
[120] with [A-1], [A-2], [A-3], [A-4] and [A-5], very particular preference being given to the combination of [120] with [A-1].

4. Two-substance or multisubstance combinations of at least one compound (C-2) with at least one booster (A), specifically:
[127] with [A-1], [A-2], [A-3], [A-4] and [A-5],
[128] with [A-1], [A-2], [A-3], [A-4] and [A-5], very particular preference being given to the combinations with [A-1].

It will be appreciated that the compounds of classes (B-1), (B-2), (C-1) and (C-2) may also, just like the boosters [A-1], [A-2], [A-3], [A-4] and [A-5], be combined with one another.

The compounds from groups (A) and (B) are used in the halogenated polymer appropriately at 0.01 to 10 phr, preferably 0.05 to 5 phr and especially 0.1 to 3 phr, preference being given to values in the lower threshold region for (A).

In addition, it is possible to use combinations with various HCl scavengers, such as:

Alkali Metal and Alkaline Earth Metal Compounds

This is understood to mean principally the carboxylates of the acids described in the "zinc compounds" chapter, but also corresponding oxides or hydroxides or carbonates. Also useful are mixtures thereof with organic acids. Examples are LiOH, NaOH, KOH, CaO, Ca(OH)$_2$, MgO, Mg(OH)$_2$, Sr(OH)$_2$, Al(OH)$_3$, CaCO$_3$ and MgCO$_3$ (including basic carbonates, for example magnesia, alba and huntite), and also fatty acid salts of sodium and potassium. In the case of alkaline earth metal and zinc carboxylates, it is also possible to use their adducts with MO or M(OH)$_2$ (M=Ca, Mg, Sr or Zn), so-called "overbased" compounds. Preference is given to using alkali metal, alkaline earth metal and/or aluminium carboxylates in addition to the inventive stabilizers.

Preference is given to magnesium hydroxide, magnesium acetylacetonate, calcium acetylacetonate, and uncoated and coated calcium hydroxide. Very particular preference is given to coated calcium hydroxide (coating with fatty acids, for example palmitic and stearic acids, or mixtures thereof).

Metal Soaps

Metal soaps are mainly metal carboxylates, preferably relatively long-chain carboxylic acids. Familiar examples are stearates and laurates, and also oleates and salts of relatively short-chain aliphatic or aromatic carboxylic acids, such as acetic acid, propionic acid, butyric acid, valeric acid, hexanoic acid, sorbic acid; oxalic acid, malonic acid, succinic acid, glutaric acid, adipic acid, fumaric acid, citric acid, benzoic acid, salicylic acid, phthalic acids, hemimellitic acid, trimellitic acid, pyromellitic acid.

The metals include: Li, Na, K, Mg, Ca, Sr, Ba, Zn, Al, La, Ce and rare earth metals. Often, so-called synergistic mixtures such as barium/zinc, magnesium/zinc, calcium/zinc or calcium/magnesium/zinc stabilizers are used. The metal soaps may be used individually or in mixtures. An overview of common metal soaps can be found in Ullmanns Encyclopedia of Industrial Chemistry, 5th Ed., Vol. A16 (1985), p. 361 ff. Preference is given to magnesium, potassium and zinc soaps.

Preference is given to magnesium and calcium soaps. Very particular preference is given to magnesium laurate, magnesium stearate, calcium laurate and calcium stearate.

Zinc Compounds:

The organic zinc compounds with a Zn—O bond are zinc enolates, zinc phenoxides or/and zinc carboxylates. The latter are compounds from the group of the aliphatic saturated and unsaturated $C_{1-22}$-carboxylates, of the aliphatic saturated or unsaturated $C_{2-22}$-carboxylates which are substituted by at least one OH group or whose chain is interrupted by one or more oxygen atoms (oxa acids), of the cyclic and bicyclic carboxylates having 5-22 carbon atoms, of the unsubstituted, at least mono-OH-substituted and/or $C_1$-$C_{16}$-alkyl-substituted phenyl carboxylates, of the phenyl-$C_1$-$C_{16}$-alkyl carboxylates, or of the optionally $C_{1-12}$-alkyl-substituted phenoxides, or of abietic acid. Zn—S compounds are, for example, zinc mercaptides, zinc mercaptocarboxylates and zinc mercaptocarboxylic esters.

As examples, mention should be made by name of zinc salts of monovalent carboxylic acids, such as formic acid, acetic acid, propionic acid, butyric acid, valeric acid, hexanoic acid, enanthic acid, octanoic acid, neodecanoic acid, 2-ethylhexanoic acid, pelargonic acid, decanoic acid, undecanoic acid, dodecanoic acid, tridecanoic acid, myristic acid, palmitic acid, lauric acid, isostearic acid, stearic acid, 12-hydroxystearic acid, 9,10-dihydroxystearic acid, oleic acid, ricinoleic acid, 3,6-dioxaheptanoic acid, 3,6,9-trioxadecanoic acid, behenic acid, benzoic acid, p-tert-butylbenzoic acid, dimethylhydroxybenzoic acid, 3,5-di-tert-butyl-4-hydroxybenzoic acid, toluic acid, dimethylbenzoic acid, ethylbenzoic acid, n-propylbenzoic acid, salicylic acid, p-tert-octylsalicylic acid, and sorbic acid, cinnamic acid, mandelic acid, glycolic acid; zinc salts of the divalent carboxylic acids and monoesters thereof, such as oxalic acid, malonic acid, succinic acid, glutaric acid, adipic acid, fumaric acid, pentane-1,5-dicarboxylic acid, hexane-1,6-dicarboxylic acid, heptane-1,7-dicarboxylic acid, octane-1,8-dicarboxylic acid, 3,6,9-trioxadecane-1,10-dicarboxylic acid, lactic acid, malonic acid, maleic acid, tartaric acid, malic acid, salicylic acid, polyglycoldicarboxylic acid (n=10-12), phthalic acid, isophthalic acid, terephthalic acid and hydroxyphthalic acid; and the di- or triesters of the tri- or tetravalent carboxylic acids, such as hemimellitic acid, trimellitic acid, pyromellitic acid, citric acid, and also so-called overbased zinc carboxylates or zinc laurylmercaptide, zinc thioglycolate, zinc thiosalicylate, zinc bis-i-octylthioglycolate, zinc mercaptopropionate, zinc thiolactate, zinc thiomalate, zinc bis(octylmercaptopropionate), zinc bis(isooctylthiolactate) and zinc bis(laurylthiomalate).

The zinc enolates are preferably enolates of acetylacetacetone, of benzoylacetacetone, of dibenzoylmethane, and also enolates of acetoacetoacetic and benzoylacetic esters, and of dehydroacetic acid. In addition, it is also possible to use inorganic zinc compounds such as zinc oxide, zinc hydroxide, zinc carbonate, basic zinc carbonate or zinc sulphide.

Preference is given to neutral or basic zinc carboxylates of a carboxylic acid having from 1 to 22 carbon atoms (zinc soaps), for example benzoates or alkanoates, preferably $C_8$-alkanoates, stearate, oleate, laurate, palmitate, behenate, versatate, hydroxystearates and -oleates, dihydroxystearates, p-tert-butylbenzoate or (iso)octanoate. Particular preference is given to stearate, oleate, versatate, benzoate, p-tert-butylbenzoate and 2-ethylhexanoate.

The metal soaps or mixtures thereof may be employed in an amount of, for example, from 0.001 to 10 parts by weight, appropriately from 0.01 to 8 parts by weight, more preferably from 0.05 to 5 parts by weight, based on 100 parts by weight of PVC.

Hydrotalcites

The chemical composition of these compounds is known to those skilled in the art, for example from the publications PS-DE 38,43,581 A1, U.S. Pat. No. 4,000,100, EP 0,062,813 A1 and WO 93/20135. These may be based on Al/Mg/carbonate, Al/Mg/Ti/carbonate, Li/Mg/carbonate or Li/Al/Mg/carbonate, as described in PS-DE 102,17,364 A1 (SüdChemie), PS-DE 44,25266 A1 (Metallgesellschaft), PS-EP 0,549,340 A1 (Mizusawa Ind. Chem) and PS-JP 0,761,756 A1 (Fuji Chem. Ind.). Compounds from the group of the hydrotalcites can be described by the following general formula:

where
$M^{2+}$=a cation of one or more of the metals from the group of Mg, Ca, Sr, Zn and Sn, $M^{3+}$=an Al or B cation, $A^n$ is an anion with the valency −n, b=n, a number of 1-2, $0 \leq x \leq 0.5$, d is a number of 0-20. Preference is given to compounds where
$A^n$=$OH^-$, $ClO_4^-$, $HCO_3^-$, $CH_3COO^-$, $C_6H_5COO^-$, $CO_3^{2-}$, $(CHOHCOO)_2^{2-}$, $(CH_2COO)_2^{2-}$, $CH_3CHOHCOO^-$, $HPO_3^-$ or $HPO_4^{2-}$.
Examples of hydrotalcites are
$Al_2O_3*6MgO*CO*12H_2O$, $Mg_{4.5}Al_2(OH)_{13}*CO_3*3.5H_2O$, $4MgO*Al_2O_3*CO_2.9H_2O$, $4MgO*Al_2O_3*CO_26*H_2O$, $ZnO*3MgO*Al_2O_3*CO_2*8-9H_2O$ and $ZnO*3MgO*Al_2O_3*CO_2*5-6H_2O$ Particular preference is given to the Alkamizer 1 and 2 types, Alkamizer P 93-2 (manufacturer: Kyowa Chemical Ind. Co., Japan) and L-CAM (lithium-modified hydrotalcite=Lithium/Carbonate/Aluminium/Magnesium, manufacturer: Fuji Chem. Ind. Co. Ltd., Japan: PS-EP 0761 756A1, or Mizusawa Industrial Chemicals, Ltd.: PS-EP 0549 340 A1, and Metallgesellschaft AG: PS-DE 4425266 C1). Very particular preference is given to using dewatered hydrotalcites.

Titanium-Containing Hydrotalcites

Titanium-containing hydrotalcites are described in PS-WO 95/21127. Compounds of this type with the general formula $Al_aMg_bTi_c(OH)_d(CO_3)_e*mH_2O$, where a:b=1:1 to 1:10;
$2 \leq b \leq 10$;
$0 < c < 5$; $0 \leq m < 5$, and d and e are selected so as to form a basic, charge-free molecule, may likewise also be used.

Lithium Sheet Lattice Compounds (Lithium Hydrotalcites)

Lithium aluminium sheet lattice compounds have the general formula:

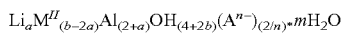

in which
$M^{II}$ is Mg, Ca or Zn and
$A^n$ is a selected anion of the valency n or a mixture of anions and the indices are in the range of
$0<a<(b-2)/2$,
$1<b<6$ and
m=0 to 30,
with the restriction that (b−2a)>2, or the general formula:

in which
$M^{II}$, A, m and n are each as defined above and
x satisfies the condition that $0.01 \leq x < 1$.

In the preparation of the sheet lattice compounds mentioned, lithium hydroxide, lithium oxide and/or compounds thereof which can be converted to hydroxide, metal(II) hydroxides, oxides and/or compounds of the metals mentioned which can be converted to hydroxides, and aluminium hydroxides and/or compounds thereof which can be converted to hydroxides, and also acids and/or salts thereof or mixtures thereof, are reacted with one another in the aqueous medium at a pH of 8 to 10 and at temperatures of 20 to 250° C., and the resulting solid reaction product is removed.

The reaction time is preferably 0.5 to 40 hours, especially 3 to 15 hours. The reaction product obtained directly from the reaction described above can be removed from the aqueous reaction medium by known processes, preferably by filtration. The reaction product removed is likewise worked up in a manner known per se, for example by washing the filtercake with water and drying the washed residue at temperatures of, for example, 60 to 150° C., preferably at 90 to 120° C.

For the reaction with aluminium, it is possible to use either finely divided active metal(III) hydroxide in combination with sodium hydroxide, or $NaAlO_2$. Lithium or one of the metal(II) compounds mentioned can be used in the form of finely divided lithium oxide or hydroxide or mixtures thereof, or of finely divided metal(II) oxide or hydroxide or mixtures thereof. The corresponding acid anions can be used in differently concentrated form, for example, directly as an acid or else as a salt.

The reaction temperatures are preferably between about 20 and 250° C., more especially between about 60 and 180° C. Catalysts or accelerants are not required. In the substances, the water of crystallization can be removed completely or partly by treatment. When they are used as stabilizers, the dried sheet lattice compounds do not release any water or another gas at the processing temperatures of 160 to 220° C. customary for PVC, such that no troublesome bubble formation occurs in the mouldings.

The anions $A''$ in the above general formula may be sulphate, sulphite, sulphide, thiosulphate, peroxosulphate, peroxodisulphate, hydrogenphosphate, hydrogenphosphite, carbonate, halides, nitrate, nitrite, hydrogensulphate, hydrogencarbonate, hydrogensulphite, hydrogensulphide, dihydrogenphosphate, dihydrogenphosphite, monocarboxylic acid anions such as acetate and benzoate, amide, azide, hydroxide, hydroxylamine, hydroazide, acetylacetonate, phenoxide, pseudohalides, halogenites, halogenates, perhalogenates, $I_3^-$, permanganate, dianions of dicarboxylic acids such as phthalate, oxalate, maleate or fumarate, bisphenoxides, phosphate, pyrophosphate, phosphite, pyrophosphite, trianions of tricarboxylic acids such as citrate, trisphenoxides and many others, and also mixtures thereof. Among these, preference is given to hydroxide, carbonate, phosphite and maleate. To improve the dispersibility of the substances in halogenated thermoplastic polymer materials, they may be surface-treated with a higher fatty acid, for example stearic acid, an anionic surface-active agent, a silane coupler, a titanate coupler or a glyceryl fatty acid ester.

Calcium Aluminium Hydroxo Hydrogenphosphites

Compounds from the group of basic calcium aluminium hydroxy hydrogenphosphites of the general formula $$Ca_xAl_2(OH)_{2(x+2)}HPO_3 \cdot H_2O$$

where $x=2-8$ and $$Ca_xAl_2(OH)_{2(x+3-y)}(HPO_3)_y \cdot mH_2O$$

where $x=2-12$, $$\frac{2x+5}{2} > y > 0$$

and $m=0-12$, excluding $y=1$ when $x=2-8$, suitable for the inventive stabilizer combinations can be prepared, for example, by means of a process in which mixtures of calcium hydroxide and/or calcium oxide, aluminium hydroxide and sodium oxide, or of calcium hydroxide and/or calcium oxide and sodium aluminate are reacted with phosphorous acid in amounts corresponding to the preparation of the desired calcium aluminium hydroxy hydrogenphosphites in an aqueous medium, and the reaction product is removed and recovered in a manner known per se. The reaction product obtained directly from the reaction described above can be removed from the aqueous reaction medium by known processes, preferably, for example, by washing the filtercake with water and drying the washed residue at temperatures of, for example, 60-130° C., preferably 90-120° C.

For the reaction, it is possible to use either finely divided active aluminium hydroxide in combination with sodium hydroxide, or a sodium aluminate. Calcium may be used in the form of finely divided calcium oxide or calcium hydroxide or mixtures thereof. The phosphorous acid may be used in different concentrated form. The reaction temperatures are preferably between 50 and 100° C., more preferably between about 60 and 85° C. Catalysts or accelerants are not required, but are not disruptive. In the compounds, the water of crystallization can be removed completely or partly by thermal treatment.

When they are employed as stabilizers, the dried calcium aluminium hydroxy phosphites do not release any water at the processing temperatures of 160-200° C. which are customary, for example, for rigid PVC, so that no troublesome bubble formation occurs in the mouldings.

To improve their dispersibility in halogenated thermoplastic resins, the compounds can be coated with surfactants in a known manner. The compound class, also referred to as CHAP or CAP compounds, is described in EP 0,506,831 A1.

The above-described calcium aluminium hydroxo hydrogenphosphites and titanium-containing hydrotalcites may be present, apart from in crystalline form, also in partly crystalline and/or amorphous form.

Zeolites (Alkali Metal or Alkaline Earth Metal Aluminosilicates)

They may be described by the formula $M_{x/n}[(AlO_2)_x(SiO_2)_y] \cdot wH_2O$ in which n is the charge of the cation M; M is an element of the first or second main group, such as Li, Na, K or $NH_4$, and Mg, Ca, Sr or Ba; y:x is a number of 0.8 to 15, preferably of 0.8 to 1.2; and w is a number of 0 to 300, preferably of 0.5 to 30.

Examples of zeolites are sodium aluminosilicates of the formulae $Na_{12}Al_{12}Si_{12}O_{48}*27H_2O$ [zeolite A], $Na_6Al_6Si_6O_{24}*2NaX*7.5H_2O$, X=OH, halogen, $ClO_4$ [sodalite]; $Na_6Al_6Si_{30}O_{72}*24H_2O$; $ClO_4$ [Sodalith]; $Na_6Al_6Si_{30}O_{72}*24H_2O$; $Na_8Al_8Si_{40}O_{96}*24H_2O$; $Na_{16}Al_{16}Si_{24}O_{80}*16H_2O$; $Na_{16}Al_{16}Si_{32}O_{96}*16H_2O$; $Na_{56}Al_{56}Si_{136}O_{384}*250H_2O$ $Na_{56}Al_{56}Si_{136}O_{384}*250H_2O$ [zeolite Y], $Na_{86}Al_{86}Si_{106}O_{384}*264H_2O$ [zeolite X]; $Na_2O$, $Al_2O_3$, (2-5)$SiO_2$, (3.5-10)$H_2O$ [zeolite P]; $Na_2O$, $Al_2O_3$, $2SiO_2*(3.5-10)H_2O$ (zeolite MAP); or the zeolites preparable by partial or complete exchange of the sodium atoms for lithium, potassium, magnesium, calcium, strontium or zinc atoms, such as $(Na,K)_{10}Al_{10}Si_{22}O_{64}*20H_2O$; $Ca_{4.5}Na_3[(AlO_2)_{12}(SiO_2)_{12}]*30H_2O$; $K_9Na_3[(AlO_2)_{12}(SiO_2)_{12}]*27H_2O$. Very particular preference is given to Na zeolite A and Na zeolite MAP (see also PS-U.S. Pat. No. 6,531,533). Equally preferred are zeolites with an exceptionally small particle size, especially of the Na-A and Na—P type, as also described in PS-U.S. Pat. No. 6,096,820.

Dawsonites (Alkali Metal Aluminocarbonates)

These are described by the general formula $$M[Al(OH)_2CO_3](M=Na,K).$$

The preparation of Na dawsonite (DASC or SAC) and K dawsonites (DAPC) is published in PS-U.S. Pat. No. 3,501,264 and U.S. Pat. No. 4,221,771, and also in PS-EP 0394,670 A1. The synthesis can be effected hydrothermally or non-hydrothermally. The products may be present in crystalline or amorphous form. Also included in the substance class are sodium magnesium aluminocarbonates (SMACs); their preparation is described in PS-US 455,055,284.

The hydrotalcites and/or calcium aluminium hydroxo hydrogenphosphites and/or zeolites and/or dawsonites may be employed in amounts of, for example, 0.1 to 20 parts by weight, appropriately 0.1 to 10 parts by weight and especially 0.1 to 5 parts by weight, based on 100 parts by weight of halogenated polymer.

Glycidyl Compounds

They contain the glycidyl group

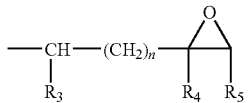

which is bonded directly to carbon, oxygen, nitrogen or sulphur atoms, and in which either $R_3$ and $R_5$ are both hydrogen, $R_4$ is hydrogen or methyl and $n=0$, or in which $R_3$ and $R_5$ together are —$CH_2$—$CH_2$— or —$CH_2$—$CH_2$—$CH_2$—, $R_4$ is then hydrogen and $n=0$ or 1.

I) Glycidyl and β-methylglycidyl esters obtainable by reacting a compound having at least one carboxyl group in the molecule and epichlorohydrin or glyceryl dichlorohydrin or β-methylepichlorohydrin. The reaction is effected appropriately in the presence of bases.

The compounds having at least one carboxyl group in the molecule employed may be aliphatic carboxylic acids. Examples of these carboxylic acids are glutaric acid, adipic acid, pimelic acid, suberic acid, azelaic acid, sebacic acid, or dimerized or trimerized linoleic acid, acrylic and methacrylic acid, caproic acid, caprylic acid, lauric acid, myristic acid, palmitic acid, stearic acid and pelargonic acid, and also the acids mentioned for the organic zinc compounds.

However, it is also possible to use cycloaliphatic carboxylic acids, for example cyclohexanecarboxylic acid, tetrahydrophthalic acid, 4-methyltetrahydrophthalic acid, hexahydrophthalic acid or 4-methylhexahydrophthalic acid.

In addition, it is possible to use aromatic carboxylic acids, for example benzoic acid, phthalic acid, isophthalic acid, trimellitic acid or pyromellitic acid.

It is likewise also possible to use carboxyl-terminated adducts, for example of trimellitic acid and polyols, for example glycerol or 2,2-bis(4-hydroxycyclohexyl)propane.

Further epoxide compounds usable in the context of this invention can be found in EP 0 506 617.

II) Glycidyl or β-methylglycidyl ethers obtainable by reacting a compound having at least one free alcoholic hydroxyl group and/or phenolic hydroxyl group with a suitably substituted epichlorohydrin under alkaline conditions, or in the presence of an acidic catalyst and subsequent alkali treatment.

Ethers of this type derive, for example, from acyclic alcohols, such as ethylene glycol, diethylene glycol and higher poly(oxyethylene)glycols, propane-1,2-diol, or poly(oxypropylene)glycols, propane-1,3-diol, butane-1,4-diol, poly(oxytetramethylene)glycols, pentane-1,5-diol, hexane-1,6-diol, hexane-2,4,6-triol, glycerol, 1,1,1-trimethylolpropane, bistrimethylolpropane, pentaerythritol, sorbitol, and also from polyepichlorohydrins, butanol, amyl alcohol, pentanol, and also from monofunctional alcohols such as isooctanol, 2-ethylhexanol, isodecanol, and also $C_7$-$C_9$-alkanol and $C_9$-$C_{11}$-alkanol mixtures.

However, they also derive, for example, from cycloaliphatic alcohols such as 1,3- or 1,4-dihydroxycyclohexane, bis(4-hydroxycyclohexyl)methane, 2,2-bis(4-hydroxycyclohexyl)-propane or 1,1-bis(hydroxymethyl)cyclohex-3-ene, or they have aromatic rings such as N,N-bis(2-hydroxyethyl)aniline or p,p'-bis(2-hydroxyethylamino)diphenylmethane.

The epoxide compounds may also derive from monocyclic phenols, for example from phenol, resorcinol or hydroquinone; or they are based on polycyclic phenols, for example bis(4-hydroxyphenyl)methane, 2,2-bis(4-hydroxyphenyl)propane, 2,2-bis(3,5-dibromo-4-hydroxyphenyl)propane, 4,4'-dihydroxydiphenyl sulphone, or condensation products, obtained under acidic conditions, of phenols with formaldehyde, such as phenol novolacs.

Further possible terminal epoxides are, for example: glycidyl 1-naphthyl ether, glycidyl 2-phenylphenyl ether, 2-biphenyl glycidyl ether, N-(2,3-epoxypropyl)phthalimide and 2,3-epoxypropyl 4-methoxyphenyl ether.

III) N-Glycidyl compounds obtainable by dehydrochlorinating the reaction products of epichlorohydrin with amines which contain at least one amino hydrogen atom. These amines are, for example, aniline, N-methylaniline, toluidine, n-butylamine, bis(4-aminophenyl)methane, m-xylylenediamine or bis(4-methylaminophenyl)methane, but also N,N,O-triglycidyl-m-aminophenol or N,N,O-triglycidyl-p-aminophenol.

However, the N-glycidyl compounds also include N,N'-di-, N,N',N"-tri- and N,N',N",N"'-tetraglycidyl derivatives of cycloalkyleneureas, such as ethyleneurea or 1,3-propyleneurea, and N,N'-diglycidyl derivatives of hydantoins, such as of 5,5-dimethylhydantoin or glycoluril and triglycidyl isocyanurate.

IV) S-Glycidyl compounds, for example di-S-glycidyl derivatives which derive from dithiols, for example ethane-1,2-dithiol or bis(4-mercaptomethylphenyl)ether.

V) Epoxide compounds having a radical of the above formula, in which $R_1$ and $R_3$ together are —$CH_2$—$CH_2$— and n is 0, are bis(2,3-epoxycyclopentyl)ether, 2,3-epoxycyclopentylglycidyl ether or 1,2-bis(2,3-epoxycyclopentyloxy)ethane. An epoxy resin with a radical of the above formula in which $R_1$ and $R_3$ together are —$CH_2$—$CH_2$— and n is 1 is, for example, (3',4'-epoxy-6'-methylcyclohexyl)methyl 3,4-epoxy-6-methylcyclohexanecarboxylate.

Suitable terminal epoxides are, for example:
a) liquid bisphenol A diglycidyl ethers such as Araldit®GY 240, Araldit®GY 250, Araldit®GY 260, Araldit®GY 266, Araldit®GY 2600, Araldit®MY 790 and Epicote® 828 (BADGE);
b) solid bisphenol A diglycidyl ethers such as Araldit®GT 6071, Araldit®GT 7071, Araldit®GT 7072, Araldit®GT 6063, Araldit®GT 7203, Araldit®GT 6064, Araldit®GT 7304, Araldit®GT 7004, Araldit®GT 6084, Araldit®GT 1999, Araldit®GT 7077, Araldit®GT 6097, Araldit®GT 7097, Araldit®GT 7008, Araldit®GT 6099, Araldit®GT 6608, Araldit®GT 6609, Araldit®GT 6610 and Epikote® 1002;
c) liquid bisphenol F diglycidyl ethers such as Araldit®GY 281, Araldit®PY 302, Araldit®PY 306 (BFDGE);
d) solid polyglycidyl ethers of tetraphenylethane, such as CG Epoxy Resin®0163;
e) solid and liquid polyglycidyl ethers of phenol-formaldehyde novolac, such as EPN 1138, EPN 1139, GY 1180, PY 307 (NODGE);
f) solid and liquid polyglycidyl ethers of o-cresol-formaldehyde novolac, such as ECN 1235, ECN 1273, ECN 1280, ECN 1299 (NODGE);
g) liquid glycidyl ethers of alcohols, such as Shell Glycidylether® 162, Araldit®DY 0390, Araldit®DY 0391;
h) liquid and solid glycidyl esters of carboxylic acids, such as Shell Cardura® E terephthalic esters, trimellitic esters and mixtures thereof, Araldit®PY 284 and Araldit®P811;
i) solid heterocyclic epoxy resins (triglycidyl isocyanurate) such as Araldit®PT 810;
j) liquid cycloaliphatic epoxy resins such as Araldit®CY 179;
k) liquid N,N,O-triglycidyl ethers of p-aminophenol, such as Araldit®MY 0510;

l) tetraglycidyl-4,4'-methylenebenzamine or N,N,N',N'-tetraglycidyldiaminophenyl-methane such as Araldit® MY 720, Araldit® MY 721.

Preference is given to using epoxide compounds having two functional groups. However, it is also possible in principle to use epoxide compounds having one, three or more functional groups.

Predominantly epoxide compounds, in particular diglycidyl compounds, having aromatic groups are used.

If appropriate, it is also possible to use a mixture of different epoxide compounds.

Particularly preferred terminal epoxide compounds are diglycidyl ethers based on bisphenols, for example on 2,2-bis(4-hydroxyphenyl)propane (bisphenol A), bis(4-hydroxyphenyl)methane or mixtures of bis(ortho/para-hydroxyphenyl)methane (bisphenol F).

The terminal epoxide compounds can be used in an amount of preferably at least 0.1 part, for example 0.1 to 50 parts, appropriately 1 to 30 parts and especially 1 to 25 parts by weight, based on 100 parts by weight of PVC.

Very particular preference is given to bisglycidyl alcohol ethers of the formula (D)

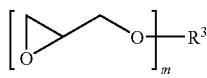
(D)

where
R$^3$=unbranched or branched C$_2$-C$_{20}$-alkylene which may be interrupted by 1 to 4 oxygen or sulphur atoms and/or may be substituted by 1 to 4 OH groups, or dimethylolcyclohexane-1,4-diyl, polyethylene (or -propylene)glycol-α,ω-diyl (preferably poly is tetra to deca), polyglyceryl-α,ω-diyl (preferably poly is tetra to deca) or glyceroltriyl, trimethylolethane (or -propane)triyl, pentaerythritoltri (or -tetra)yl, bistrimethylolethane (or -propane)tri (or -tetra)yl, diglyceroltri (or -tetra)yl, tetritoltetrayl, triglyceroltri (or -tetra, -penta)yl, pentitolpentayl, dipentaerythritolpenta (or -hexa)yl and hexitolhexayl;
and m=2, 3, 4, 5 or 6.

Also suitable are bisglycidyl alcohol ethers of alkanediols, diglycols, tri- and tetraglycols (glycol=ethylene glycol or propylene glycol) and polyglycols, and also of [118a] glycerol and polyglycerols, and also of 1,4-cyclohexanedimethanol [118b]. Tris(epoxypropyl alcohol ethers) of [119a] glycerol and [120a, 121a] trimethylolethane(-propane) and also of [121b, 121c] triethylol(-isopropylol) isocyanurate (THEIC) and tetrakis(epoxypropyl alcohol ethers) of [122a, 123a] bis(trimethylolethane(-propane)) and hexakis(epoxypropyl alcohol ethers) of [124a] dipentaerythritol and [125a] sorbitol. Particular mention should be made of [126a] hexanediol diglycidyl ether and [127a] neopentyl glycol diglycidyl ether, and also [128a]ethylene glycol diglycidyl ether, [129] diethylene glycol diglycidyl ether and [130] dipropylene glycol diglycidyl ether, and also polyglycerol diglycidyl ether, [131] diglycerol diglycidyl ether, [132] triglycerol diglycidyl ether, [133] tetraglycerol diglycidyl ether and [134] pentaglycerol diglycidyl ether, [135] 1,4-butanediol diglycidyl ether, [136, 137] trimethylolethane(propane) diglycidyl ether, and [138, 139] pentaerythritol tri- and tetraglycidyl ether and polyglycerol triglycidyl ether. Preference is given to [118a], [118b], [119a], [120a], [121a], [126a], [127a], [128a], [129], [130], [131], [132], [133], [134], [135], [136], [137], [138] and [139]. Particular preference is given to [118a], [188b], [119a], [120a], [121a], [126a], [127a], [128a], [129], [130], [135], [136], [137], [138] and [139]. Very particular preference is given to [118a], [188b], [119a], [120a], [121a], [126a], [135], [136], [137], [138] and [139]. Many compounds in this series are produced as "bulk" chemicals.

Epoxidized Fatty Acid Esters and Other Epoxide Compounds

The inventive stabilizer combination may additionally preferably comprise at least one epoxidized fatty acid ester. Useful for this purpose are in particular esters of fatty acids from natural sources (fatty acid glycerides), such as soybean oil or rapeseed oil. However, it is also possible to use synthetic products such as epoxidized butyl oleate. It is likewise possible to use epoxidized polybutadiene and polyisoprene, optionally also in partially hydroxylated form, or glycidyl acrylate and glycidyl methacrylate, as a homo- or copolymer. These epoxy compounds may also be applied to an alumino salt compound; on this subject, see also DE 4,031,818 A1.

Liquid or highly viscous glycidyl or epoxide compounds may also be attached to silica- or silicate-containing supports and be used in a solid, non-tacky form.

Phenol Compounds

This category includes phenols and aminophenols, such as resorcinol, resorcinol monomethyl ether, phloroglucinol, 2-naphthol, 3-hydroxyaniline and 3-hydroxydiphenylamine.

Inventive stabilizer systems preferably comprise

Cyanamide Compounds of the Formula (E)

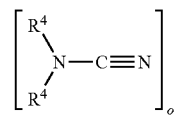
(E)

where
R$^4$ are each independently H, nitrile, carbamoyl, R$^1$, R$^2$, R$^1$CO, R$^2$CO, Na, K, Mg$_{1/2}$ and Ca$_{1/2}$ or R$_2^4$=tetra-, penta- or hexamethylene, and o=1, 2 or 3.

(E) Monomeric cyanamides: [140] cyanamide and its salts, especially [141] calcium cyanamide, [142] monomethylcyanamide, [143] monoethylcyanamide, [144] monopropylcyanamide, [145] monobutylcyanamide, [146] monopentylcyanamide, [147] monohexylcyanamide, [148] monoheptylcyanamide, [149] monooctylcyanamide, [150] monophenylcyanamide and [151] monobenzylcyanamide, and also [152] monoallylcyanamide.

[153] 1,1-dimethylcyanamide, [154] 1,1-diethylcyanamide, [155] 1,1-dipropylcyanamide, [156] 1,1-dibutylcyanamide, [157] 1,1-dipentylcyanamide, [158] 1,1-dihexylcyanamide, [159] 1,1-diheptylcyanamide, [160] 1,1-dioctylcyanamide, [161] 1,1-diphenylcyanamide, and also [162] 1,1-dibenzylcyanamide and [163] 1,1-diallylcyanamide.

[164] Acetylcyanamide, [165] propionylcyanamide, [166] butyroylcyanamide, [167] pentanoylcyanamide, [168] hexanoylcyanamide, [169] heptanoylcyanamide, [170] octanoylcyanamide, [171] nonanoylcyanamide, [172] decanoylcyanamide, [173] undecanoylcyanamide, [174] dodecanoylcyanamide, [175] tridecanoylcyanamide, [176] tetradecanoylcyanamide, [177] pentadecanoylcyanamide, [178] hexadecanoylcyanamide, [179] heptadecanoylcyanamide, [180] octadecanoylcyanamide, [181] nonadecanoylcyanamide, [182] eicosanoylcyanamide, [183] benzoylcyanamide, and also [184] tetradecyl-cyanamide, [185] hexadecylcyanamide and [186] octadecylcyanamide. Since cyanamides/cyanamide derivatives in the course of PVC processing tend to decompose under some circumstances, preliminary compounding in a hot mixer is advisable in the case of reactive representatives.

(E) Dimers: [187] dicyandiamide and its substitution products and salts thereof. Preference is given to unsubstituted dicyandiamide.

(E) Trimers: melamines/melamine salts, such as [188] melamine, [189] melamine perchlorate, [190] melamine oxalate, [191] melamine sulphate, [192] melamine nitrate, [193] melamine(pyro, poly)phosphate, melamine borate and [194] melamine isocyanurate. Preference is given to [188], [189], [193] and [194].

N-substituted melamines, such as [195] N-monobutylmelamine, [196] N-monooctyl-melamine, [197] N-monodecylmelamine, [198] N-monododecylmelamine, [199] N-mono-tetradecylmelamine, [200] N-monohexadecylmelamine, [201] N-monooctadecylmelamine, [202] N-monophenylmelamine. And also [203] N-monoacetylmelamine, [204] N-mono-propionylmelamine and [205] N-monobutyroylmelamine, [206] N-monophenylmelamine, [207] N-monoallylmelamine and [208] N-monobenzylmelamine, [209] o-hydroxyphenyl-melamine and [210, 211] 2-hydroxyethyl(propyl)melamine.

N,N'-substituted melamines, such as [212] N,N'-dibutylmelamine, [213] N,N'-dioctyl-melamine, [214] N,N'-didecylmelamine, [215] N,N'-dihexadecylmelamine, and also [216] N,N'-dioctadecylmelamine and [217, 218] N,N'-bis-2-hydroxyethyl(propyl)melamine.

N,N',N''-substituted melamines such as [219] N,N',N''-tributylmelamine, [220] N,N',N''-trioctylmelamine, [221] N,N',N''-tridecylmelamine, [222] N,N',N''-tetradecylmelamine, [223] N,N',N''-trihexadecylmelamine and [224] N,N',N''-trioctadecylmelamine, and also [225] N,N',N''-phenylbis(hydroxyethyl)melamine and [226] N,N',N''-tris(hydroxyethyl)melamine, [227] N,N',N''-triacetylmelamine, [228] N,N',N''-tripropionylmelamine, [229] N,N',N''-tribenzoylmelamine, and also [230] N,N',N''-triallylmelamine and [231] N,N',N''-tribenzyl-melamine, [232] N,N',N''-triphenylmelamine and [233] N,N',N''-tricyclohexylmelamine, [234] N,N',N''-tris(hydroxypropyl)melamine, and [235] N,N',N''-phenylbis(hydroxypropyl)melamine.

Preference is given to the substances [141], [142], [143], [144], [150], [151], [153], [154], [155], [159], [162], [163], [164], [176], [178], [184], [185] and [186], [187] and [188]. Also preferred are [206], [207], [208], [209], [210], [211]. Likewise preferred are [217, 218], [226], [227], [228], [229], [230] and [231].

Particular preference is given to [187], [188], [209], [210] and [211]. Also particularly preferred are [226], [227], [228], [229], [230] and [231]. Very particular preference is given to [141], [187], [188] and [194] in micronized form (particle size <50 μm).

Likewise is very particularly preferred. the calcium and magnesium salt of [187], [188] or [194] are so-called "commodities". The calcium and magnesium salts can also be synthesized "in situ" during the PVC processing or beforehand in the course of formulation or compounding from magnesium hydroxide or calcium hydroxide. To lower the melting point of [187], eutectic mixtures with N,N'-disubstituted (thio)ureas or aniline derivatives or with aminobenzenesulphonamides are particularly preferred.

5. Preferred two-substance or multisubstance combinations of at least one HCl scavenger (SCV)+at least one booster (A) are*:

[232] $CaH(u)^{5)}$ with [A-1], [A-2], [A-3], [A-4] and [A-5]
[233] $CaH(c)^{6)}$ with [A-1], [A-2], [A-3], [A-4] and [A-5]
[234] $MgH^{11)}$ with [A-1], [A-2], [A-3], [A-4] and [A-5]
[235] $CaAcac^{12)}$ with [A-1], [A-2], [A-3], [A-4] and [A-5]
[236] $MgAcac^{13)}$ with [A-1], [A-2], [A-3], [A-4] and [A-5]
[237] $CaSt^{38)}$ with [A-1], [A-2], [A-3], [A-4] and [A-5]
[238] $MgSt^{37)}$ with [A-1], [A-2], [A-3], [A-4] and [A-5]
[239] $Hytal^{7)}$ with [A-1], [A-2], [A-3], [A-4] and [A-5]
[240] $NaZA^{10)}$ with [A-1], [A-2], [A-3], [A-4] and [A-5]
[241] $HEXDGE^{29)}$ with [A-1], [A-2], [A-3], [A-4] and [A-5]
[241a] c-$HEXDGE^{29a)}$ with [A-1], [A-2], [A-3], [A-4] and [A-5]
[242] $BADGE^{25)}$ with [A-1], [A-2], [A-3], [A-4] and [A-5]
[243] $BFDGE^{26)}$ with [A-1], [A-2], [A-3], [A-4] and [A-5]
[244] $Glydi^{30)}$ with [A-1], [A-2], [A-3], [A-4] and [A-5]
[245] $Glytri^{31)}$ with [A-1], [A-2], [A-3], [A-4] and [A-5]
[246] $ESBO^{57)}$ with [A-1], [A-2], [A-3], [A-4] and [A-5]
[247] $DCN^{20)}$ with [A-1], [A-2], [A-3], [A-4] and [A-5]
[248] $Mel^{23)}$ with [A-1], [A-2], [A-3], [A-4] and [A-5]
[249] $ACEGA^{24)}$ with [A-1], [A-2], [A-3], [A-4] and [A-5]
[250] $TEPC^{32)}$ with [A-1], [A-2], [A-3], [A-4] and [A-5]
[251] $Cardura^{35)}$ with [A-1], [A-2], [A-3], [A-4] and [A-5]

very particular preference being given to the combinations in [232], [233], [241], [241a] and [248], in each case with [A-1].
* for footnotes and abbreviations, see patent examples, application technology 6. Likewise preferred are three-substance or multisubstance combinations of at least two different scavengers (SCV) and at least one booster (A):

[232a] $CaH(u)^{5)}$ with $Mel^{23)}$ and [A-1], [A-2], [A-3], [A-4] and [A-5]
[233a] $CaH(c)^{6)}$ with $Mel^{23)}$ and [A-1], [A-2], [A-3], [A-4] and [A-5]
[233b] $CaH(c)^{6)}$ with $CaSt^{38)}$ and [A-1], [A-2], [A-3], [A-4] and [A-5]

very particular preference being given to the combination in [232a] with [A-1].

7. Particular preference is given to three-substance or multisubstance combinations of at least one initial colour improver (ICI) from compound classes (B-1), (B-2), (C-1), (C-2) with at least one scavenger (SCV) and at least one booster (A):

[252] $CADMU^{44)}$ with $CaH(u)^{5)}$ and [A-1], [A-2], [A-3], [A-4] and [A-5]
[253] $CADMU^{44)}$ with $CaH(c)^{6)}$ and [A-1], [A-2], [A-3], [A-4] and [A-5]
[254] $CADMU^{44)}$ with $MgH^{11)}$ and [A-1], [A-2], [A-3], [A-4] and [A-5]
[255] $CADMU^{44)}$ with $CaAcac^{12)}$ and [A-1], [A-2], [A-3], [A-4] and [A-5]
[256] $CADMU^{44)}$ with $MgAcac^{13)}$ and [A-1], [A-2], [A-3], [A-4] and [A-5]
[257] $CADMU^{44)}$ with $CaSt^{38)}$ and [A-1], [A-2], [A-3], [A-4] and [A-5]
[258] $CADMU^{44)}$ with $MgSt^{37)}$ and [A-1], [A-2], [A-3], [A-4] and [A-5]
[259] $CADMU^{44)}$ with $Hytal^{7)}$ and [A-1], [A-2], [A-3], [A-4] and [A-5]
[260] $CADMU^{44)}$ with $NaZA^{10)}$ and [A-1], [A-2], [A-3], [A-4] and [A-5]
[261] $CADMU^{44)}$ with $HEXDGE^{29)}$ and [A-1], [A-2], [A-3], [A-4] and [A-5]
[261a] $CADMU^{44)}$ with c-$HEXDGE^{29a)}$ and [A-1], [A-2], [A-3], [A-4] and [A-5]
[262] $CADMU^{44)}$ with $BADGE^{25)}$ and [A-1], [A-2], [A-3], [A-4] and [A-5]

[263] CADMU[44)] with BFDGE[26)] and [A-1], [A-2], [A-3], [A-4] and [A-5]
[264] CADMU[44)] with Glydi[30)] and [A-1], [A-2], [A-3], [A-4] and [A-5]
[265] CADMU[44)] with Glytri[31)] and [A-1], [A-2], [A-3], [A-4] and [A-5]
[266] CADMU[44)] with ESBO[57)] and [A-1], [A-2], [A-3], [A-4] and [A-5]
[267] CADMU[44)] with DCN[20)] and [A-1], [A-2], [A-3], [A-4] and [A-5]
[268] CADMU[44)] with Mel[23)] and [A-1], [A-2], [A-3], [A-4] and [A-5]
[269] CADMU[44)] with ACEGA[24)] and [A-1], [A-2], [A-3], [A-4] and [A-5]
[270] CADMU[44)] with TEPC[32)] and [A-1], [A-2], [A-3], [A-4] and [A-5]
[271] CADMU[44)] with Cardura[35)] and [A-1], [A-2], [A-3], [A-4] and [A-5]

very particular preference being given to [252], [253], [261], [261a] and [268]. Emphasis is given here to the combinations with [A-1].

[272] DMAU[43)] with CaH(u)[5)] and [A-1], [A-2], [A-3], [A-4] and [A-5]
[273] DMAU[43)] with CaH(c)[6)] and [A-1], [A-2], [A-3], [A-4] and [A-5]
[274] DMAU[43)] with MgH[11)] and [A-1], [A-2], [A-3], [A-4] and [A-5]
[275] DMAU[43)] with CaAcac[12)] and [A-1], [A-2], [A-3], [A-4] and [A-5]
[276] DMAU[43)] with MgAcac[13)] and [A-1], [A-2], [A-3], [A-4] and [A-5]
[277] DMAU[43)] with CaSt[38)] and [A-1], [A-2], [A-3], [A-4] and [A-5]
[278] DMAU[43)] with MgSt[37)] and [A-1], [A-2], [A-3], [A-4] and [A-5]
[279] DMAU[43)] with Hytal[7)] and [A-1], [A-2], [A-3], [A-4] and [A-5]
[280] DMAU[43)] with NaZA[10)] and [A-1], [A-2], [A-3], [A-4] and [A-5]
[281] DMAU[43)] with HEXDGE[29)] and [A-1], [A-2], [A-3], [A-4] and [A-5]
[281a] DMAU[43)] with c-HEXDGE[29a)] and [A-1], [A-2], [A-3], [A-4] and [A-5]
[282] DMAU[43)] with BADGE[25)] and [A-1], [A-2], [A-3], [A-4] and [A-5]
[283] DMAU[43)] with BFDGE[26)] and [A-1], [A-2], [A-3], [A-4] and [A-5]
[284] DMAU[43)] with Glydi[30)] and [A-1], [A-2], [A-3], [A-4] and [A-5]
[285] DMAU[43)] with Glytri[31)] and [A-1], [A-2], [A-3], [A-4] and [A-5]
[286] DMAU[43)] with ESBO[57)] and [A-1], [A-2], [A-3], [A-4] and [A-5]
[287] DMAU[43)] with DCN[20)] and [A-1], [A-2], [A-3], [A-4] and [A-5]
[288] DMAU[43)] with Mel[23)] and [A-1], [A-2], [A-3], [A-4] and [A-5]
[289] DMAU[43)] with ACEGA[24)] and [A-1], [A-2], [A-3], [A-4] and [A-5]
[290] DMAU[43)] with TEPC[32)] and [A-1], [A-2], [A-3], [A-4] and [A-5]
[291] DMAU[43)] with Cardura[35)] and [A-1], [A-2], [A-3], [A-4] and [A-5]

very particular preference being given to [272], [273], [281], [281a] and [288].

Emphasis is given here to the combinations with [A-1].
[292] AC-1[41)] with CaH(u)[5)] and [A-1], [A-2], [A-3], [A-4] and [A-5]
[293] AC-1[41)] with CaH(c)[6)] and [A-1], [A-2], [A-3], [A-4] and [A-5]
[294] AC-1[41)] with MgH[11)] and [A-1], [A-2], [A-3], [A-4] and [A-5]
[295] AC-1[41)] with CaAcac[12)] and [A-1], [A-2], [A-3], [A-4] and [A-5]
[296] AC-1[41)] with MgAcac[13)] and [A-1], [A-2], [A-3], [A-4] and [A-5]
[297] AC-1[41)] with CaSt[38)] and [A-1], [A-2], [A-3], [A-4] and [A-5]
[298] AC-1[41)] with MgSt[37)] and [A-1], [A-2], [A-3], [A-4] and [A-5]
[299] AC-1[41)] with Hytal[7)] and [A-1], [A-2], [A-3], [A-4] and [A-5]
[300] AC-1[41)] with NaZA[10)] and [A-1], [A-2], [A-3], [A-4] and [A-5]
[301] AC-1[41)] with HEXDGE[29)] and [A-1], [A-2], [A-3], [A-4] and [A-5]
[301a] AC-1[41)] with c-HEXDGE[29a)] and [A-1], [A-2], [A-3], [A-4] and [A-5]
[302] AC-1[41)] with BADGE[25)] and [A-1], [A-2], [A-3], [A-4] and [A-5]
[303] AC-1[41)] with BFDGE[26)] and [A-1], [A-2], [A-3], [A-4] and [A-5]
[304] AC-1[41)] with Glydi[30)] and [A-1], [A-2], [A-3], [A-4] and [A-5]
[305] AC-1[41)] with Glytri[31)] and [A-1], [A-2], [A-3], [A-4] and [A-5]
[306] AC-1[41)] with ESBO[57)] and [A-1], [A-2], [A-3], [A-4] and [A-5]
[307] AC-1[41)] with DCN[20)] and [A-1], [A-2], [A-3], [A-4] and [A-5]
[308] AC-1[41)] with Mel[23)] and [A-1], [A-2], [A-3], [A-4] and [A-5]
[309] AC-1[41)] with ACEGA[24)] and [A-1], [A-2], [A-3], [A-4] and [A-5]
[310] AC-1[41)] with TEPC[32)] and [A-1], [A-2], [A-3], [A-4] and [A-5]
[311] AC-1[41)] with Cardura[35)] and [A-1], [A-2], [A-3], [A-4] and [A-5]

very particular preference being given to [292], [293], [301], [301a] and [308].

Emphasis is given here to the combinations with [A-1].
[312] AC-2[42)] with CaH(u)[5)] and [A-1], [A-2], [A-3], [A-4] and [A-5]
[313] AC-2[42)] with CaH(c)[6)] and [A-1], [A-2], [A-3], [A-4] and [A-5]
[314] AC-2[42)] with MgH[11)] and [A-1], [A-2], [A-3], [A-4] and [A-5]
[315] AC-2[42)] with CaAcac[12)] and [A-1], [A-2], [A-3], [A-4] and [A-5]
[316] AC-2[42)] with MgAcac[13)] and [A-1], [A-2], [A-3], [A-4] and [A-5]
[317] AC-2[42)] with CaSt[38)] and [A-1], [A-2], [A-3], [A-4] and [A-5]
[318] AC-2[42)] with MgSt[37)] and [A-1], [A-2], [A-3], [A-4] and [A-5]
[319] AC-2[42)] with Hytal[7)] and [A-1], [A-2], [A-3], [A-4] and [A-5]
[320] AC-2[42)] with NaZA[10)] and [A-1], [A-2], [A-3], [A-4] and [A-5]
[321] AC-2[42)] with HEXDGE[29)] and [A-1], [A-2], [A-3], [A-4] and [A-5]

[321a] AC-2[42)] with c-HEXDGE[29a)] and [A-1], [A-2], [A-3], [A-4] and [A-5]
[322] AC-2[42)] with BADGE[25)] and [A-1], [A-2], [A-3], [A-4] and [A-5]
[323] AC-2[42)] with BFDGE[26)] and [A-1], [A-2], [A-3], [A-4] and [A-5]
[324] AC-2[42)] with Glydi[30)] and [A-1], [A-2], [A-3], [A-4] and [A-5]
[325] AC-2[42)] with Glytri[31)] and [A-1], [A-2], [A-3], [A-4] and [A-5]
[326] AC-2[42)] with ESBO[57)] and [A-1], [A-2], [A-3], [A-4] and [A-5]
[327] AC-2[42)] with DCN[20)] and [A-1], [A-2], [A-3], [A-4] and [A-5]
[328] AC-2[42)] with Mel[23)] and [A-1], [A-2], [A-3], [A-4] and [A-5]
[329] AC-2[42)] with ACEGA[24)] and [A-1], [A-2], [A-3], [A-4] and [A-5]
[330] AC-2[42)] with TEPC[32)] and [A-1], [A-2], [A-3], [A-4] and [A-5]
[331] AC-2[42)] with Cardura[35)] and [A-1], [A-2], [A-3], [A-4] and [A-5]

very particular preference being given to [312], [313], [321], [321a] and [328].

Emphasis is given here to the combinations with [A-1].
[332] M-DHP-1 with CaH(u)[5)] and [A-1], [A-2], [A-3], [A-4] and [A-5]
[333] M-DHP-1[46)] with CaH(c)[6)] and [A-1], [A-2], [A-3], [A-4] and [A-5]
[334] M-DHP-1[46)] with MgH[11)] and [A-1], [A-2], [A-3], [A-4] and [A-5]
[335] M-DHP-1[46)] with CaAcac[12)] and [A-1], [A-2], [A-3], [A-4] and [A-5]
[336] M-DHP-1[46)] with MgAcac[13)] and [A-1], [A-2], [A-3], [A-4] and [A-5]
[337] M-DHP-1[46)] with CaSt[13)] and [A-1], [A-2], [A-3], [A-4] and [A-5]
[338] M-DHP-1[46)] with MgSt[37)] and [A-1], [A-2], [A-3], [A-4] and [A-5]
[339] M-DHP-1[46)] with Hytal[7)] and [A-1], [A-2], [A-3], [A-4] and [A-5]
[340] M-DHP-1[46)] with NaZA[10)] and [A-1], [A-2], [A-3], [A-4] and [A-5]
[341] M-DHP-1[46)] with HEXDGE[29)] and [A-1], [A-2], [A-3], [A-4] and [A-5]
[341a] M-DHP-1[46)] with c-HEXDGE[29a)] and [A-1], [A-2], [A-3], [A-4] and [A-5]
[342] M-DHP-1[46)] with BADGE[25)] and [A-1], [A-2], [A-3], [A-4] and [A-5]
[343] M-DHP-1[46)] with BFDGE[26)] and [A-1], [A-2], [A-3], [A-4] and [A-5]
[344] M-DHP-1[46)] with Glydi[30)] and [A-1], [A-2], [A-3], [A-4] and [A-5]
[345] M-DHP-1[46)] with Glytri[31)] and [A-1], [A-2], [A-3], [A-4] and [A-5]
[346] M-DHP-1[46)] with ESBO[57)] and [A-1], [A-2], [A-3], [A-4] and [A-5]
[347] M-DHP-1[46)] with DCN[20)] and [A-1], [A-2], [A-3], [A-4] and [A-5]
[348] M-DHP-1[46)] with Mel[23)] and [A-1], [A-2], [A-3], [A-4] and [A-5]
[349] M-DHP-1[46)] with ACEGA[24)] and [A-1], [A-2], [A-3], [A-4] and [A-5]
[350] M-DHP-1[46)] with TEPC[32)] and [A-1], [A-2], [A-3], [A-4] and [A-5]
[351] M-DHP-1[46)] with Cardura[35)] and [A-1], [A-2], [A-3], [A-4] and [A-5]

very particular preference being given to [332], [333], [341], [341a] and [348].

Emphasis is given here to the combinations with [A-1].
[352] M-DHP-2[47)] with CaH(u)[5)] and [A-1], [A-2], [A-3], [A-4] and [A-5]
[353] M-DHP-2[47)] with CaH(c)[6)] and [A-1], [A-2], [A-3], [A-4] and [A-5]
[354] M-DHP-2[47)] with MgH[11)] and [A-1], [A-2], [A-3], [A-4] and [A-5]
[355] M-DHP-2[47)] with CaAcac[12)] and [A-1], [A-2], [A-3], [A-4] and [A-5]
[356] M-DHP-2[47)] with MgAcac[13)] and [A-1], [A-2], [A-3], [A-4] and [A-5]
[357] M-DHP-2[47)] with CaSt[38)] and [A-1], [A-2], [A-3], [A-4] and [A-5]
[358] M-DHP-2[47)] with MgSt[37)] and [A-1], [A-2], [A-3], [A-4] and [A-5]
[359] M-DHP-2[47)] with Hytal[7)] and [A-1], [A-2], [A-3], [A-4] and [A-5]
[360] M-DHP-2[47)] with NaZA[10)] and [A-1], [A-2], [A-3], [A-4] and [A-5]
[361] M-DHP-2[47)] with HEXDGE[29)] and [A-1], [A-2], [A-3], [A-4] and [A-5]
[361a] M-DHP-2[47)] with c-HEXDGE[29a)] and [A-1], [A-2], [A-3], [A-4] and [A-5]
[362] M-DHP-2[47)] with BADGE[25)] and [A-1], [A-2], [A-3], [A-4] and [A-5]
[363] M-DHP-2[47)] with BFDGE[26)] and [A-1], [A-2], [A-3], [A-4] and [A-5]
[364] M-DHP-2[47)] with Glydi[30)] and [A-1], [A-2], [A-3], [A-4] and [A-5]
[365] M-DHP-2[47)] with Glytri[31)] and [A-1], [A-2], [A-3], [A-4] and [A-5]
[366] M-DHP-2[47)] with ESBO[57)] and [A-1], [A-2], [A-3], [A-4] and [A-5]
[367] M-DHP-2[47)] with DCN[20)] and [A-1], [A-2], [A-3], [A-4] and [A-5]
[368] M-DHP-2[47)] with Mel[23)] and [A-1], [A-2], [A-3], [A-4] and [A-5]
[369] M-DHP-2[47)] with ACEGA[24)] and [A-1], [A-2], [A-3], [A-4] and [A-5]
[370] M-DHP-2[47)] with TEPC[32)] and [A-1], [A-2], [A-3], [A-4] and [A-5]
[371] M-DHP-2[47)] with Cardura[35)] and [A-1], [A-2], [A-3], [A-4] and [A-5]

very particular preference being given to [352], [353], [361], [361a] and [368].

Emphasis is given here to the combinations with [A-1].
[372] P-DHP[54)] with CaH(u)[5)] and [A-1], [A-2], [A-3], [A-4] and [A-5]
[373] P-DHP[54)] with CaH(c)[6)] and [A-1], [A-2], [A-3], [A-4] and [A-5]
[374] P-DHP[54)] with MgH[11)] and [A-1], [A-2], [A-3], [A-4] and [A-5]
[375] P-DHP[54)] with CaAcac[12)] and [A-1], [A-2], [A-3], [A-4] and [A-5]
[376] P-DHP[54)] with MgAcac[13)] and [A-1], [A-2], [A-3], [A-4] and [A-5]
[377] P-DHP[54)] with CaSt[38)] and [A-1], [A-2], [A-3], [A-4] and [A-5]
[378] P-DHP[54)] with MgSt[37)] and [A-1], [A-2], [A-3], [A-4] and [A-5]

[379] P-DHP[54)] with Hytal[7)] and [A-1], [A-2], [A-3], [A-4] and [A-5]
[380] P-DHP[54)] with NaZA[10)] and [A-1], [A-2], [A-3], [A-4] and [A-5]
[381] P-DHP[54)]) with HEXDGE[29)] and [A-1], [A-2], [A-3], [A-4] and [A-5]
[381a] P-DHP[54)] with c-HEXDGE[9a)] and [A-1], [A-2], [A-3], [A-4] and [A-5]
[382] P-DHP[54)] with BADGE[25)] and [A-1], [A-2], [A-3], [A-4] and [A-5]
[383] P-DHP[54)] with BFDGE[26)] and [A-1], [A-2], [A-3], [A-4] and [A-5]
[384] P-DHP[54)] with Glydi[30)] and [A-1], [A-2], [A-3], [A-4] and [A-5]
[385] P-DHP[54)] with Glytri[31)] and [A-1], [A-2], [A-3], [A-4] and [A-5]
[386] P-DHP[54)] with ESBO[57)] and [A-1], [A-2], [A-3], [A-4] and [A-5]
[387] P-DHP[54)] with DCN[20)] and [A-1], [A-2], [A-3], [A-4] and [A-5]
[388] P-DHP[54)] with Mel[23)] and [A-1], [A-2], [A-3], [A-4] and [A-5]
[389] P-DHP[54)] with ACEGA[24)] and [A-1], [A-2], [A-3], [A-4] and [A-5]
[390] P-DHP[54)] with TEPC[32)] and [A-1], [A-2], [A-3], [A-4] and [A-5]
[391] P-DHP[54)] with Cardura[35)] and [A-1], [A-2], [A-3], [A-4] and [A-5]

very particular preference being given to [372], [373], [381], [381a] and [388].

Emphasis is given here to the combinations with [A-1].

[392] Naf[45)] with CaH(u)[5)] and [A-1], [A-2], [A-3], [A-4] and [A-5]
[393] Naf[45)] with CaH(c)[6)] and [A-1], [A-2], [A-3], [A-4] and [A-5]
[394] Naf[45)] with MgH[11)] and [A-1], [A-2], [A-3], [A-4] and [A-5]
[395] Naf[45)] with CaAcac[12)] and [A-1], [A-2], [A-3], [A-4] and [A-5]
[396] Naf[45)] with MgAcac[13)] and [A-1], [A-2], [A-3], [A-4] and [A-5]
[397] Naf[45)] with CaSt[38)] and [A-1], [A-2], [A-3], [A-4] and [A-5]
[398] Naf[45)] with MgSt[37)] and [A-1], [A-2], [A-3], [A-4] and [A-5]
[399] Naf[45)] with Hytal[7)] and [A-1], [A-2], [A-3], [A-4] and [A-5]
[400] Naf[45)] with NaZA[10)] and [A-1], [A-2], [A-3], [A-4] and [A-5]
[401] Naf[45)] with HEXDGE[29)] and [A-1], [A-2], [A-3], [A-4] and [A-5]
[401a] Naf[45)] with c-HEXDGE[29a)] and [A-1], [A-2], [A-3], [A-4] and [A-5]
[402] Naf[45)] with BADGE[25)] and [A-1], [A-2], [A-3], [A-4] and [A-5]
[403] Naf[45)] with BFDGE[26)] and [A-1], [A-2], [A-3], [A-4] and [A-5]
[404] Naf[45)] with Glydi[30)] and [A-1], [A-2], [A-3], [A-4] and [A-5]
[405] Naf[45)] with Glytri[31)] and [A-1], [A-2], [A-3], [A-4] and [A-5]
[406] Naf[45)] with ESBO[57)] and [A-1], [A-2], [A-3], [A-4] and [A-5]
[407] Naf[45)] with DCN[20)] and [A-1], [A-2], [A-3], [A-4] and [A-5]
[408] Naf[45)] with Mel[23)] and [A-1], [A-2], [A-3], [A-4] and [A-5]
[409] Naf[45)] with ACEGA[24)] and [A-1], [A-2], [A-3], [A-4] and [A-5]
[410] Naf[45)] with TEPC[32)] and [A-1], [A-2], [A-3], [A-4] and [A-5]
[411] Naf[45)] with Cardura[35)] and [A-1], [A-2], [A-3], [A-4] and [A-5]

very particular preference being given to [392], [393], [401], [401a] and [408].

Emphasis is given here to the combinations with [A-1].

[412] Hyd[56)] with CaH(u)[5)] and [A-1], [A-2], [A-3], [A-4] and [A-5]
[413] Hyd[56)] with CaH(c)[6)] and [A-1], [A-2], [A-3], [A-4] and [A-5]
[414] Hyd[56)] with MgH[11)] and [A-1], [A-2], [A-3], [A-4] and [A-5]
[415] Hyd[56)] with CaAcac[12)] and [A-1], [A-2], [A-3], [A-4] and [A-5]
[416] Hyd[56)] with MgAcac[13)] and [A-1], [A-2], [A-3], [A-4] and [A-5]
[417] Hyd[56)] with CaSt[38)] and [A-1], [A-2], [A-3], [A-4] and [A-5]
[418] Hyd[56)] with MgSt[37)] and [A-1], [A-2], [A-3], [A-4] and [A-5]
[419] Hyd[56)] with Hytal[7)] and [A-1], [A-2], [A-3], [A-4] and [A-5]
[420] Hyd[56)] with NaZA[10)] and [A-1], [A-2], [A-3], [A-4] and [A-5]
[421] Hyd[56)] with HEXDGE[29)] and [A-1], [A-2], [A-3], [A-4] and [A-5]
[421a] Hyd[56)] with c-HEXDGE[29a)] and [A-1], [A-2], [A-3], [A-4] and [A-5]
[422] Hyd[56)] with BADGE[25)] and [A-1], [A-2], [A-3], [A-4] and [A-5]
[423] Hyd[56)] with BFDGE[26)] and [A-1], [A-2], [A-3], [A-4] and [A-5]
[424] Hyd[56)] with Glydi[30)] and [A-1], [A-2], [A-3], [A-4] and [A-5]
[425] Hyd[56)] with Glytri[31)] and [A-1], [A-2], [A-3], [A-4] and [A-5]
[426] Hyd[56)] with ESBO[57)] and [A-1], [A-2], [A-3], [A-4] and [A-5]
[427] Hyd[56)] with DCN[20)] and [A-1], [A-2], [A-3], [A-4] and [A-5]
[428] Hyd[56)] with Mel[23)] and [A-1], [A-2], [A-3], [A-4] and [A-5]
[429] Hyd[56)] with ACEGA[24)] and [A-1], [A-2], [A-3], [A-4] and [A-5]
[430] Hyd[56)] with TEPC[32)] and [A-1], [A-2], [A-3], [A-4] and [A-5]
[431] Hyd[56)] with Cardura[35)] and [A-1], [A-2], [A-3], [A-4] and [A-5]

very particular preference being given to [412], [413], [421], [421a] and [428].

Emphasis is given here to the combinations with [A-1].

It will be appreciated that it is also possible to combine one or more ICIs with one or more SCVs and one or more [A]s. The following combinations of this type, which are very particularly preferred, are specified:

8. Mixtures of (B-1) with (E)/CaH or CaSt and [A-1]

[432] DMAU[43)] with Mel[23)]/CaH(u)[5)] and [A-1]
[433] DMAU[43)] with Mel[23)]/CaH(c)[6)] and [A-1]
[434] DMAU[43)] with Mel[23)]/CaSt[38)] and [A-1]

or

[435] M-DHP-2[47)] with HEXDGE[29)]/c-HEXDGE[29a)] and [A-1]

In flexible PVC, combinations of TEAP with 1,4-cyclohexanedimethanol diglycidyl ether [118b] are very particularly preferred. Very particularly suitable initial colour improvers here are aminocrotonic esters and dihydropyridines.

Use of (A) as an Antistat or Antistat Component (AS)

EP 0 751 179 A1 describes alkali metal perchlorates and triflates as antistat components. They function in the presence of polyglycol mono-fatty acid esters. One disadvantage is the limited solubility of these salts in the esters mentioned. It has been found that, surprisingly, the inventive inner complexes (A) have a very good solubility herein and display good antistatic properties.

Polymer substrates of this type include: rigid PVC, flexible PVC, semirigid PVC, CPVC, CPE, PVDC, HDPE, LDPE, PP, PS, HIPS, PU, PA, PC, PET, PBT, TPU, PMMA, PVA, ABS, SAN, MBS, MABS, NBR, NAR, EVA, ASA, and EPDM.

Additive components to (A) used here are the following systems:

glyceryl ether and/or ester, $R^8OCH_2CH(OH)CH_2OH$ or $R^8CO_2CH_2CH(OH)CH_2OH$ and/or a DEA derivative $R^9$—$[C(O)]_{d'}$—$N(C_2H_4OH)_2$ or $R^8OCH_2CH(OH)CH_2$—$[C(O)]_{d'}$—$N(C_2H_4OH)_2$ or $R^9N((CH_2)_2)OH)$—$(CH_2)_3$—$[C(O)]_{d'}$—$N(C_2H_4OH)_2$ and/or a paraffinsulphate (or -sulphonate) salt $C_{12}$-$C_{18}$-alkyl-$(O)_{d'}$—$SO_3$Na, Li, K and/or a polyoxyalkylene of the formula (F)

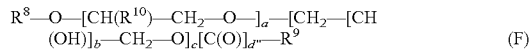

where each $R^8$ is independently H, $C_1$-$C_{24}$-alkyl, $C_2$-$C_{24}$-alkenyl, $CH_2$=$CH$—$C(O)$ or $CH_2$=$CCH_3$—$C(O)$;

each $R^9$ is independently $C_1$-$C_{24}$-alkyl, $C_2$-$C_{24}$-alkenyl, $(CH_2)_2OH$, $CH_2$—$COOH$ or $N(C_1$-$C_8$-alkyl$)_3$Hal;

$R^{10}$=H or $CH_3$,

Hal=Cl, Br or I;

a=an integer greater than or equal to 2, b=an integer of 1 to 6, and c, d, d', d'' are each independently 0 or 1.

When substituents in the compounds of the formula (F) are alkyl having 1 to 24 carbon atoms, useful radicals therefor are those such as methyl, ethyl, propyl, butyl, pentyl, hexyl, heptyl, octyl, nonyl, decyl, undecyl, dodecyl, tetradecyl, hexadecyl, octadecyl, eicosyl, docosyl and tetracosyl, and corresponding branched isomers.

When substituents in the compounds of the formula (F) are alkenyl having from 1 to 24 carbon atoms, these radicals derive from the alkyl radicals mentioned, the double bond preferably being arranged in the middle of the hydrocarbon chain. A particularly preferred alkenyl radical is oleyl. When d is 1, $R^9$ as alkenyl is preferably also $CH_2$=$CH$— or $CH_2$=$CCH_3$—.

In the compounds of the formula (F), $R^8$ is preferably H or $C_1$-$C_4$-alkyl and most preferably H.

In the compounds of the formula (F), $R^9$ is preferably $C_6$-$C_{20}$-alkyl, $C_6$-$C_{20}$-alkenyl or $N(C_1$-$C_8$-alkyl$)_3$Cl, and most preferably $C_6$-$C_{20}$-alkyl or $C_6$-$C_{20}$-alkenyl.

In the compounds of the formula (F), Hal is preferably Cl.

In the compounds of the formula (F), a is preferably a number from 2 to 20 and most preferably a number from 2 to 14.

In the compounds of the formula (F), b is preferably a number from 2 to 6 and most preferably the number 4.

In the compounds of the formula (F), c is preferably the number 0 or 1 and, most preferably, c is the number 0 and d is the number 1.

Particular preference is given to polypropylene glycol lauryl ester, polypropylene glycol oleyl ester, polypropylene glycol methyldiethylammonium chloride, polyethylene glycol monomethyl ether, polyethylene glycol lauryl ester, polyethylene glycol oleyl ester, polyethylene glycol oleyl ether, polyethylene glycol sorbitan monolauryl ester, polyethylene glycol stearyl ester, polyethylene glycol polypropylene glycol lauryl ether and polyethylene glycol lauryl ether carboxylic acid.

Very particular preference is given to polyethylene glycol oleyl ether and especially to polyethylene glycol lauryl ester.

Very particular preference is given to compounds of the formula (F) in which $R^8$=H, $R^9$=$C_6$-$C_{20}$-alkenyl, $R^{10}$=H or $CH_3$, a is a number from 2 to 14, c is zero and d is one.

Examples thereof are glycerol monolauryl, monooleyl, monopalmityl and monostearyl ether; glycerol monolaurate, monooleate, monopalmitate and monostearate; lauryl-, oleyl-, palmityl- and stearyldiethanolamine; polyethylene glycol (PEG) monolaurate, monooleate, monopalmitate and monostearate, PEG monolauryl, monomyristyl, monopalmityl, monostearyl and monooleyl ether. Oleic diethanolamide, palmitic diethanolamide and stearic diethanolamide. Sodium tetra-, hexa- and octadecanesulphonate or -sulphate, potassium tetra-, hexa- and octadecanesulphonate or -sulphate, lithium tetra-, hexa- and octadecanesulphonate or -sulphate.

Commercial products include: DEHYDAT®10, DEHYDAT®R80X, IRGASTAT® P, ATMER™, Lankrostat® LA3, Ethoduomeen® T/12, Ethomeen® HT/12, Ethomeen® T/12, Ethomeen® O/12, Ethomeen® C/12, TEGIN® R90 and NOROPLAST® 2000.

Further important additives for improving performance are phosphites and sterically hindered amines.

Phosphites

Organic phosphites are known costabilizers for chlorinated polymers. Examples are trioctyl phosphite, tridecyl phosphite, tridodecyl phosphite, tritridecyl phosphite, tripentadecyl phosphite, trioleyl phosphite, tristearyl phosphite, triphenyl phosphite, trilauryl phosphite, tricresyl phosphite, tris (nonylphenyl)phosphite, tris(2,4-t-butylphenyl)phosphite or tricyclohexyl phosphite. Further suitable phosphites are various mixed aryl dialkyl phosphites or alkyl diaryl phosphites, such as phenyl dioctyl phosphite, phenyl didecyl phosphite, phenyl didodecyl phosphite, phenyl ditridecyl phosphite, phenyl ditetradecyl phosphite, phenyl dipentadecyl phosphite, octyl diphenyl phosphite, decyl diphenyl phosphite, undecyl diphenyl phosphite, dodecyl diphenyl phosphite, tridecyl diphenyl phosphite, tetradecyl diphenyl phosphite, pentadecyl diphenyl phosphite, oleyl diphenyl phosphite, stearyl diphenyl phosphite and dodecyl bis(2,4-di-tert-butylphenyl)phosphite. In addition, it is also advantageously possible to use phosphites of different di- or polyols, for example tetraphenyl dipropylene glycol diphosphite, poly (dipropylene glycol) phenyl phosphite, tetra(isodecyl) dipropylene glycol diphosphite, tris(dipropylene glycol) phosphite, tetramethylolcyclohexanol decyl diphosphite, tetramethylolcyclohexanol butoxy ethoxy ethyl diphosphite, tetramethylolcyclohexanol nonylphenyl diphosphite, bis (nonyl)phenyl di(trimethylolpropane) diphosphite, bis(2-butoxyethyl) di(trimethylolpropane) diphosphite, trishydroxyethyl isocyanurate hexadecyl triphosphite, didecylpentaerythritol diphosphite, distearylpentaerythritol diphosphite, bis(2,4-di-t-butylphenyl)pentaerythritol diphosphite, and mixtures of these phosphites and aryl/alkyl phosphite mixtures of the statistical composition $(H_{19}C_9\text{-}C_6H_4)O_{1.5}P(OC_{12.13}H_{25.27})_{1.5}$ or $(C_8H_{17}\text{--}C_6H_4\text{--}O\text{--})_2P(\text{i-}C_8H_{17}O),(H_{19}C_9\text{-}C_6H_4)O_{1.5}P(OC_{9.11}H_{19.23})_{1.5}$. Industrial examples are Naugard P, Mark CH300, Mark CH301, Mark CH302 and Mark CH55 (manufacturer: Crompton Corp. USA). The organic phosphites may be employed in an amount of, for example, 0.01 to 10 parts by weight, appropriately 0.05 to 5 parts by weight and especially 0.1 to 3 parts by weight, based on 100 parts by weight of PVC.

Sterically Hindered Amines (HALS)

The sterically hindered amines are generally compounds containing the group

(G-1)

in which A and V are each independently $C_{1-8}$-alkyl, $C_{3-8}$-alkenyl, $C_{5-8}$-cycloalkyl or $C_{7-9}$-phenylalkyl, or together form $C_{2-5}$-alkylene optionally interrupted by O, NH or $CH_3\text{--}N$, or are a cyclic sterically hindered amine, especially a compound from the group of the alkyl- or polyalkylpiperidines, in particular of the tetramethylpiperidines containing the group

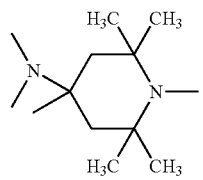
(G-2)

Examples of such polyalkylpiperidine compounds are as follows (in the oligomeric or polymeric compounds, n and r are in the range of 2-200, preferably in the range of 2-10, especially 3-7):

01) N,N'-bis(2,2,6,6-tetramethylpiperidin-4-yl)ethylene-1,2-diacetamide
01a) N,N'-bis(2,2,6,6-tetramethylpiperidin-4-yl)hexamethylene-1,6-diacetamide
01b) N,N'-bis(2,2,6,6-tetramethylpiperidin-4-yl)ethylene-1,2-diformamide
02) N,N'-bis(2,2,6,6-tetramethylpiperidin-4-yl)adipamide
03) N,N'-bis(2,2,6,6-tetramethylpiperidin-4-yl)oxamide
04) 4-hydroxybenzamido-2,2,6,6-tetramethylpiperidine 05)
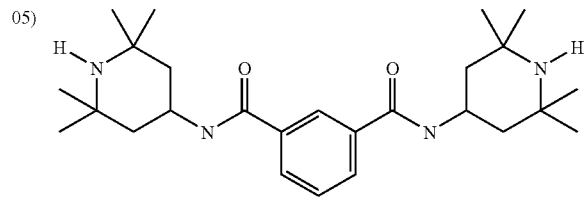

05A)
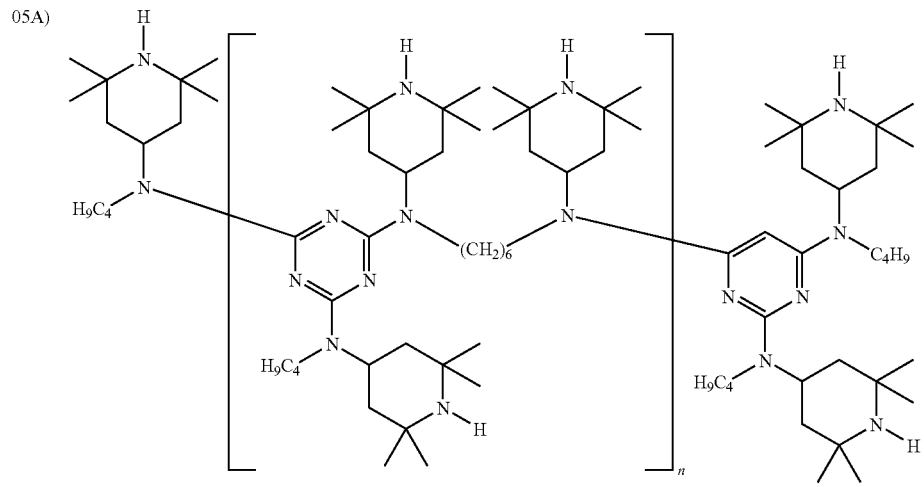

06)
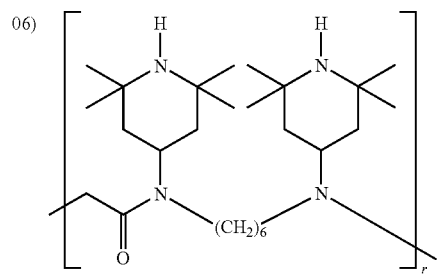

-continued
07) 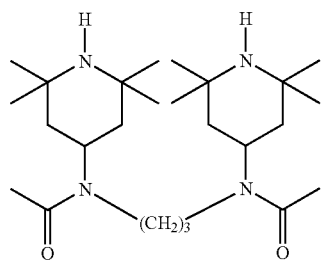
08) 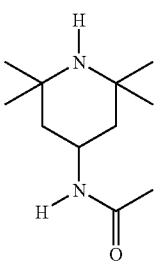
09) 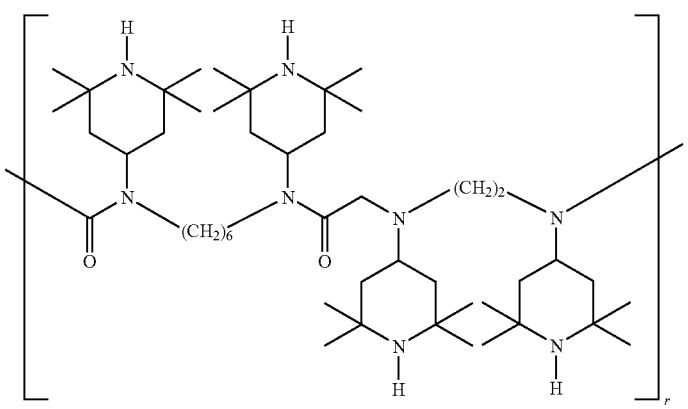
10) 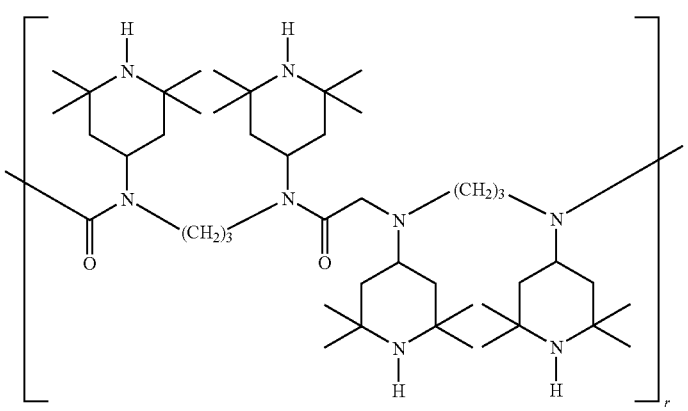
11) 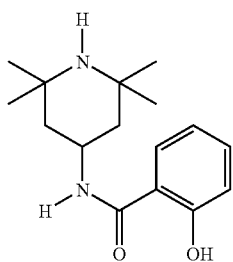

12) 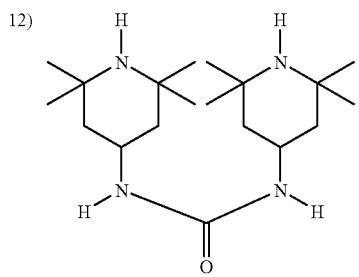
13) 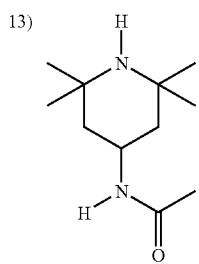
14) 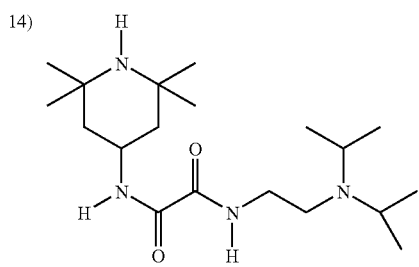
15) 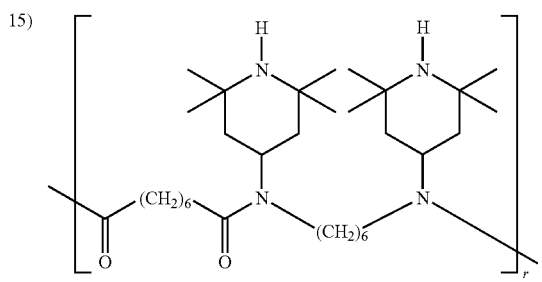
16) 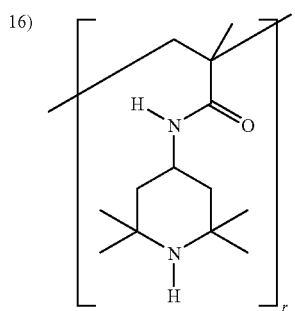
17) 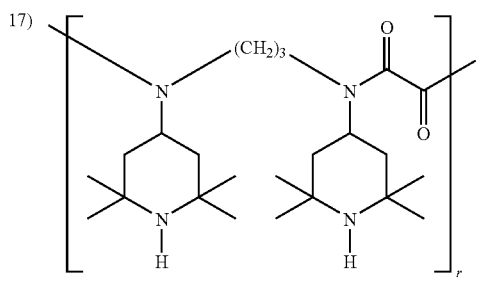

-continued
18) 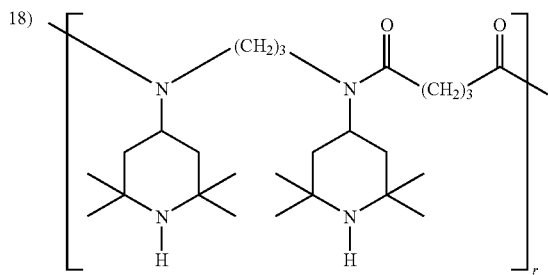
19) 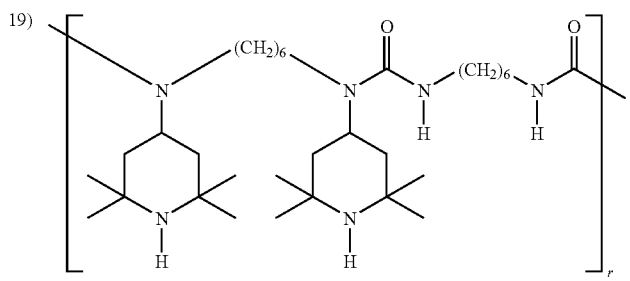
20) 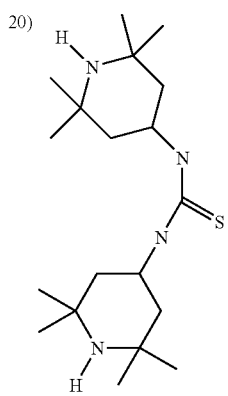
22) 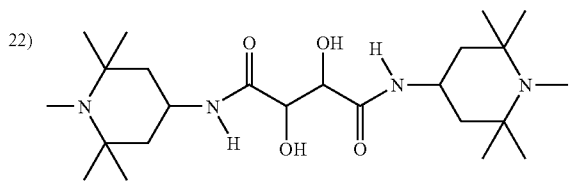
23) 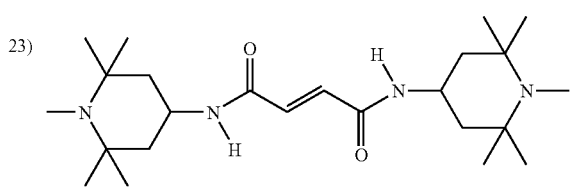
24) 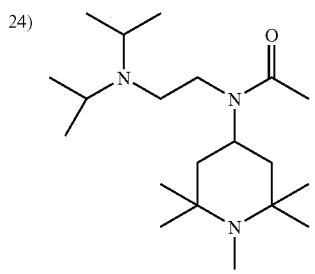

-continued
25) 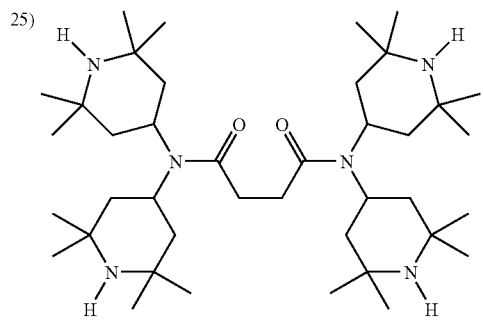
26) 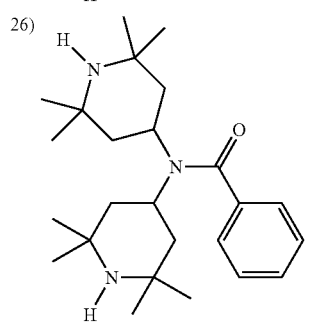
27) 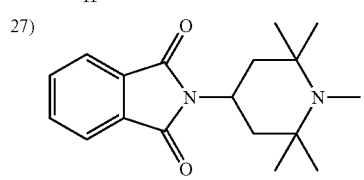
28) 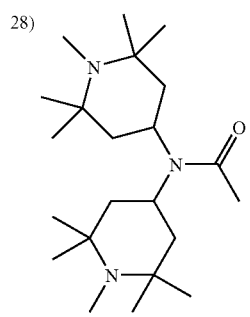
29) 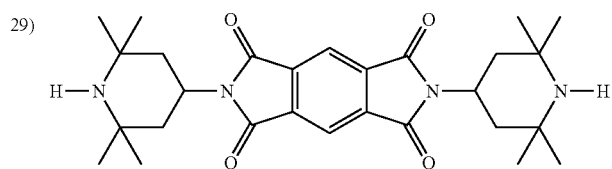
30) 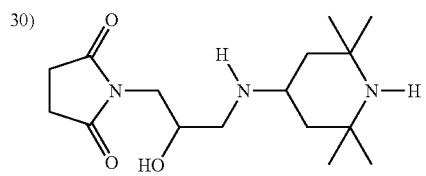
31) 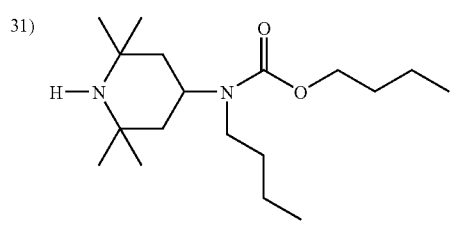

32) 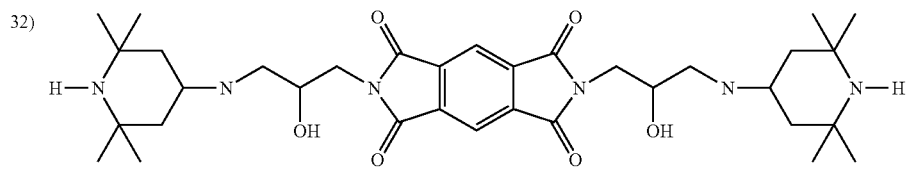
33) 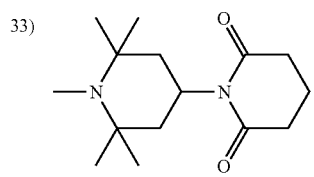
34) 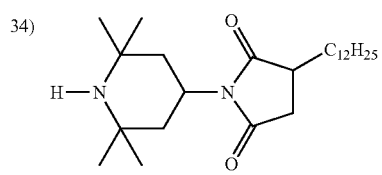
35) 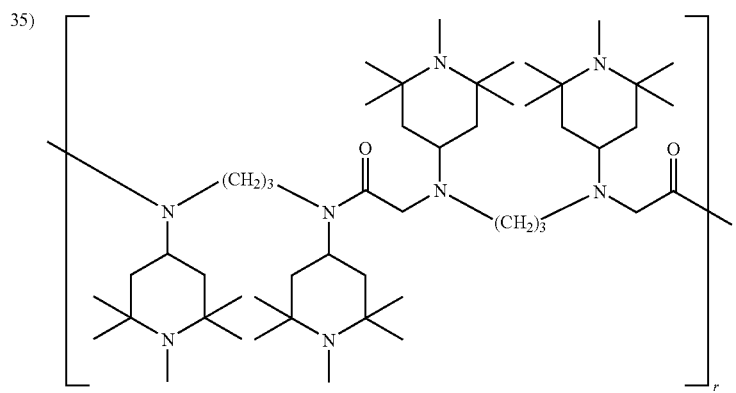
36) 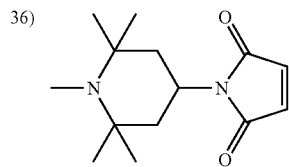
37) 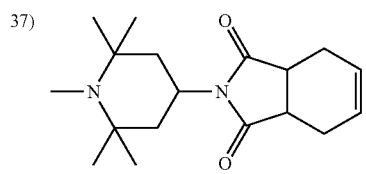

38) 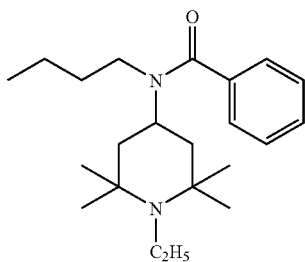
39) 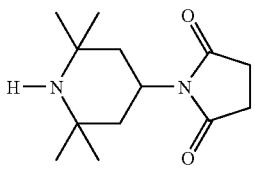
40) 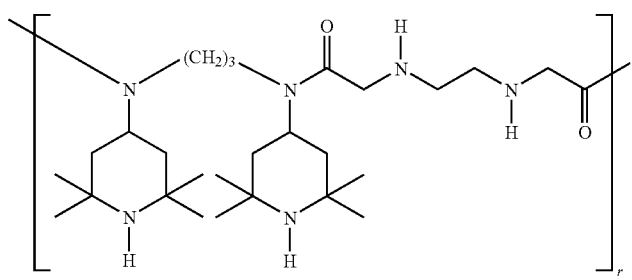
41) 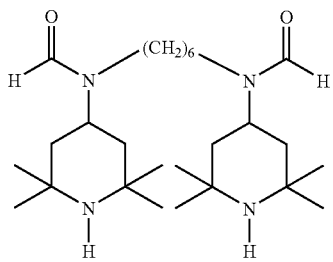
Also useful are compounds of the following structure (G-3):
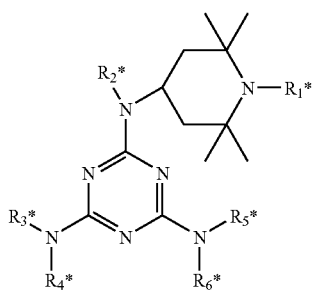
(G-3)

Examples of compounds of the formula (G-3) are:

| No | $R_2^*$—N(—R_1^*) (on tetramethylpiperidine) | $R_3^*$—N—$R_4^*$ | $R_5^*$—N—$R_6^*$ |
|---|---|---|---|
| 42) | PMP-NH— | H$_2$N— | H$_2$N— |
| 43) | TMP-NH— | TMP-NH— | H$_2$N— |
| 44) | TMP-NH— | Me$_2$N— | Me$_2$N— |
| 45) | TMP-NH— | TMP-NH— | TMP-NBu- |
| 46) | TMP-NH— | TMP-NH— | (HO—CH$_2$CH$_2$—)$_2$N— |
| 47) | TMP-NH— | (HO—CH$_2$CH$_2$—)NH— | TMP-NBu- |
| 48) | (TMP)$_2$-N— | H$_2$N— | H$_2$N— |
| 49) | TMP-NH— | (cyclohexyl)$_2$N— | (cyclohexyl)$_2$N— |
| 50) | (TMP)$_2$N— | (TMP)$_2$N— | (TMP)$_2$N— |
| 51) | PMP-NH— | PMP-NH— | PMP-NH— |
| 52) | (i-Pr)$_2$N—C$_2$H$_4$—N(TMP)- | Pr$_2$N— | Pr$_2$N— |
| 53) | (i-Pr)$_2$N—C$_2$H$_4$—N(TMP)- | TMP-NH | TMP-NH |
| 54) | TMP-NH— | Et$_2$N— | TMP-NH— |
| 55) | TMP-NH— | (HOCH$_2$)$_3$C—NH— | TMP-NH— |
| 56) | TMP-NH— | morpholino- | Et$_2$N—C$_2$H$_4$—NH— |
| 57) | TMP$_2$N— | TMP-NH— | Et$_2$N—C$_2$H$_4$—NH— |
| 58) | TMP-NH— | TMP-NH— | PhCH$_2$NH— |
| 59) | TMP-NH— | 2-HO-C$_6$H$_4$—NH— | TMP-NH— |
| 60) | TMP-NH— | 2-MeO-C$_6$H$_4$—NH— | 2-MeO-C$_6$H$_4$—NH— |
| 61) | TMP-NH— | Et$_2$N—C$_2$H$_4$—NH— | 4-EtO-C$_6$H$_4$—NH— |
| 62) | TMP-N(nBu)- | Et$_2$N— | Et$_2$N— |
| 63) | TMP-N(Et)— | (n-Bu)$_2$N— | TMP-N(Et)— |
| 64) | TMP-NH— | 4-methylpiperazin-1-yl | TMP-NH— |
| 65) | TMP-NH— | (trimethyl-hexahydro-1,4-diazepin-1-yl) | TMP-NH— |

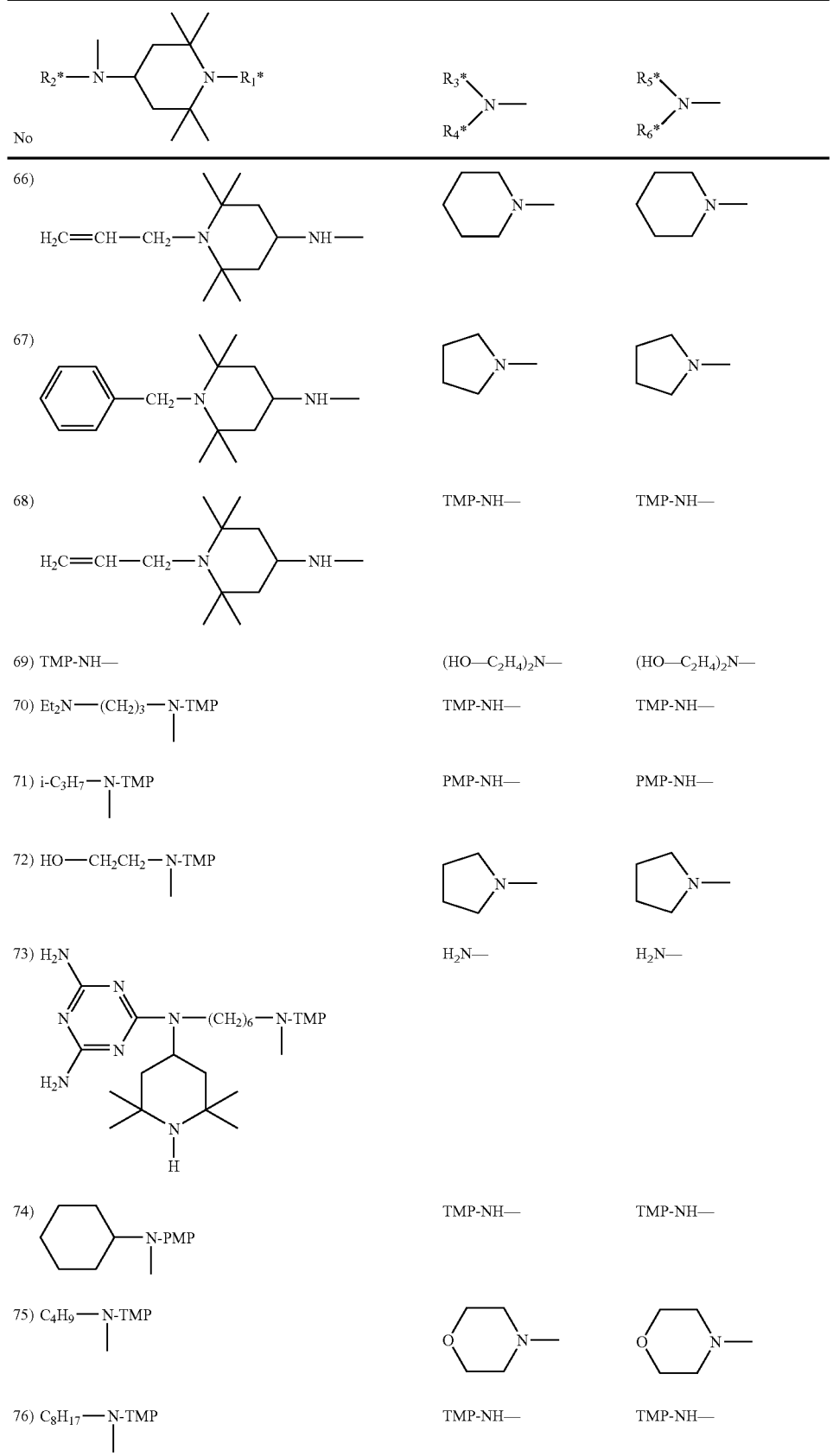

-continued
| No | ![structure](R₂*-N-R₁* on TMP ring) | R₃*\\N\\R₄* | R₅*\\N\\R₆* |
|---|---|---|---|
| 77) | 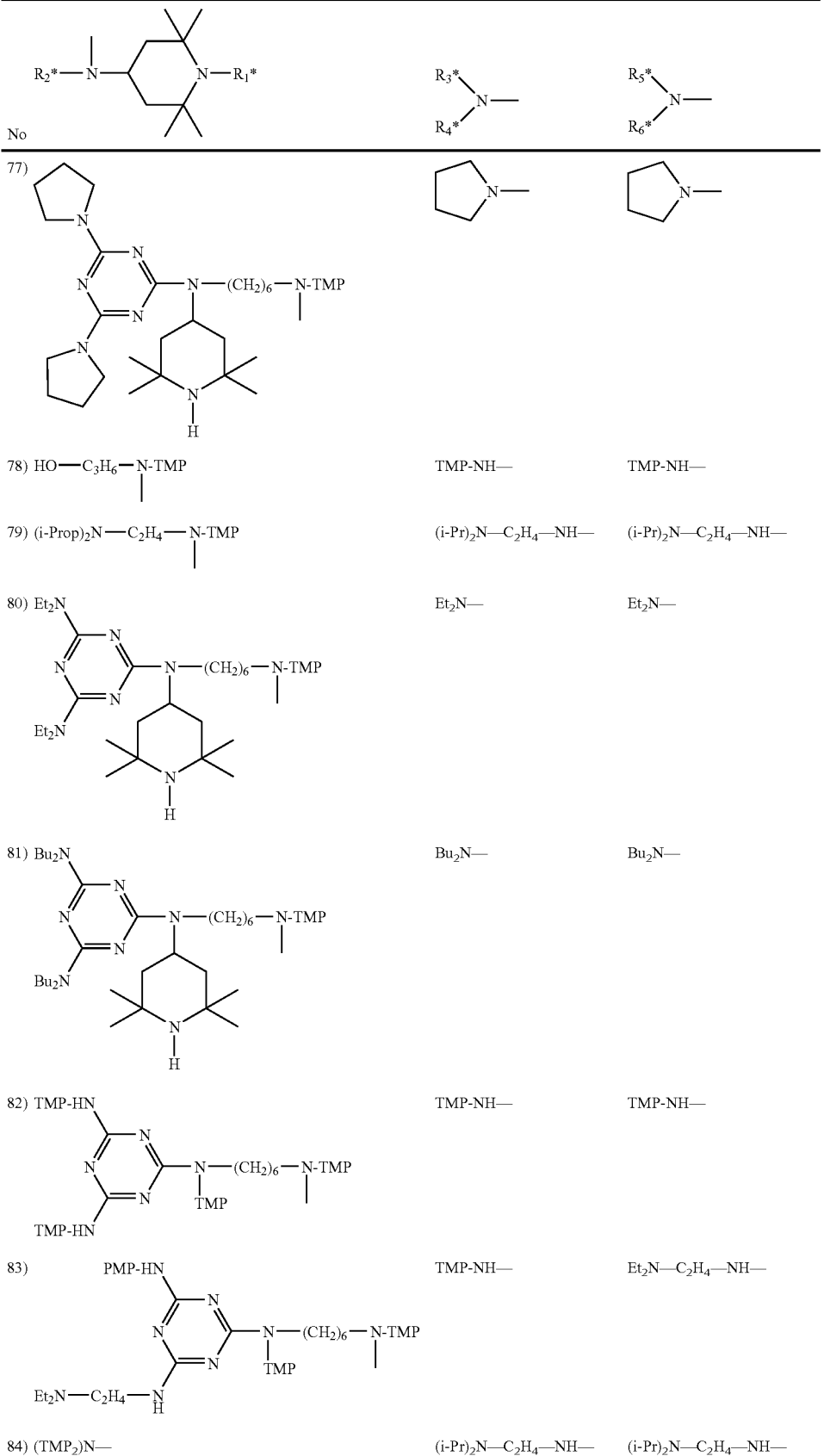 | pyrrolidinyl-N— | pyrrolidinyl-N— |
| 78) | HO—C₃H₆—N(CH₃)-TMP | TMP-NH— | TMP-NH— |
| 79) | (i-Prop)₂N—C₂H₄—N(CH₃)-TMP | (i-Pr)₂N—C₂H₄—NH— | (i-Pr)₂N—C₂H₄—NH— |
| 80) | (see structure) | Et₂N— | Et₂N— |
| 81) | (see structure) | Bu₂N— | Bu₂N— |
| 82) | (see structure) | TMP-NH— | TMP-NH— |
| 83) | (see structure) | TMP-NH— | Et₂N—C₂H₄—NH— |
| 84) | (TMP)₂N— | (i-Pr)₂N—C₂H₄—NH— | (i-Pr)₂N—C₂H₄—NH— |

-continued
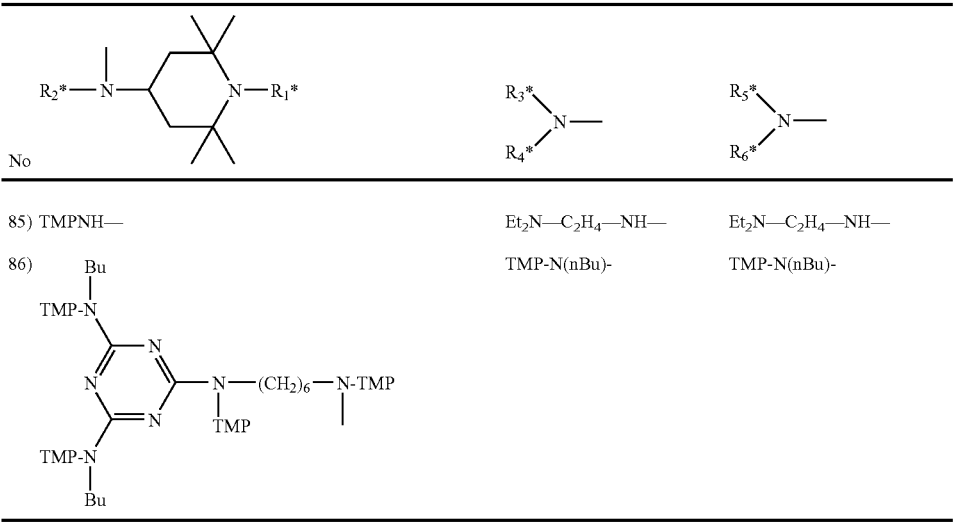
| No | | | |
|---|---|---|---|
| 85) TMPNH— | | Et$_2$N—C$_2$H$_4$—NH— | Et$_2$N—C$_2$H$_4$—NH— |
| 86) | | TMP-N(nBu)- | TMP-N(nBu)- |
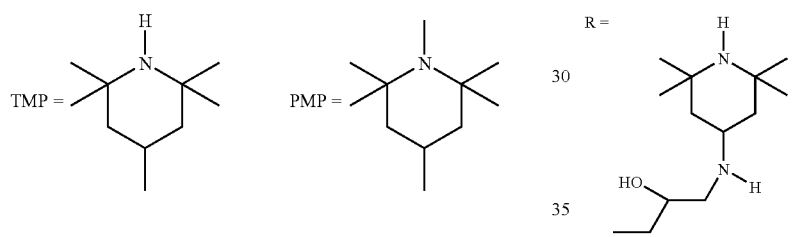
Explanations:
Me=methyl;
Et=ethyl; Pr=propyl; Bu=butyl.
Further useful compounds are:
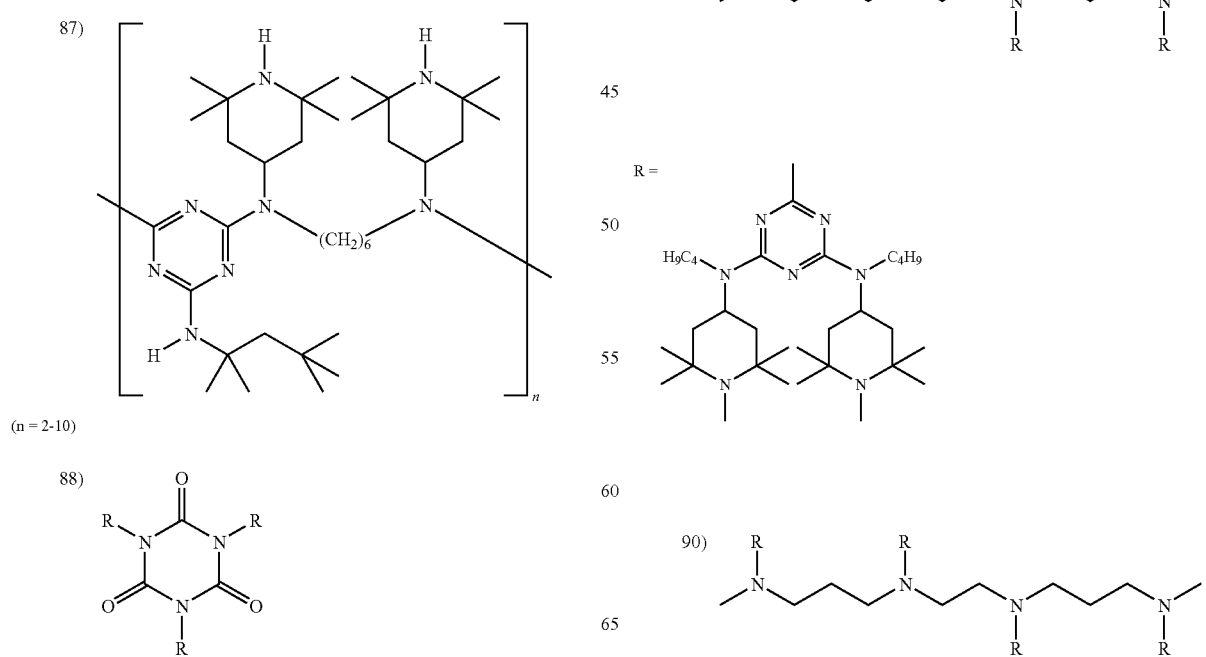

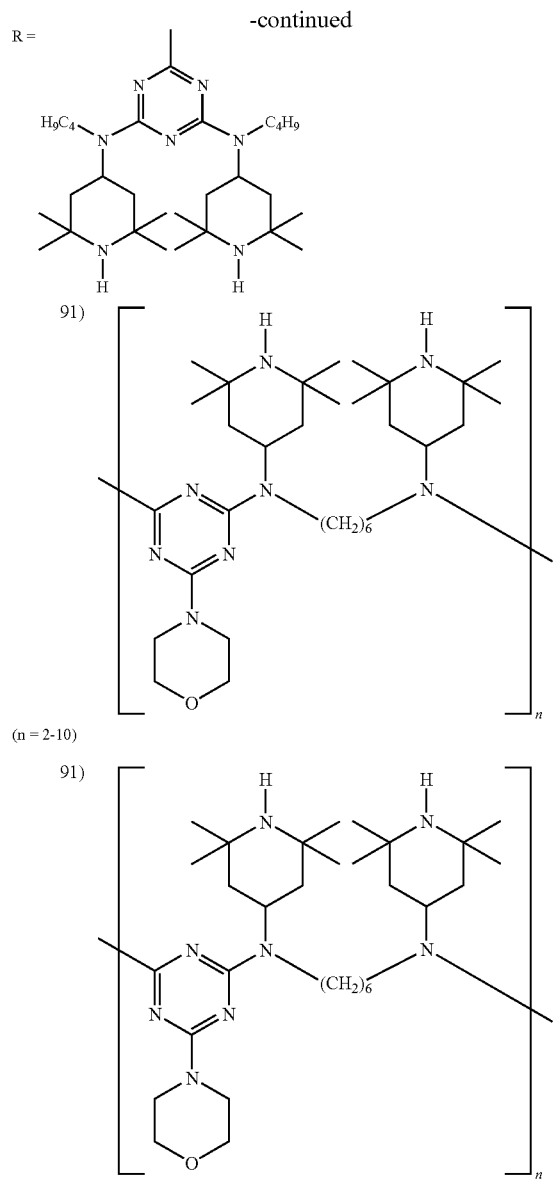
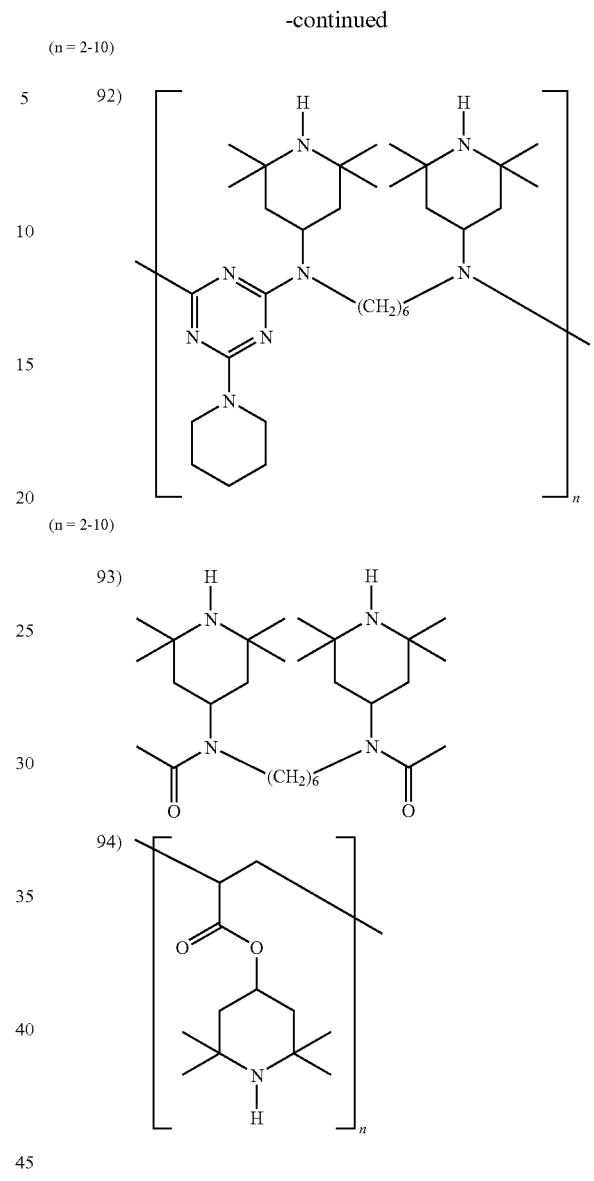
Polymer formed from:
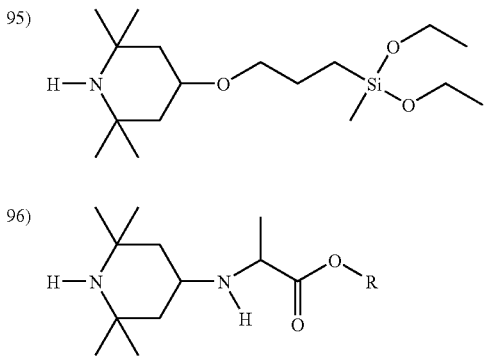

-continued
97) 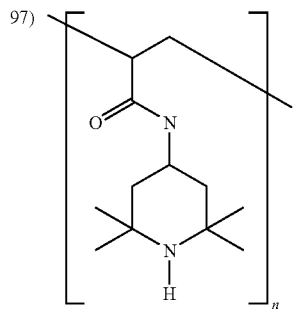
98) 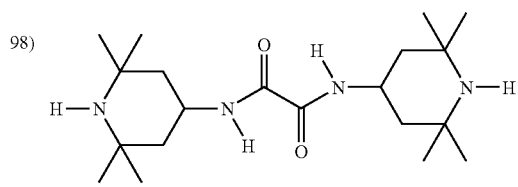
99) 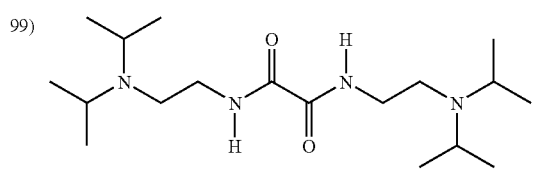
100) 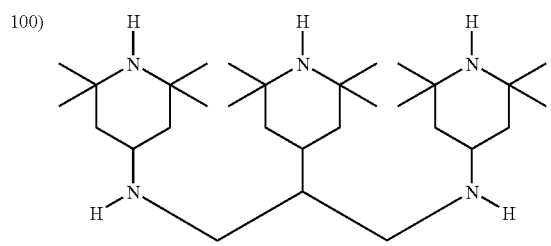
101) 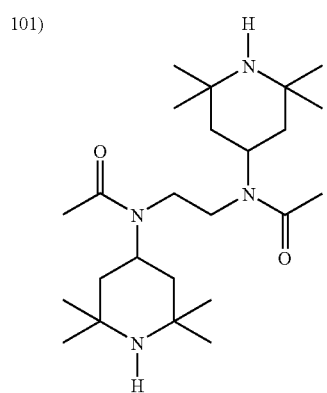
102) 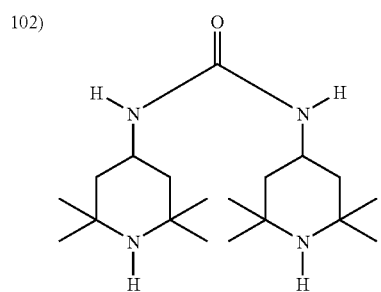

-continued
103) 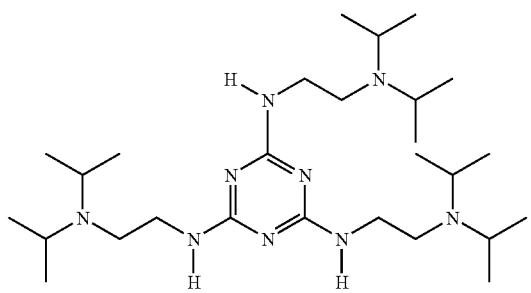
104) 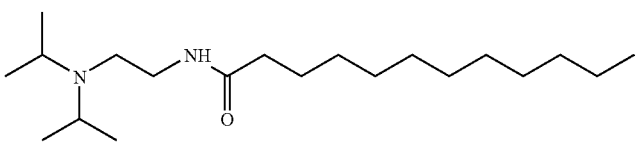
105) 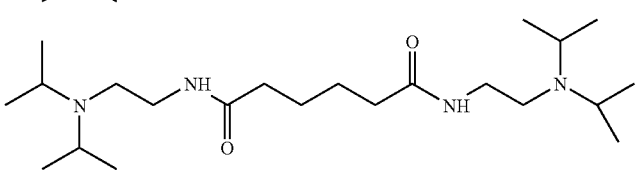
106) 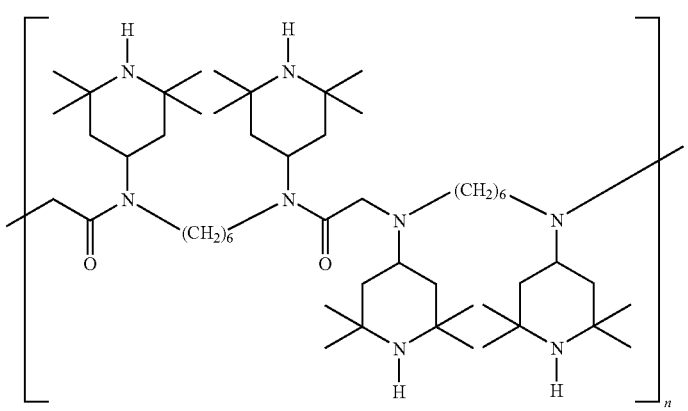
107) 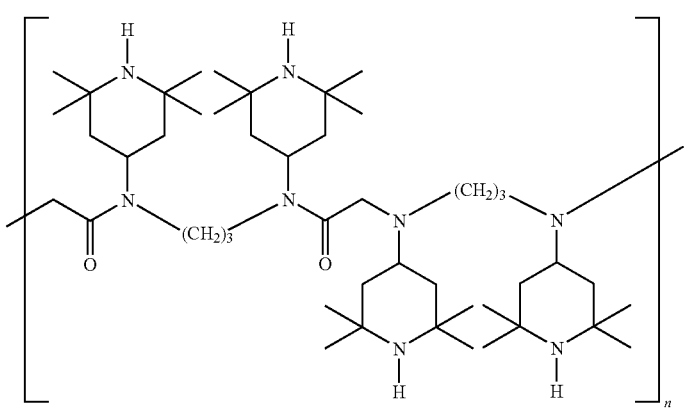
108) 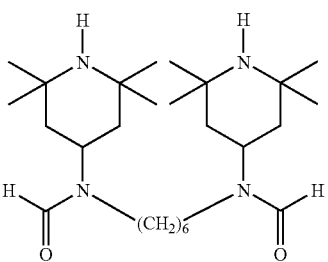

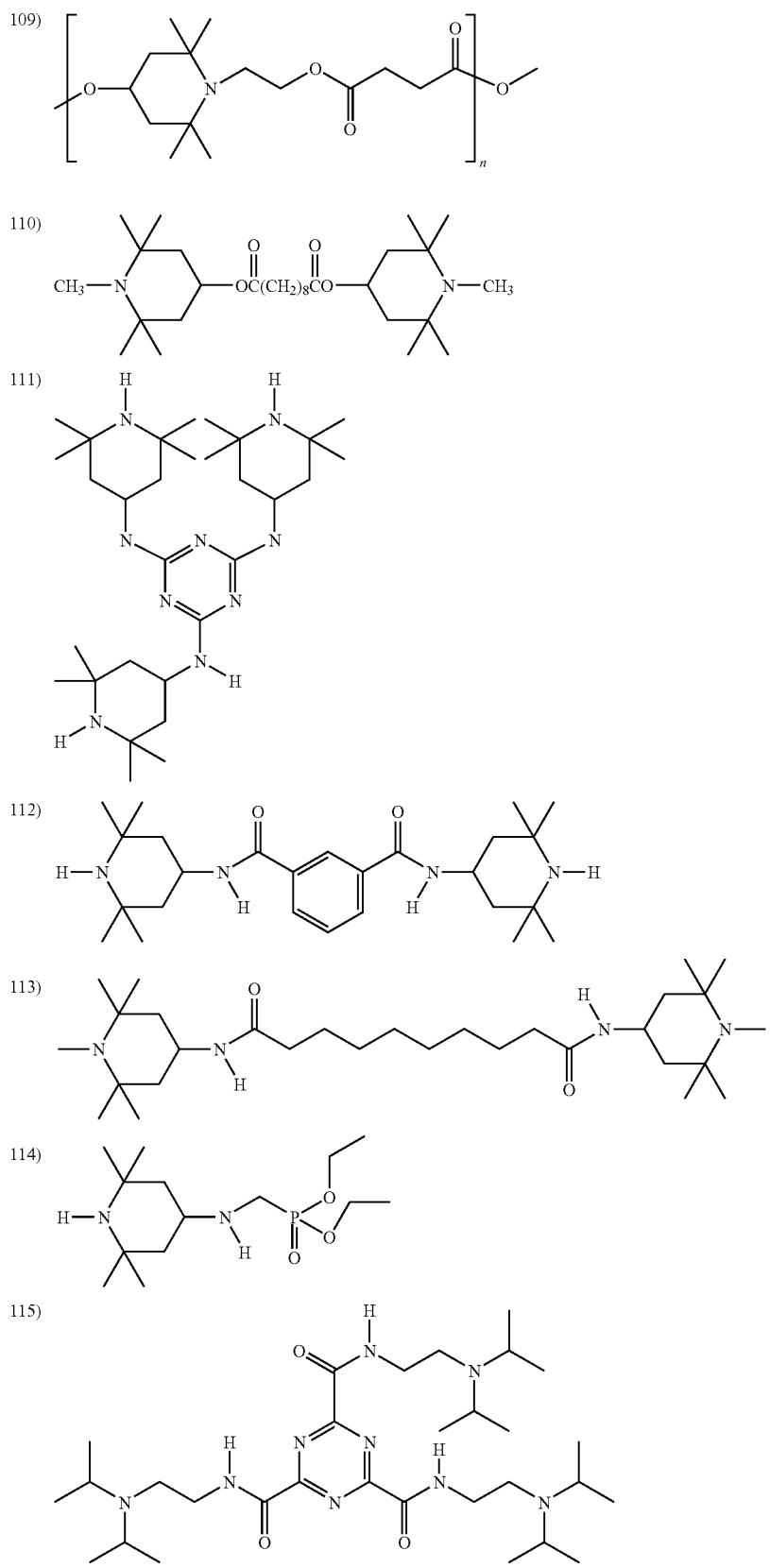

-continued
116) 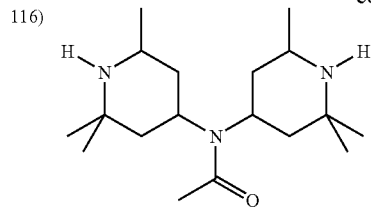
117) 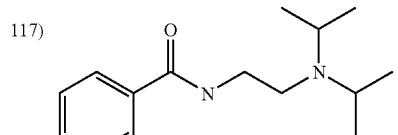
118) 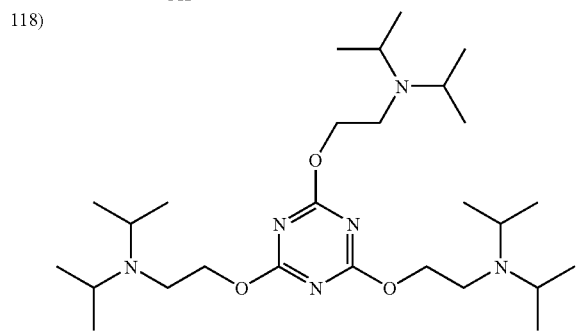
119) 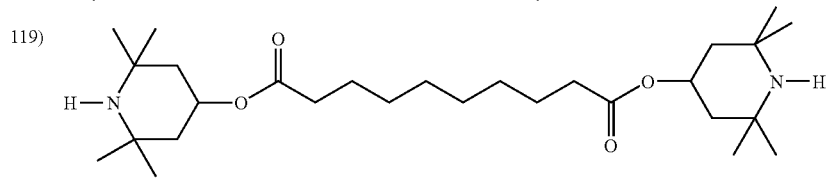
Further examples are:
120) 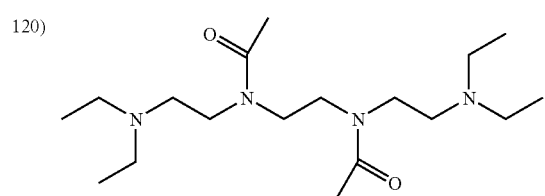
121) 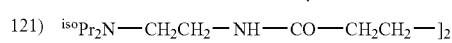 $[^{iso}Pr_2N-CH_2CH_2-NH-CO-CH_2CH_2-]_2$
122) $[^{iso}Pr_2N-CH_2CH_2CH_2-NH-CO-]_2$
123) $Me_2N-CH_2-CH_2-NH-CO-$ 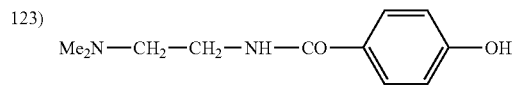
124) 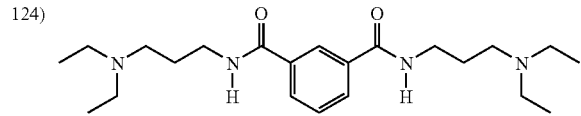
125) 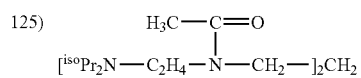
$[^{iso}Pr_2N-C_2H_4-N-CH_2-]_2CH_2$
126) $(\text{cyclohexyl})_2N-C_3H_6NH-CO-$ 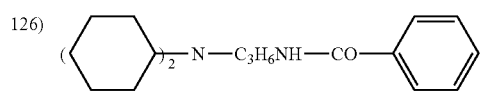
-continued
127) 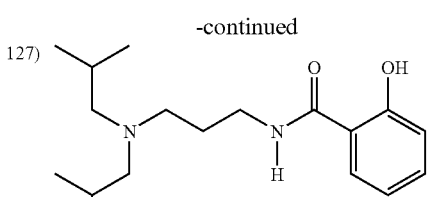
128) $^{tert}Bu_2N-C_3H_6-NH)_2CO$
129) 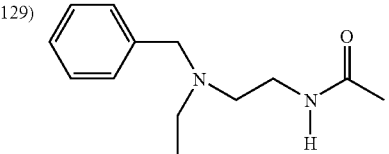
130) $(Bzl_2N-C_2H_4-NH-CO-)_2$
131) $(\text{pyrrolidinyl}-C_2H_4-NH-CO)_2$
132) 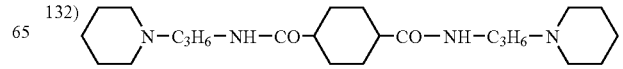

-continued

133) $^{iso}Pr_2N-C_2H_4-NH-CO-CH(OH)]_2$

134) $(Et_2N-C_3H_6-N(CH_3)-CO-CH_2-)_2$

135) $^{iso}Pr'N-C_3H_6-)_2N-CO-CH_3$

136) 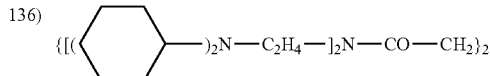

137) 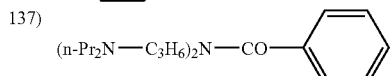

138) 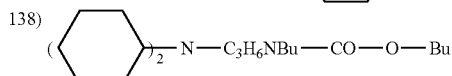

139) 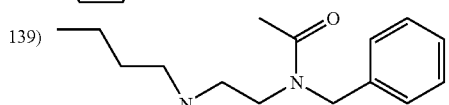

and also compounds of the structure (G-4)

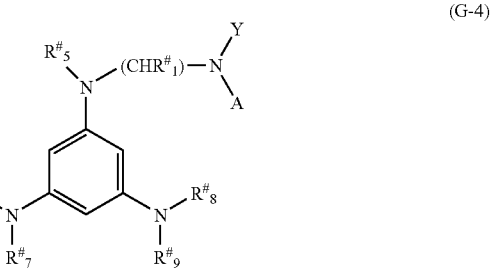

(G-4)

Examples of compounds of the formula (G-4) are:

| No | AY—N—CHR$_1^\#$)$_m$—NR$_5^\#$— | R$_6^\#$R$_7^\#$N— | R$_8^\#$R$_9^\#$N— |
|---|---|---|---|
| 140 | Et$_2$N—C$_2$H$_4$—NH— | —NH$_2$ | —NH$_2$ |
| 141 | Et$_2$N—C$_2$H$_4$—NH— | Et$_2$N—C$_2$H$_4$—NH— | Et$_2$N—C$_2$H$_4$—NH— |
| 142 | $^n$Pr$_2$N—C$_3$H$_6$—NH— | HO—C$_2$H$_4$NH— | HO—C$_2$H$_4$—NH— |
| 143 | $^n$Pr$_2$N—C$_2$H$_4$—NH— | (HO—C$_2$H$_4$)$_2$N— | (HO—C$_2$H$_4$)$_2$N— |
| 144 | (cyclohexyl)$_2$N—C$_2$H$_4$—NH— | Et—NH— | (cyclohexyl)$_2$N—C$_2$H$_4$—NH— |
| 145 | piperidinyl-C$_3$H$_6$—NH— | piperidinyl-C$_3$H$_6$—NH— | Me—N(piperazinyl)N— |
| 146 | pyrrolidinyl-C$_2$H$_4$—NH— | pyrrolidinyl-N— | pyrrolidinyl-N— |
| 147 | morpholinyl-C$_3$H$_6$—NH— | morpholinyl-C$_3$H$_6$—NH— | morpholinyl-N— |
| 148 | $^{iso}$Pr$_2$N—C$_2$H$_4$—NH— | $^{iso}$Pr$_2$N—C$_2$H$_4$—NH— | $^{iso}$Pr$_2$N— |
| 149 | $^{iso}$Pr$_2$N—C$_2$H$_4$—NH— | $^{iso}$Pr$_2$N—C$_2$H$_4$—NH— | $^{iso}$PrNEt— |
| 150 | Et$_2$N—C$_2$H$_4$—NH— | Et$_2$N—C$_2$H$_4$—NH— | (cyclohexyl)$_2$N— |

In this table, Me = methyl, Bu = butyl, $^{tert}$Bu = tertiary butyl, $^{iso}$Pr = isopropyl, $^n$Pr = normal propyl, Ac = acetyl and also NOR-HALS compounds having the group
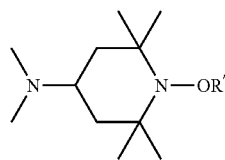
(G-5)
such as
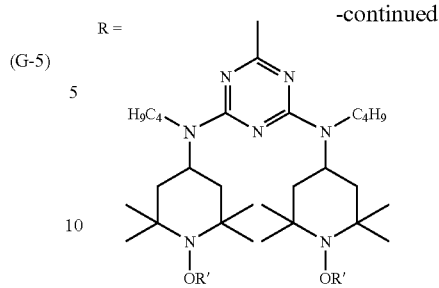
-continued
where R'=CH$_3$, n-C$_4$H$_9$ or c-C$_6$H$_{11}$
151)
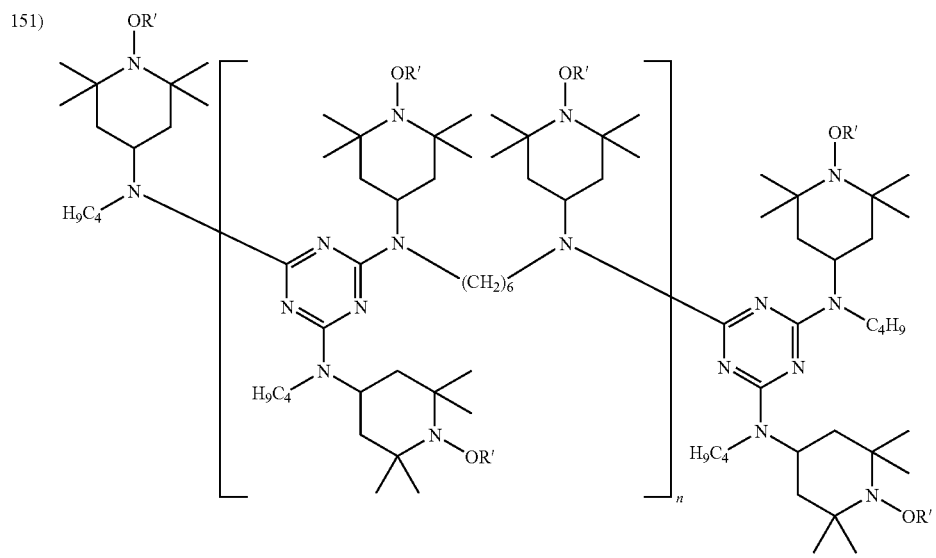
where R'=CH$_3$, n-C$_4$H$_9$ or c-C$_6$H$_{11}$
152)
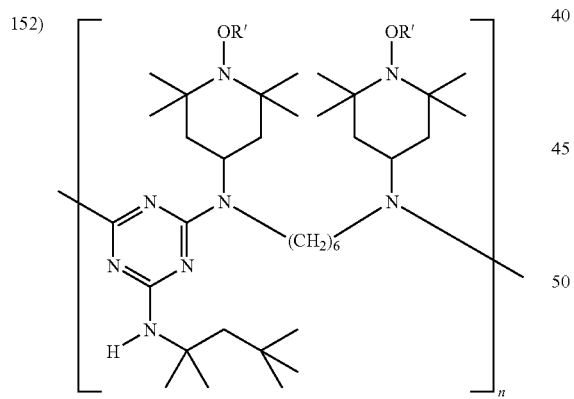
(n = 2-10)
where R'=CH$_3$, n-C$_4$H$_9$ or c-C$_6$H$_{11}$
154)
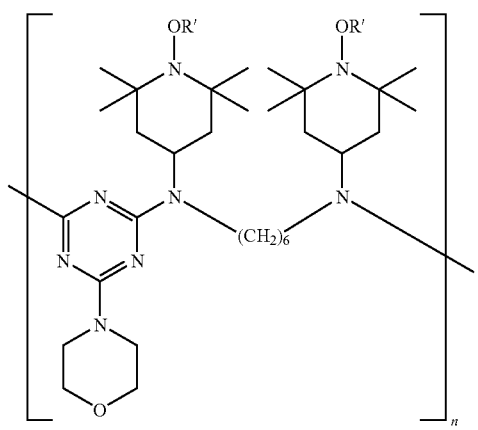
n = 2-10
153)
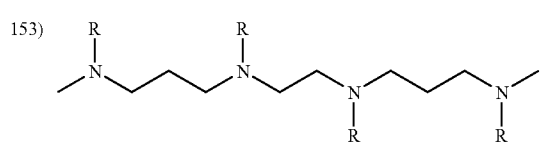

where R'=CH$_3$, n-C$_4$H$_9$ or c-C$_6$H$_{11}$

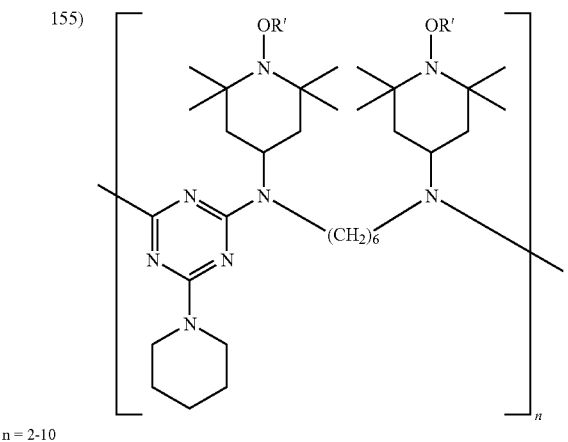

155)

n = 2-10 where R'=CH$_3$, n-C$_4$H$_9$ or c-C$_6$H$_{11}$
156) TINUVIN® NOR 371FF
157) TINUVIN® XT 833
158) TINUVIN® XT 850

Preference is given to triazine-based NOR-HALS compounds.

Also preferred are the compounds 1, 1a, 1b, 3, 4, 6, 9, 16, 41, 87, 88, 91, 92, 93, 103, 106, and 111.

Particular preference is given to 1, 1b, 2, 6, 9, 16, 41, 87, 88, 92, 93, 103, 111, 151, 152, 153, 154, 155 and 156, 157, 158.

Very particular preference is given to 41, 87, 93, 103, 151, 152, 154, 156 and 157.

For stabilization in the chlorinated polymer, the compounds of components (G-1)-(G-5) are used appropriately in an amount of 0.01 to 10 parts, preferably of 0.05 to 5 parts, especially of 0.1 to 3 parts for 100 parts of polymer.

Instead of an individual sterically hindered amine, it is also possible in the context of the present invention to use a mixture of different sterically hindered amines.

The amines mentioned are frequently known compounds; many of them are commercially available. The compounds may be present in the polymer to an extent of 0.005 to 5%, preferably to an extent of 0.01 to 2% and especially to an extent of 0.01 to 1%.

The invention preferably further provides mixtures of glycidyl compound (D) or cyanamide (E)—especially melamine—with at least one stabilizer component (A), with at least one further cocomponent (B-1), (B-2), (C-1) and (C-2) to which an HCl scavenger, preferably coated or uncoated calcium hydroxide, and optionally a further cocomponent (G-1) or (G-2) or an antistat component (F) is additionally added. Alternatively preferred are also systems which comprise (A) and scavengers. These systems serve in particular for basis stabilization. Further additives can be added to these blends.

Preferred further component groups are polyols and disaccharide alcohols, β-diketones, thiophosphites and thiophosphates, mercaptocarboxylic esters, metal hydroxycarboxylate salts, fillers, lubricants, plasticizers, pigments, antioxidants, UV absorbers, light stabilizers, optical brighteners, blowing agents, antistats, biocides (antimicrobicides), antifogging agents, impact modifiers, processing aids, gelling agents, flame retardants, metal deactivators and compatibilizers.

It is also possible for further additives such as adhesives, calendering aids, mould (release agents), lubricants, and also fragrances and colorants to be present. Examples of such additional components are listed and explained below (cf. "Handbook of PVC-Formulating" by E. J. Wickson, John Wiley & Sons, New York 1993).

Polyols and Sugar Alcohols

Useful compounds of this type include, for example: pentaerythritol, dipentaerythritol, tripentaerythritol, trimethylolethane, bistrimethylolpropane, inositol, polyvinyl alcohol, bistrimethylolethane, trimethylolpropane, sorbitol, maltitol, isomaltitol, lycasin, mannitol, lactose, leucrose, tris(hydroxyethyl)isocyanurate, palatinitol, tetramethylcyclohexanol, tetramethylolcyclopentanol, tetramethylolpyranol, glycerol, diglycerol, polyglycerol, thiodiglycerol or 1-O-α-D-glycopyranosyl-D-mannitol dihydrate. Preference is given to disaccharide alcohols. Use is also found by polyol syrups such as sorbitol syrup, mannitol syrup and maltitol syrup. The polyols may be employed in an amount of, for example, 0.01 to 20 parts, appropriately of 0.1 to 20 parts and especially of 0.1 to 10 parts by weight, based on 100 parts by weight of PVC.

β-Diketones

Useable 1,3-dicarbonyl compounds are linear or cyclic dicarbonyl compounds. Preference is given to using dicarbonyl compounds of the formula R'$_1$COCHR'$_2$—COR'$_3$ in which R'$_1$ is C$_1$-C$_{22}$-alkyl, C$_5$-C$_{10}$-hydroxyalkyl, C$_2$-C$_{18}$-alkenyl, phenyl, OH—, C$_1$-C$_4$-alkyl-, C$_1$-C$_4$-alkoxy- or halogen-substituted phenyl, C$_7$-C$_{10}$-phenylalkyl, C$_5$-C$_{12}$-cycloalkyl, C$_1$-C$_4$-alkyl-substituted C$_5$-C$_{12}$-cycloalkyl, or a —R'$_5$—S—R'$_6$ or —R'$_5$—O—R'$_6$ group; R'$_2$ is hydrogen, C$_1$-C$_8$-alkyl, C$_2$-C$_{12}$-alkenyl, phenyl, C$_7$-C$_{12}$-alkylphenyl, C$_7$-C$_{10}$-phenylalkyl, or a —CO—R'$_4$ group; R'$_3$ has one of the definitions given for R'$_1$ or is C$_1$-C$_{18}$-alkoxy, R'$_4$ is C$_1$-C$_4$-alkyl or phenyl; R'$_5$ is C$_1$-C$_{10}$-alkylene, and R'$_6$ is C$_1$-C$_{12}$-alkyl, phenyl, C$_7$-C$_{18}$-alkylphenyl or C$_7$-C$_{10}$-phenylalkyl.

These include the diketones containing hydroxyl groups PS-EP 0,346,279 A1 and the oxa- and thiadiketones in PS-EP 0,307,358 A1, and equally the ketoesters based on isocyanic acid in PS-U.S. Pat. No. 4,339,383.

R'$_1$ and R'$_3$ as alkyl may especially be C$_1$-C$_{18}$-alkyl, e.g. methyl, ethyl, n-propyl, isopropyl, n-butyl, tert-butyl, pentyl, hexyl, heptyl, octyl, decyl, dodecyl or octadecyl. R'$_1$ and R'$_3$ as hydroxyalkyl are especially a —(CH$_2$)$_n$—OH group in which n is 5, 6 or 7.

R'$_1$ and R'$_2$ as alkenyl may, for example, be vinyl, allyl, methallyl, 1-butenyl, 1-hexenyl or oleyl, preferably allyl.

R'$_1$ and R'$_3$ as OH—, alkyl-, alkoxy- or halogen-substituted phenyl may, for example, be tolyl, xylyl, tert-butylphenyl, methoxyphenyl, ethoxyphenyl, hydroxyphenyl, chlorophenyl or dichlorophenyl.

R'$_1$ and R'$_3$ as phenylalkyl are especially benzyl. R'$_2$ and R'$_3$ as cycloalkyl or alkylcycloalkyl are especially cyclohexyl or methylcyclohexyl.

R'$_2$ as alkyl may especially be C$_1$-C$_4$-alkyl. R'$_2$ as C$_2$-C$_{12}$-alkenyl may especially be allyl. R'$_2$ as alkylphenyl may especially be tolyl. R'$_2$ as phenylalkyl may especially be benzyl. R'$_2$ is preferably hydrogen. R'$_3$ as alkoxy may, for example, be methoxy, ethoxy, butoxy, hexyloxy, octyloxy, dodecyloxy, tridecyloxy, tetradecyloxy or octadecyloxy. R'$_5$ as C$_1$-C$_{10}$-alkylene is especially C$_2$-C$_4$-alkylene. R'$_6$ as alkyl is especially C$_4$-C$_{12}$-alkyl, e.g. butyl, hexyl, octyl, decyl or dodecyl.

R'$_6$ as alkylphenyl is especially tolyl. R'$_6$ as phenylalkyl is especially benzyl.

Examples of 1,3-dicarbonyl compounds of the above general formula and the alkali metal, alkaline metal and zinc chelates thereof, are acetylacetone, butanoylacetone, heptanoylacetone, stearoylacetone, palmitoylacetone, lauroylacetone, 7-tert-nonylthio-2,4-heptanedione, benzoylacetone, dibenzoylmethane, lauroylbenzoylmethane, palmitoylbenzoylmethane, stearoylbenzoylmethane, isooctylbenzoylmethane, 5-hydroxy-capronylbenzoylmethane, tribenzoylmethane, bis(4-methylbenzoyl)methane, benzoyl-p-chlorobenzoylmethane, bis(2-hydroxybenzoyl)methane, 4-methoxybenzoylbenzoylmethane, bis(4-methoxybenzoyl)methane, 1-benzoyl-1-acetylnonane, benzoylacetylphenyl-methane, stearoyl-4-methoxybenzoylmethane, bis(4-tert-butylbenzoyl)methane, benzoylformyl-methane, benzoylphenylacetylmethane, bis(cyclohexanoyl)methane, di(pivaloyl)methane, 2-acetylcyclopentanone, 2-benzoylcyclopentanone, methyl, ethyl and allyl diacetoacetate, methyl and ethyl benzoylacetoacetate, methyl and ethyl propionylacetoacetate, and methyl and ethyl butyrylacetoacetate, triacetylmethane, methyl, ethyl, hexyl, octyl, dodecyl or octadecyl acetoacetate, methyl, ethyl, butyl, 2-ethylhexyl, dodecyl or octadecyl benzoylacetate, and $C_1$-$C_{18}$-alkyl propionyl- and butyrylacetates. Ethyl, propyl, butyl, hexyl or octyl stearoyl acetates, and also polycyclic β-keto esters as described in PS-EP-A 0 433 230, and dehydroacetic acid and the zinc, magnesium or alkali metal salts thereof. Preference is given to calcium, magnesium and zinc salts of acetylacetone and of dehydroacetic acid.

Particular preference is given to 1,3-diketo compounds of the above formula in which $R'_1$ is $C_1$-$C_{18}$-alkyl, phenyl, OH—, methyl- or methoxy-substituted phenyl, $C_7$-$C_{10}$-phenylalkyl or cyclohexyl, $R'_2$ is hydrogen, and $R'_3$ has one of the definitions given for $R'^1$. These likewise include heterocyclic 2,4-diones such as N-phenyl-3-acetylpyrrolidine-2,4-dione. Further representatives of this category are described in PS-EP 0,734,414 A1. The 1,3-diketo compounds may be employed in an amount of, for example, 0.01 to 10 parts, appropriately 0.01 to 3 parts and especially 0.01 to 2 parts by weight, based on 100 parts by weight of PVC.

Thiophosphites and Thiophosphates

Thiophosphites and thiophosphates are understood to mean compounds of the general type $(RS)_3P$, $(RS)_3P=O$ or $(RS)_3P=S$, as described in the publications PS-DE 28,09, 492 A1, EP 0,090,770 A1 and EP 0,573,394 A1. Examples of these compounds are trithiohexyl phosphite, trithiooctyl phosphite, trithiolauryl phosphite, trithiobenzyl phosphite, tris(carbo-i-octyloxy)methyl trithiophosphite, tris(carbotrimethylcyclohexyloxy)methyl trithiophosphite, S,S,S-tris(carbo-i-octyloxy)methyl trithiophosphate, S,S,S-tris(carbo-2-ethylhexyloxy)methyl trithiophosphate, S,S,S-tris-1-(carbohexyloxy)ethyl trithiophosphate, S,S,S-tris-1-(carbo-2-ethylhexyloxy)ethyl trithiophosphate, S,S,S-tris-2-(carbo-2-ethylhexyloxy)ethyl trithiophosphate.

Mercaptocarboxylic Esters

Examples of these compounds are esters of thioglycolic acid, thiomalic acid, mercaptopropionic acid, of the mercaptobenzoic acids or of thiolactic acid, mercaptoethyl stearate and oleate, as described in publications PS-FR-A 2,459,816, EP 0,090,748 A1, FR-A 2,552,440 and EP 0,365,483 A1. The mercaptocarboxylic esters also include polyol esters or the partial esters thereof.

Metal Hydroxycarboxylate Salts

In addition, metal hydroxycarboxylate salts may be present, and the metal may be an alkali metal or alkaline earth metal or aluminium. Preference is given to sodium, potassium, magnesium or calcium. The hydroxycarboxylic acid may be glycolic acid, lactic acid, malic acid, tartaric acid or citric acid or salicylic acid or 4-hydroxybenzoic acid, or else glyceric acid, gluconic acid and sugar acid (see, for example, PS-GB 1,694,873 and EP 303,564 A1).

Furthermore, other sheet lattice compounds such as lithium hydrotalcite may be used. Further remarks on this subject can be found in PS-EP 0,930,332 A1. The synthesis of L-CAM perchlorate is described, for example, in PS-EP 0,761,756 A1.

Fillers

For example, calcium carbonate, dolomite, wollastonite, magnesium oxide, magnesium hydroxide, silicates, china clay, talc, glass fibres, glass beads, woodmeal, mica, metal oxides or metal hydroxides, carbon black, graphite, rock flour, barite, glass fibres, talc, kaolin and chalk are used. Preference is given to chalk (including coated chalk) (HANDBOOK OF PVC FORMULATING E. J. Wickson, John Wiley & Sons, 1993, pp. 393-449) and reinforcing agents (TASCHENBUCH DER KUNSTSTOFFADDITIVE, R. Gächter & H. Müller, Carl Hanser, 1990, p. 549-615).

The fillers may be used in an amount of preferably at least 1 part, for example 5 to 200 parts, appropriately 5 to 150 parts and especially 5 to 100 parts by weight, based on 100 parts by weight of PVC.

Lubricants

Useful lubricants include, for example: montan waxes, fatty acid esters, PE and PP waxes, amide waxes, chloroparaffins, glycerol esters or alkaline earth metal soaps, and also fatty ketones and combinations thereof, as detailed in PS-EP 0,259,783 A1. Preference is given to calcium stearate.

Plasticizers

Useful organic plasticizers include, for example, those from the following groups:

(i) phthalic esters, such as preferably di-2-ethylhexyl phthalate, diisononyl phthalate and diisodecyl phthalate, which are also known by the common abbreviations DOP (dioctyl phthalate, di-2-ethylhexyl phthalate), DINP (diisononyl phthalate), DIDP (diisodecyl phthalate)

(ii) esters of aliphatic dicarboxylic acids, especially esters of adipic acid, azelaic acid and sebacic acid, preferably di-2-ethylhexyl adipate and diisooctyl adipate (iii) trimellitic esters, for example tri-2-ethylhexyl trimellitate, triisodecyl trimellitate (mixture), triisotridecyl trimellitate, triisooctyl trimellitate (mixture), and also tri-$C_6$-$C_8$-alkyl, tri-$C_6$-$C_{10}$-alkyl, tri-$C_7$-$C_9$-alkyl and tri-$C_9$-$C_{11}$-alkyl trimellitate; common abbreviations are TOTM (trioctyl trimellitate, tri-2-ethylhexyl trimellitate), TIDTM (triisodecyl trimellitate) and TITDTM (triisotridecyl trimellitate)

(iv) epoxy plasticizers; these are mainly epoxidized unsaturated fatty acids, e.g. epoxidized soyabean oil (v) polymer plasticizers: the most common starting materials for their preparation are dicarboxylic acids such as adipic acid, phthalic acid, azelaic acid and sebacic acid; diols such as 1,2-propanediol, 1,3-butanediol, 1,4-butanediol, 1,6-hexanediol, neopentyl glycol and diethylene glycol, (see ADMEX® types from Velsicol Corp. and PX-811 from Asahi Denka)

(vi) phosphoric esters: a definition of these esters can be found in the aforementioned "TASCHENBUCH DER KUNSTSTOFFADDITIVE" Chapter 5.9.5, pp. 408-412. Examples of such phosphoric esters are tributyl phosphate, tri-2-ethylbutyl phosphate, tri-2-ethylhexyl phosphate, trichloroethyl phosphate, 2-ethylhexyl diphenyl phosphate, cresyl diphenyl phosphate, triphenyl phosphate, tricresyl phosphate and trixylenyl phosphate; preference is given to tri-2-ethylhexyl phosphate and to Reofos® 50 and 95 (Ciba Spezialitätenchemie)

(vii) chlorinated hydrocarbons (paraffins)

(viii) hydrocarbons (ix) monoesters, e.g. butyl oleate, phenoxyethyl oleate, tetrahydrofurfuryl oleate and alkylsulphonic esters (x) glycol esters, e.g. diglycol benzoates (xi) citric esters, e.g. tributyl citrate and acetyltributyl citrate, as described in PS-WO 02/05206

(xii) perhydrophthalic, -isophthalic and -terephthalic esters, and also perhydroglycol and—diglycol benzoates; preference is given to perhydrodiisononyl phthalate (Hexamoll® DINCH—manufacturer: BASF), as described in PS-DE 197,56,913 A1, DE 199,27,977 A1, DE 199,27,978 A1 and DE 199,27,979 A1.

(xiii) castor oil-based plasticizers (Soft-N-Safe®, manufacturer: DANISCO)

(xiv) ketone-ethylene-ester terpolymers Elvaloy® KEE, (Elvaloy® 741, Elvaloy® 742, manufacturer: DuPont).

A definition of these plasticizers and examples thereof are given in "TASCHENBUCH DER KUNSTSTOFFADDITIVE", R. Gächter/H. Müller, Carl Hanser Verlag, 3rd Ed., 1989, Chapter 5.9.6, pages 412-415, and in "PVC TECHNOLOGY", W. V. Titow, 4th Ed., Elsevier Publ., 1984, pages 165-170. It is also possible to use mixtures of different plasticizers. The plasticizers may be employed in an amount of, for example, 5 to 50 parts by weight, appropriately 10 to 45 parts by weight, based on 100 parts by weight of PVC. Rigid PVC or semirigid PVC contains preferably up to 20%, more preferably up to 5% or no plasticizer.

Pigments

Suitable substances are known to those skilled in the art. Examples of inorganic pigments are $TiO_2$, zirconium oxide-based pigments, $BaSO_4$, zinc oxide (zinc white) and lithopone (zinc sulphide/barium sulphate), carbon black, carbon black-titanium dioxide mixtures, iron oxide pigments, $Sb_2O_3$, $(Ti,Ba,Sb)O_2$, $Cr_2O_3$, spinels such as cobalt blue and cobalt green, Cd(S,Se), ultramarine blue. Organic pigments are, for example, azo pigments, phthalocyanine pigments, quinacridone pigments, perylene pigments, diketopyrrolopyrrole pigments and anthraquinone pigments. Preference is given to $TiO_2$, also in micronized form. A definition and further descriptions can be found in "HANDBOOK OF PVC FORMULATING", E. J. Wickson, John Wiley & Sons, New York, 1993.

Antioxidants

These include sterically hindered phenols such as alkylated monophenols, e.g. 2,6-di-tert-butyl-4-methylphenol, alkylthiomethylphenols, e.g. 2,4-dioctylthiomethyl-6-tert-butylphenol, alkylated hydroquinones, e.g. 2,6-di-tert-butyl-4-methoxyphenol, hydroxylated thiodiphenyl ethers, e.g. 2,2'-thiobis(6-tert-butyl-4-methylphenol), alkylidenebisphenols, e.g. 2,2'-methylenebis(6-tert-butyl-4-methylphenol), benzyl compounds, e.g. 3,5,3',5'-tetra-tert-butyl-4,4'-dihydroxydibenzyl ether, hydroxybenzylated malonates, e.g. dioctadecyl 2,2-bis(3,5-di-tert-butyl-2-hydroxybenzyl)malonate, hydroxybenzyl aromatics, e.g. 1,3,5-tris(3,5-di-tert-butyl-4-hydroxybenzyl)-2,4,6-trimethylbenzene, triazine compounds, e.g. 2,4-bisoctyl-mercapto-6-(3,5-di-tert-butyl-4-hydroxyanilino)-1,3,5-triazine, phosphonates and phosphonites, e.g. dimethyl 2,5-di-tert-butyl-4-hydroxybenzylphosphonate, acylaminophenols, e.g. 4-hydroxylaurinilide, esters of beta(3,5-di-tert-butyl-4-hydroxyphenyl)propionic acid, of beta-(5-tert-butyl-4-hydroxy-3-methylphenyl) propionic acid, of beta-(3,5-dicyclohexyl-4-hydroxyphenyl) propionic acid, esters of 3,5-di-tert-butyl-4-hydroxyphenylacetic acid with mono- or polyhydric alcohols, amides of beta-(3,5-di-tert-butyl-4-hydroxyphenyl) propionic acid, e.g. N,N'-bis-(3,5-di-tert-butyl-4-hydroxyphenylpropionyl)hexamethylenediamine, vitamin E (tocopherol) and derivatives, and also D,L-ascorbic acid. The antioxidants may be employed in an amount of, for example, 0.01 to 10 parts by weight, appropriately 0.1 to 10 parts by weight and especially 0.1 to 5 parts by weight, based on 100 parts by weight of PVC.

UV Absorbers and Light Stabilizers

Examples thereof are benzotriazole derivatives, for example 2-(2'-hydroxyphenyl)-1,2,3-benzotriazoles, e.g. 2-(2'-hydroxy-5'-methylphenyl)benzotriazole, 2-(2'-hydroxy-5'-methylphenyl)-5-methylbenzotriazole, 2-(2'-hydroxy-3',5'-di-tert-butylphenyl)benzotriazole, 2-(2'-hydroxy-3',5'-di-tert-butylphenyl)-5-chlorobenzotriazole.

Further examples are 2-hydroxybenzophenones, esters of optionally substituted benzoic acids, e.g. 4-tert-butylphenyl salicylate, phenyl salicylate, acrylates, nickel compounds, oxalamides, e.g. 4,4'-dioctyloxyoxanilide, 2,2'-dioctyloxy-5,5'-di-tert-butyloxanilide, 2-(2-hydroxyphenyl)-1,3,5-triazines, e.g. 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, sterically hindered amines based on tetramethylpiperidine or tetramethylpiperazinone or tetramethylmorpholinone, e.g. bis(2,2,6,6-tetramethylpiperidin-4-yl)sebacate, bis(2,2,6,6-tetramethylpiperidin-4-yl) succinate, and also benzoxazinones such as 1,4-bis(benzoxazinonyl)benzene.

Optical Brighteners

Examples thereof are bis-1,4-benzoxazoles, phenylcoumarins and bisstyrylbiphenyls, such as 4-methyl-7-diethylaminocoumarin, 3-phenyl-7-(4-methyl-6-butoxybenzoxazole)coumarin, 4,4'-bis(benzoxazol-2-yl)stilbene and 1,4-bis(benzoxazol-2-yl)naphthalene. Preference is given to solutions of optical brighteners in a plasticizer, for example DOP.

Blowing Agents

Blowing agents are, for example, organic azo and hydrazo compounds, tetrazoles, oxazines, isatoic anhydride, N-methylisatoic anhydride, and also soda and sodium bicarbonate. Preference is given to azodicarbonamide and sodium bicarbonate, and to mixtures thereof. Very particular preference is given to isatoic anhydride or N-methylisatoic anydride, especially in flexible PVC or semirigid PVC.

Antistats

Antistats are divided into nonionic(a), anionic(b), cationic (c) and amphoteric(d) classes. (a) includes fatty acid ethoxylates, fatty acid esters, ethoxylated fatty alkylamines, fatty acid diethanolamides and ethoxylated phenols and alcohols, and also polyglycol monofatty acid esters. (b) includes alkali metal fatty alkanesulphonates and phosphoric acid bis(fatty alcohol ester) alkali metal salts. (c) includes quaternary fatty alkylammonium salts, and (d) includes fatty alkyl betaines and fatty alkyl imidazolinebetaines. Individual preferred compounds are lauric diethanolamide, myristyldiethanolamine, sodium octadecylsulphonate and sodium bis(octadecylphosphate). The presence of component (A), in many cases, owing to the inherent properties, permits a reduction in the amount of expensive antistats used.

Definitions and examples of further additives such as impact modifiers and processing aids, gelling agents, biocides, metal deactivators, flame retardants, antifogging agents and compatibilizers are described in "HANDBUCH DER KUNSTSTOFFADDITIVE", R. Gächter/H. Müller, Carl Hanser Verlag, 3rd Ed., 1989, and 4th Ed., 2001, and in "HANDBOOK OF POLYVINYL CHLORIDE FORMULATING" E. J. Wickson, J. Wiley & Sons, 1993, and also in "PLASTICS ADDITIVES" G. Pritchard, Chapman & Hall, London, 1st Ed., 1998. Impact modifiers are also described in detail in "IMPACT MODIFIERS FOR PVC", J. T. Lutz/D. L. Dunkelberger, John Wiley & Sons, 1992.

Further stabilizers may be 2-phenylindole, 2-pyrrolocarboxylic acid/esters, 2,4-diphenylpyrrole and 2-alkyl-4-phenylpyrrolo-3-carboxylic esters, and also 3-amino-4-alkyl/phenylpyrrolo-3-carboxylic esters (on this subject, see EP 1,299,466 A1).

Preference is also given to stabilizer systems which additionally comprise a substituted indole or a urea or an aniline derivative. Examples of suitable compounds are 2-phenyllaurylindole and N,N'-diphenylthiourea, and also phenylurea. Further examples are described in PS-DE 101,07,329 A1. On this subject, see also PS-EP 0,768,336 A1, EP 0,174,412, EP 0,967,245 A1, EP 0,967,209 A1, EP 0,967,208 A1, EP 0,962,491 A1, EP 1,044,968 A1, WO 02/072 684 and WO 02/048 249.

A particular preference lies in the combination of the (A)/(B-1), (B-2), (C-1), (C-2)+SCV or AS blends (especially (D), (E) and (F)) with phosphite esters, the additional phosphite being distearyl pentaerythrityl diphosphite, triphenyl phosphite, tris(nonyl)phenyl phosphite, phenyl didecyl phosphite, poly(dipropylene glycol) phenyl phosphite, tetraphenyl dipropylene glycol diphosphite, tetraisodecyl(dipropylene glycol) diphosphite, tris(dipropylene glycol) phosphite, decyl diphenyl phosphite, trioctyl phosphite, trilauryl phosphite or (nonylphenyl)$_{1.5}$-C$_{12}$/C$_{13}$-alkyl)$_{1.5}$-phosphite.

In the inventive compositions, the compounds of the general formulae (B-1/B-2) or (C-1/C-2)+SCV or AS, to achieve stabilization in the chlorinated polymer, should be used appropriately in an amount of 0.01 to 10, preferably of 0.05 to 5, based on 100 parts by weight of polymer. The inner complexes (A) will be employed in an amount of, for example, 0.001 to 10 parts, appropriately 0.01 to 5 parts, more preferably 0.01 to 3 parts by weight, based on 100 parts by weight of polymer. Preference is given to compositions in which the ratio of the compound of the general formulae (B) and (C) to the inner complexes (A), based on the weight, is in the range of 4:8:1 to 6:30:1.

Preference is given to compositions comprising 0.01 to 10 parts by weight of sterically hindered amine and/or NOR-HALS compound (G1-G5) and/or UV absorber and/or titanium dioxide.

Preferred compositions contain, based on 100 parts by weight of chlorinated polymer, 0.01-10 parts by weight of compound (B) and 0.01-10 parts by weight of compound (C) for 0.001-1 part by weight of the inner complexes (A).

Examples of the chlorinated polymers to be stabilized are polymers of vinyl chloride, of vinylidene chloride, vinyl resins containing vinyl chloride units in their structure, such as copolymers of vinyl chloride and vinyl esters of aliphatic acids, especially vinyl acetate, copolymers of vinyl chloride with esters of acrylic acid and methacrylic acid and with acrylonitrile, copolymers of vinyl chloride with diene compounds and unsaturated dicarboxylic acids or their anhydrides, such as copolymers of vinyl chloride with diethyl maleate, diethyl fumarate or maleic anhydride, post-chlorinated polymers and copolymers of vinyl chloride, copolymers of vinyl chloride and of vinylidene chloride with unsaturated aldehydes, ketones and others, such as acrolein, crotonaldehyde, vinyl methyl ketone, vinyl methyl ether, vinyl isobutyl ether and the like; polymers of vinylidene chloride and copolymers thereof with vinyl chloride and other polymerizable compounds; polymers of vinyl chloroacetate and of dichlorodivinyl ether; chlorinated polymers of vinyl acetate, chlorinated polymeric esters of acrylic acid and of alpha-substituted acrylic acid; polymers of chlorinated styrenes, for example dichlorostyrene; chlorine rubbers; chlorinated polymers of ethylene; polymers and post-chlorinated polymers of chlorobutadiene and the copolymers thereof with vinyl chloride, chlorinated natural and synthetic rubbers, and mixtures of the polymers mentioned with one another and with other polymerizable compounds. In the context of this invention, PVC is also understood to mean copolymers of vinyl chloride with polymerizable compounds such as acrylonitrile, vinyl acetate or ABS, and the polymers may be suspension polymers, bulk polymers or emulsion polymers.

Preference is given to a PVC homopolymer, also in combination with polyacrylates or polymethacrylates.

Also useful are graft polymers of PVC with EVA, ABS and MBS, as are graft polymers of PVC with PMMA. Preferred substrates are also mixtures of the aforementioned homo- and copolymers, especially vinyl chloride homopolymers, with other thermoplastic or/and elastomeric polymers, especially blends with ABS, MBS, NBR, SAN, EVA, CPE, MBAS, PMA, PMMA, EPDM and polylactones, especially from the group of ABS, NBR, NAR, SAN and EVA. The abbreviations used for the copolymers are familiar to those skilled in the art and mean the following: ABS acrylonitrile-butadiene-styrene; SAN styrene-acrylonitrile; NBR acrylonitrile-butadiene; NAR acrylonitrile-acrylate; EVA ethylene-vinyl acetate. Especially useful are also styrene-acrylonitrile copolymers based on acrylate (ASA). Preferred components in this connection are polymer compositions which contain, as components (i) and (ii), a mixture of 25-75% by weight of PVC and 75-25% by weight of the copolymers mentioned. Of particular significance as components are compositions composed of (i) 100 parts by weight of PVC and (ii) 0-300 parts by weight of ABS and/or SAN-modified ABS and 0-80 parts by weight of the copolymers NBR, NAR and/or EVA, but especially EVA.

In addition, useful substances for stabilization in the context of this invention are also especially recyclates of chlorinated polymers, which are the polymers described in detail above which have experienced damage through processing, use or storage. Particular preference is given to PVC recyclate. A further use of the inventive stabilizer combinations is based on imparting antistatic properties to the finished article composed of rigid or flexible PVC. In this way, it is possible to reduce the use of expensive antistats. For this application, preference is given to flexible PVC or semirigid PVC.

The present invention further provides a composition comprising flexible PVC and a stabilizer system which comprises 1,4-cyclohexanedimethanol diglycidyl ether.

The invention further provides goods for use (useful articles) which comprise PVC and inventive systems.

Preference is also given to the use of items for use which are notable for a particular fine foam structure. This is the case for rigid PVC, flexible PVC and semirigid PVC. This aspect is particularly important in the case of wallpaper and floors composed of flexible PVC. Normally, heavy metal compounds such as Zn or Sn stabilizers are required as kickers to achieve a fine foam. It has been found that, surprisingly, TEA inner complexes exert a kicker action on isatoic anhydride or N-methylisatoic anhydride, which ensures the achievement of a fine foam structure.

Nor was it foreseeable that the electrical resistance properties of an item for use which comprises TEA inner complexes as one component are improved significantly, which is found to be favourable especially in cable and insulator production and in applications in the semiconductor sector.

In addition, these items (mainly cables) are severed better when stored in water, since the formulations do not contain any zinc soaps and thus no zinc chloride is formed in the course of processing, which, after migration to the plastic surface, worsens the electrical values.

Moreover, in the case of zinc-sensitive applications, mainly in the flexible PVC sector (for example films, roof sheeting) which absolutely need biocidal modification, it is possible to add zinc-containing fungicides, which greatly restricts the use of calcium-zinc stabilizers.

The useable compounds and the chlorinated polymers are known in general terms to those skilled in the art and are described in detail in "HANDBUCH DER KUNSTOFFAD-DITIVE", R. Gächter/H. Müller, Carl Hanser Verlag, 3rd Ed., 1989 and 4th Ed. 2001, in PS-DE 197,41,778 A1 and EP 0,967,245 A1, to which reference is hereby made explicitly.

The inventive stabilization is suitable especially for chlorinated polymer compositions which are unplasticized or plasticizer-free or are essentially plasticizer-free compositions, and also for plasticized compositions. Particular preference is given to applications in rigid PVC or semirigid PVC.

The inventive compositions are suitable especially, in the form of formulations for rigid PVC, for hollow bodies (bottles), packaging films (thermoforming films), blown films, "Crash Pad" films (automobiles), tubes, foams, heavy profiles (window frames), light wall profiles, building profiles, films, blister packaging (including that produced by the Luvitherm process), profiles, sidings, fittings, office films, margarine tubs, packaging for chocolates and apparatus casings, insulators, computer casings and constituents of household appliances, and also for electronic applications, especially in the semiconductor sector. These are very particularly suitable for producing window profiles with high whiteness and surface shine. Preferred other compositions in the form of formulations for semirigid and flexible PVC are suitable for wire sheathing, cable insulation, decorative films, roof films, foams, agrochemical films, pipes, sealing profiles, floors, wallpaper, motor vehicle parts, flexible films, injection mouldings (blow-moulding), office films and films for air-inflated marquees. Examples for the use of the inventive compositions as plastisols are toys (rotomoulding), synthetic leather, floors, textile coatings, wallpaper, coil coatings and underbody protection for motor vehicles. Examples of sintered PVC applications of the inventive compositions are slush, slush mould and coil coatings, and also in E-PVC for films produced by the Luvitherm process. For further details on this subject see "KUNSTSTOFFHANDBUCH PVC", volume 2/2, W. Becker/H. Braun, 2nd Ed. 1985, Carl Hanser Verlag, p. 1236-1277.

Components (A) and (B-1)/(B-2) and/or (C-1)/(C-2) may be premixed together with other stabilizers or additives or PVC substrates, in which case further stabilizers present may preferably be alkaline earth metal hydroxides, zeolites, hydrotalcites, glycidyl compounds or melamine. Very particular preference is given here to so-called hot mixers which work within a temperature range of 80° C. up to 120° C. In this case, optimal homogenization is achieved. In the presence of PVC powder, stabilizers and further additives diffuse into the PVC grain. One variant consists in performing the mixing operation in a lubricant melt which may comprise calcium stearate or magnesium laurate or magnesium stearate or (hydroxy) stearic acid, in the presence of a calcium hydroxide or magnesium hydroxide, of a basic magnesium, calcium or aluminium salt, or of overbased compounds of magnesium and calcium, or of a polyol or of a zeolite, preference being given to maltitol, lactitol, palatinitol or zeolite A, calcium hydroxide, a basic calcium or magnesium salt or an overbased compound of magnesium or calcium.

Particular preference is given to the embodiment in which components (B-1)/(B-2) or/and (C-1)/(C-2)+SCV (especially (D), (E) and calcium hydroxide or melamine) are initially charged in this melt, and component (A) is metered in, it being possible for components (F) and (G) to be present in the premixture.

Appropriately, the stabilizers can be incorporated in another variant by the following methods: as an emulsion or dispersion (one possibility is, for example, the form of a pasty mixture, one advantage of the inventive system in this administration form is the stability of the paste); as a dry mixture during the mixing of additional components or polymer mixtures; by direct addition to the processing apparatus (e.g. calender, mixer, kneader, extruder and the like) or as solution or melt, or as flakes or pellets in dust-free form as a one-pack.

Particular preference is given to premixtures of component (A) with (B-1)/(B-2) or (C-1)/(C-2) with SCV (especially (D), (E) and calcium hydroxide or melamine), and optionally (F) or/and (G), in compacted form, produced in granulating apparatus, to obtain a non-dusting, non-tacky, free-flowing granule which can be digested very readily when blended with, for example, PVC and during the processing operation. It is highly advantageous, during the finishing (compaction or spraying operation) to add binders, which preferably consist of cellulose ethers or esters (mainly hydroxyethyl-, hydroxypropyl- and hydroxypropylmethylcellulose or carboxymethylcellulose). Alternatively, it is also possible to add polyvinyl alcohol or polyvinylpyrrolidone.

In addition to wet granulation, preference is given to dry granulation, which, in the presence of fatty acid salts of magnesium or calcium or metal-free lubricants based on esters or hydrocarbons, leads to a non-dusting free-flowing cylinder granule. In the presence of lubricants, preferably ester waxes, flakes, slugs or pellets are obtained in the melt granulation and are very easily dispersible in PVC.

The polymer stabilized in accordance with the invention can be prepared in a manner known per se, for which the inventive stabilizer mixture and any further additives are mixed with the polymer using apparatus known per se, such as the processing apparatus mentioned above. At the same time, the stabilizers can be added individually or in a mixture or else in the form of so-called masterbatches.

The polymer stabilized in accordance with the present invention can be brought into the desired form by known methods. Such methods are, for example, grinding, calendering, extrusion, injection moulding or spinning, and also extrusion blow-moulding. The stabilized polymer may also be processed to foams. The invention thus also provides a process for stabilizing chlorinated polymers by adding the inventive stabilizer mixture to a chlorinated polymer, and also articles which comprise PVC which is stabilized by the inventive stabilizer mixtures.

The invention further provides a process for stabilizing chlorinated polymers by adding an inventive stabilizer system to a chlorinated polymer, especially to flexible PVC or PVC paste. The flexible PVC may be suitable for the manufacture of floors, motor vehicle parts, wallpaper, flexible films, pipes, injection mouldings or preferably for wire sheathing (cables). Alternatively, the chlorinated polymer may also be rigid PVC. The chlorinated polymer may also serve for the production of films (including Luvitherm), PVC pipes or profiles, preferably window profiles.

The inventive inner complexes may be prepared in methanol, ethanol, propanol, triethanolamine or water, and the solvent and any water of reaction are removed by distillation. The distillation residue can subsequently be digested in a nonpolar solvent and be removed by filtration. Alternatively, the synthesis can be effected in an alcohol and the reaction product can then be precipitated by adding a nonpolar solvent.

EXAMPLES

These illustrate the invention in detail. Parts data are based—as also in the rest of the description—unless stated otherwise, on the weight.

1. Synthesis Examples 1.1 Triethanolamineperchlorato(triflato) Inner Complexes 1.1.1 TEA-perchloratosodium (TEAP)-[(TEA)Na(OClO$_3$)]

In a 1 l pear-shaped flask, 35.2 g of sodium perchlorate monohydrate (NaP*H$_2$O, 0.25 mol) and 37.3 g of triethanolamine (TEA, 0.25 mol) are dissolved in 100 ml of methanol. The reaction mixture is concentrated to dryness on a rotary evaporator at 72° C. (under reduced pressure towards the end), which also removes the water of hydration. This affords the anhydrous compound in crystalline form. The resulting product is dried in vacuo. Yield 67 g (quantitative), m.p.: 131° C. (sharp).

It is also possible to use aqueous NaP solutions, in which case stoichiometric amounts of TEA, dissolved in methanol, ethanol, isopropanol, THF, acetone or water, are added. Another alternative consists in using NaP(H$_2$O) suspensions in organic solvents, such as acetone, THF, glycol ethers (dimethoxyethane), isopropanol, dioxane, DMF, DMA, acetonitrile, etc.

Figure 1B:
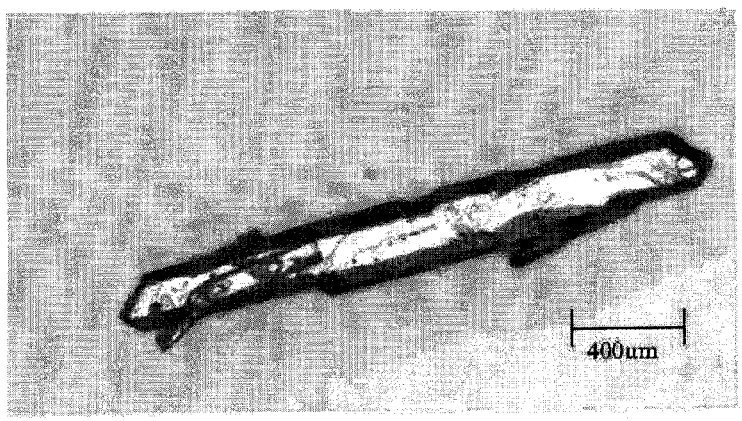
FIG. 1b is a micrograph of a TEAP crystal at a second scale.

The workup can likewise be modified by precipitating the TEA inner complexes from the above solutions by addition of relatively non-polar solvents such as acetic esters, hydrocarbons (aromatic or aliphatic), chlorinated hydrocarbons, ethers (MTBE), in the form of cluster-shaped crystals (see FIG. 1). These modifications may also be applied to the examples which follow.

1.1.2 Bis-TEA-perchloratocalcium (TECAP)-[(TEA)$_2$Ca (OClO$_3$)$_2$]

In a 1 l pear-shaped flask, 38.9 g of calcium perchlorate tetrahydrate (0.125 mol) and 37.3 g of triethanolamine (TEA, 0.25 mol) are dissolved in 100 ml of methanol. The reaction mixture is concentrated to dryness on a rotary evaporator at 72° C. (under reduced pressure towards the end), which also removes the water of hydration. This affords the anhydrous crystalline product. The resulting compound is dried in vacuo. Yield 67 g (quantitative), m.p.: >280-285° C. (decomposition—darkening of colour).

1.1.3 TEA-triflatosodium (TEAT)-[(TEA)Na(OSO$_2$CF$_3$)]

In a 1 l pear-shaped flask, 43.0 g of sodium triflate (0.25 mol) and 37.3 g of triethanolamine (TEA, 0.25 mol) are dissolved in 100 ml of methanol. The reaction mixture is concentrated to dryness on a rotary evaporator at 72° C. (under reduced pressure towards the end), which also removes the water of hydration. This affords the anhydrous crystalline product. The resulting compound is dried in vacuo. Yield 80 g (quantitative), m.p.: 97° C. (indistinct).

1.1.4 Bis-TEA-perchloratozinc (TEZIP)-[(TEA)$_2$Zn (OClO$_3$)$_2$]

In a 1 l pear-shaped flask, 4.7 g of zinc perchlorate hexahydrate (12.5 mmol) and 3.7 g of triethanolamine (TEA, 25 mmol) are dissolved in 20 ml of methanol. The reaction mixture is concentrated to dryness on a rotary evaporator at 72° C. (under reduced pressure towards the end), which also removes the water of hydration. This affords the anhydrous crystalline product. The resulting compound is dried in vacuo. Yield 7.0 g (quantitative), m.p.: glass-like sintering from 80° C.; 230-250° C. yellow to brown, liquid.

1.2. Dihydropyridine Compounds (DHPs)[2]

1.2.1 Dimethyl 4-dihydro-2,6-dimethylpyridine-3,5-dicarboxylate (mono-DHP)

In a 1 l round-bottomed flask, 73.5 g of methyl β-aminocrotonate, (MAC; 0.64 mol) and 30 g of formalin (37%) (1.1 mol) are dissolved in 500 ml of isopropanol, and stirred at 60° C. for 1 h. Subsequently, the mixture is heated at reflux for 6 h, in the course of which a yellow solid forms. The suspension is subsequently stirred into water and the precipitate is filtered off. The precipitate is washed with water, then with acetone, and dried in vacuo.

Yield: 57.4 g (corresponds to 80% of theory), m.p.: 224-225° C.

[2] Based on PS-EP286887

1.2.2 Bis[1,4-dihydro-2,6-dimethylpyridine-3,5-dicarboxylic acid]1,4-butanediol Diester (bis-DHP)

In a 1 l round-bottomed flask, 64.1 g of 1,4-butanediol bis-3-aminocrotonate (BAC; 0.25 mol) are dissolved with 57.6 g of methyl β-aminocrotonate, (MAC; 0.5 mol) and 75 g of formalin (37%) in 500 ml of isopropanol, and stirred at 60° C. for 1 h. Subsequently, the mixture is heated at reflux for 6 h, in the course of which a yellow solid forms. The suspension is subsequently stirred into water and the precipitate is filtered off. The precipitate is washed with water, then with acetone, and dried in vacuo.

Yield: 81 g (corresponds to 73% of theory), m.p.: 192-194° C.

1.2.3 Bis[1,4-dihydro-2,6-dimethylpyridine-3,5-dicarboxylic acid]thiodiethylene Glycol Diester (bis-thio-DHP)

In a 1 l round-bottomed flask, 72.1 g of thiodiglycol bis (aminocrotonate) (TAC; 0.25 mol) are dissolved with 57.6 g of methyl β-aminocrotonate (MAC; 0.5 mol) and 75 g of formalin (37%) in 500 ml of isopropanol, and stirred at 60° C. for 1 h. Subsequently, the mixture is heated at reflux for 6 h, in the course of which a yellow solid forms. The suspension is subsequently stirred into water and the precipitate is filtered off. The precipitate is washed with water, then with acetone, and dried in vacuo.

Yield: 64.5 g (corresponds to 56% of theory), m.p.: 148-152° C.

1.2.4 Poly[1,4-dihydro-2,6-dimethylpyridine-3,5-dicarboxylic acid]1,4-butanediol Ester (poly-DHP)

In a 1 l round-bottomed flask, 76.4 g of 1,4-butanediol bis(3-aminocrotonate) (BAC; 0.298 mol) are dissolved with 4.9 g of methyl β-aminocrotonate (MAC; 0.0426 mol) and 30 g of formalin (37%) in 500 ml of isopropanol, and stirred at 60° C. for 1 h. Subsequently, the mixture is heated at reflux for 6 h, in the course of which a yellow solid forms. The suspension is subsequently stirred into water and the precipitate is filtered off. The precipitate is washed with water, then with acetone, and dried in vacuo.

Yield: 63.9 g (corresponds to 80% of theory), m.p.: 218-220° C.

1.2.5 Poly[1,4-dihydro-2,6-dimethylpyridine-3,5-dicarboxylic Acid Thiodiethylene Glycol Ester](poly-thio-DHP)

In a 1 l round-bottomed flask, 86.5 g of thiodiglycol bis(aminocrotonate) (TAC; 0.30 mol) are dissolved with 4.9 g of methyl β-aminocrotonate (MAC; 0.0426 mol) and 30 g of formalin (37%) in 500 ml of isopropanol, and stirred at 60° C. for 1 h. Subsequently, the mixture is heated at reflux for 6 h, in the course of which a yellow solid forms. The suspension is subsequently stirred into water and the precipitate is filtered off. The precipitate is washed with water, then with acetone, and dried in vacuo.

Yield: 76.3 g (corresponds to 85% of theory), m.p.: 168-170° C.

2. Application Examples 2.1 Studies of Dehydrochlorination (DHC)

2.1.1 Preparation of the Powder Samples

A 1 l pear-shaped flask is initially charged with 5 or 10 g (corresponds to 100 phr) of PVC[a], and the additives according to the table examples are added. The mixtures consist of 1.6 phr of HCl scavenger (SCV), 0.4 phr of initial colour improver (ICI) and the appropriate amounts of TEAP booster (0.16 phr). Subsequently, 50 ml of methanol are added and this slurry is concentrated to dryness on a rotary evaporator at 72° C./reduced pressure. The resulting powder mixtures are homogenized in an Achat mortar. (The method is preferably for one or two liquid additives. When all additives are solid, sole homogenization can be effected in the Achat mortar, and the process of MeOH slurrying can be dispensed with.)

2.1.2 Performance of the Dehydrochlorination Measurements

The DHC is a measure of the HCl elimination of PVC, which takes place on thermal stress. The eliminated hydrochloric acid is flushed with nitrogen gas into a reservoir comprising dist. water, and the rise in conductivity in microsiemens per centimetre (μS/cm) is measured there. The characteristics used are the accompanying minute values (min). The longer the time interval to achieve a particular conductivity, the more thermally stable is the PVC sample.

Instrument type: PVC thermomat 763 (from Metrohm)

The measurements were effected to DN 53381 Part 1, Method B: Conductivity measurement.

| Parameters: | | |
|---|---|---|
| Initial sample weight: | 500 ± 5 mg | |
| Temperature: | 180° C. | |
| Flow: | 7 l/h (nitrogen 5.0) | |
| Absorption vol.: | 60 ml (demineralized water) | |
| Evaluation: | $t_{10}$, $t_{50}$ and $t_{200}$ (conductivity of 10, 50 and 200 μS/cm - data in minute values) | |

Measurement: after the powder samples have been weighed into the reaction vessels, the measurement vessels are filled with demineralized water and equipped with conductivity electrodes. On attainment of the measurement temperature (180° C.), the closed reaction vessels are transferred to the heating block and coupled to the measurement vessels via the appropriate pipe connections, and the measurement is started. The stability criteria used are the $t_{10}$, $t_{50}$ and $t_{200}$ values.

2.1.3 Examples 2.1.3.1 Effect of (A) as a Singular PVC Stabilizer (Tab. 1)

Experiment 1: 100 phr of PVC[3] without stabilizer (booster)
Experiment 2: 100 phr of PVC[3]+booster

[3] Vinnolit S 3160, K value 60

TABLE 1

| Experiment No. | $t_{10}$ [min] | $t_{50}$ [min] | $t_{200}$ [min] | TEAP[4] [phr] |
|---|---|---|---|---|
| 1 | 6 | 19 | 44 | — |
| 2 | 30 | 59 | 154 | 0.16 |

[4] Triethanolamineperchloratosodium (Synthesis Example 1.1.1)

It is evident that the inventive formulation (Experiment 2), compared to unstabilized PVC, has a drastic rise in the thermal stabilization ($t_{10}$=400%, $t_{50}$=210% and $t_{200}$=250%).

2.1.3.2 Effect of (A) as a PVC Stabilizer (in the Presence of HCl Scavenger SCV)

2.1.3.2.1 Inorganic (Mineral) Compounds as SCV (Tab. 2)

TABLE 2

| Experiment No. | SCV | $t_{10}$ [min] | $t_{50}$ [min] | $t_{200}$ [min] | TEAP [phr] |
|---|---|---|---|---|---|
| 3 | CaH (u)[5] | 130 | 201 | 398 | 0.16 |
| 4 | CaH (c)[6] | 168 | 252 | 444 | 0.16 |
| 5 | CaH (u)[5] | 37 | 58 | 124 | — |
| 6 | CaH (c)[6] | 34 | 46 | 75 | — |

[5] Calcium hydroxide (uncoated)
[6] Calcium hydroxide (coated with 7% Edenor L2SMGS - Cognis)

The results show that the effect of uncoated and coated calcium hydroxide by virtue of addition of catalytic amounts of TEAP is improved highly efficiently with regard to initial, intermediate and final stability.

| Tab. 2 continued | | | | | |
|---|---|---|---|---|---|
| 7 | Hytal[7] | 89 | 125 | 235 | 0.16 |
| 8 | Hytal[7] | 43 | 56 | 88 | — |
| 9 | Sorbacid 939[8] | 76 | 116 | 238 | 0.16 |
| 10 | Sorbacid 911[8] | 114 | 146 | 251 | 0.16 |
| 11 | Sorbacid 939[8] | 29 | 43 | 88 | — |
| 12 | Sorbacid 911[8] | 55 | 66 | 94 | — |
| 13 | Pural MG63HT[9] | 128 | 170 | 331 | 0.16 |
| 14 | Pural MG63HT[9] | 55 | 65 | 93 | — |
| 14a | DASC 265[9a] | 100 | 166 | 343 | 0.16 |
| 14b | DASC 265[9a] | 34 | 52 | 100 | — |

[7] Hydrotalcite (ALDRICH)
[8] Hydrotalcite (from Südchemie)
[9] Hydrotalcite (from Sasol)
[9a] Dihydroxyaluminium sodium carbonate, type A 265 (from BK Giulini)

It has been found that the performance of commercially available magnesium aluminium hydrocarbonates (hydrotalcites, LDHs, anionic clays) can be improved significantly by addition of TEAP.

Tab. 2 (continued)

| 15 | NaZA[10] | 80 | 112 | 228 | 0.16 |
| 16 | NaZA[10] | 26 | 38 | 73 | — |

[10] Sodium zeolite A (molecular sieve, 4A, powder < 5 microns, activated - ALDRICH)

The findings show that the thermal stabilizer effect of commercially available sodium zeolite A is improved significantly when TEAP is added.

Tab. 2 (continued)

| 17 | MgH[11] | 43 | 113 | 163 | 0.16 |
| 18 | MgH[11] | 13 | 22 | 46 | — |
| 19 | CaAcac[12] | 111 | 170 | 326 | 0.16 |
| 20 | CaAcac[12] | 50 | 69 | 118 | — |
| 21 | MgAcac[13] | 92 | 112 | 166 | 0.16 |
| 22 | MgAcac[13] | 79 | 87 | 115 | — |

[11] Magnesium hydroxide (FLUKA)
[12] Calcium acetylacetonate (from MCC)
[13] Magnesium acetylacetonate (ALDRICH)

Here too, addition of TEAP can clearly achieve a significant rise in the thermal stability.

A comparison of Experiment 23 (CaH with sodium perchlorate) with Experiment 3 (CaH with TEAP, based on equal numbers of moles of NaP) shows that, when TEAP is used, a 78% rise is recorded in the $t_{10}$ value, a 60% rise in the $t_{50}$ value and a 49% rise in the $t_{200}$ value. Moreover, the comparison of Experiments 24 and 25 (Hytal+NaP and NaZA+NaP) with Experiments 7 and 15 (Hytal+TEAP and NaZA+TEAP) shows a significant improvement in the thermal stability when TEAP is used as a booster.

2.1.3.2.1.2 PA-1[16]

[16] Specific prior art 1

PS-DE 10124734A1 (PA-1) states that aqueous sodium perchlorate solutions should be applied to calcium oxide in the presence of calcium hydroxide, the water of the solution being bound according to:

$$CaO+H_2O \rightarrow Ca(OH)_2$$

this results in a solid which comprises, as components, $NaClO_4$ (or $NaClO_4 \ast H_2O$) and $Ca(OH)_2$.

These substances are used as PVC thermal (co)stabilizers. In a series, the products obtained by given processes were compared with CaH/TEAP (1.6/0.16 phr) in equal amounts, with equal CaH amounts, and with equal (molar) amounts of $ClO_4$, to obtain the following results (Tab. 4).

TABLE 4

| Experiment No. | Stabilizer system Substance/(amount) [phr] | Σ Stab. [phr] | $t_{10}$ [min] | $t_{50}$ [min] | $t_{200}$ [min] | Remark |
|---|---|---|---|---|---|---|
| 26 | TEAP (reference) CaH (1.6) TEAP (0.16) [17] | 1.760 | 146 | 220 | 403 | Inventive, yellow colour |
| 27 | VP-1 [18] (equal CaH) CaH (1.6) NaP (0.16) | 1.760 | 85 | 143 | 279 | According to PA-1, orange colour |
| 28 | VP-1 [18] (equal NaP) CaH (0.648) NaP (0.072) | 0.72 | 39 | 70 | 164 | According to PA-1, orange colour |
| 29 | CaH/NaP (external) CaH (1.6) NaP (0.072) | 1.672 | 91 | 166 | 344 | Not patented, yellow colour |
| 30 | VP-2 [18] (equal CaH/NaP) CaH (1.6) NaP (0.072) | 1.672 | 85 | 149 | 300 | According to PA-1, orange colour |

[17] 0.16 phr of TEAP corresponds to 0.072 phr of $NaClO_4 \times H_2O$ (equal $ClO_4$)
[18] VP-1,2 = Experimental products according to PA PS DE 10124734A1 (Example 3)

2.1.3.2.1.1 Comparison with Prior Art (PA[14])—Tab. 3

[14] General prior art

TABLE 3

| Experiment No. | SCV | $t_{10}$ [min] | $t_{50}$ [min] | $t_{200}$ [min] | NaP [15] [phr] |
|---|---|---|---|---|---|
| 23 | CaH(u) [5] | 73 | 126 | 267 | 0.08 |
| 24 | Hytal [7] | 82 | 109 | 182 | 0.08 |
| 25 | NaZA [10] | 48 | 75 | 156 | 0.08 |

[15] Sodium perchlorate monohydrate (MERCK)

The patented (PA-1) DHC values are averaged over several experiments. The comparison of Experiment 26 with Experiment 27 shows, with the same total amount of stabilizer (Σ stab.) (1.76 phr) and equal CaH (1.6 phr), a rise in the $t_{10, 50, 200}$ values by 72%, 54% and 44%. An additional factor is that the NaP content in Experiment 27 is increased by a factor of 2, which greatly increases the proportional cost factor. A comparison of the patented PA-1 internal mixtures with unpatented external mixtures (Experiment 27, 29) shows a poorer performance for the former (patented). A comparison shows that, with equal CaH and NaP (Experiment 26 compared to patented Experiment 30), there is an improvement in effect in relation to the $t_{10, 50, 200}$ values by 72%, 48% and 34%. Moreover, the PVC powder samples, after the end of the experiment, in the patented (PA-1) experiments (27, 28, 29), show a significantly darker colour, even though the thermal stress (180° C.) of the PA samples at 279, 164 and 300 min was significantly lower than the inventive Experiment 26, which was thermally stressed over a period of 403. The unpatented Experiment 29 likewise has a significantly lighter yellow colour after longer thermal stress.

2.1.3.2.1.3 PA-2[19]

[19] Specific prior art 2

PS-DE 10160662A1 and DE 10214152A1 (PA-2) claim onium (ammonium) perchlorate salts as heat (co) stabilizers. In one series, the closest compounds (PA-2) were compared with inventive CaH/TEAP systems in equal use amounts (CaH+booster=1.6+0.16 phr) (Tab. 5 and 6).

TABLE 6-continued

| Experiment No. | Substance (Tab. 5) | $t_{10}$ [min] | $t_{50}$ [min] | $t_{200}$ [min] | Remark |
|---|---|---|---|---|---|
| 34 | TEHAP | 38 | 71 | 152 | No amine perchlorate Light brown colour |

The quality factors (improvement in performance) of the inventive system (Experiment 31) compared to Experiment 32 are 41%, 37% and 28%; compared to Experiment 33, 38%, 115% and 104%; and compared to Experiment 34 (all PA-2), 300%, 221% and 176%, with regard to the $t_{10, 50, 200}$ values. This demonstrates clear superiority over PA-2. Moreover, the samples according to PA-2, after the thermal stress, are more

TABLE 5

| Substance | Name | Synonym/ abbreviation | $ClO_4$ content [%$_{calc.}$] | M.W. [g/mol] | m.p. [° C.] |
|---|---|---|---|---|---|
| (structure) | Triethanolamine-perchloratosodium | TEAP | 36.6 | 271.7 | 132 |
| (structure) | Monohydroxyethyl-diethylammonium perchlorate | MEHAP | 45.7 | 217.7 | <RT |
| (structure) | Trihydroxyethyl-ammonium perchlorate | TREHAP | 39.9 | 249.7 | 40 |
| (structure) | Tetraethylammonium perchlorate | TEHAP | 43.3 | 229.8 | >300 |

TABLE 6

| Experiment No. | Substance (Tab. 5) | $t_{10}$ [min] | $t_{50}$ [min] | $t_{200}$ [min] | Remark |
|---|---|---|---|---|---|
| 31 | TEAP (reference) | 152 | 228 | 420 | No amine perchlorate Yellow colour |
| 32 | MEHAP | 108 | 167 | 327 | Amine perchlorate Yellow-orange colour |
| 33 | TREHAP | 64 | 106 | 206 | Amine perchlorate Orange-brown colour | strongly coloured than the inventive samples, even though the thermal stress times of 327, 206 and 152 min are significantly lower than that of 420 min for Experiment 31.

What is conspicuous is the moderate finding for 33 (TREHAP), which, in a formal sense, is similar to TEAP (exchange of H for Na). The improvement in performance for this compound is reported above. In terms of activity, Experiment 34 (TEHAP) declines even further, which is probably because it is not an amine perchlorate but rather a (true) (amm)onium perchlorate, and the onium salt structure exerts a contrary (destabilizing) effect.

The amine perchlorates 31 and 32 are, as NH perchlorates, critical in their handling, since they are shock-sensitive and explosive. Equally, perchloric acid is absolutely necessary for their preparation, which has specific labelling requirements as a risk substance with the symbol for irritant and the R statement 5-8-35.

2.1.3.2.2 Organic Compounds as SCV (Tab. 7 and 8)

TABLE 7

| Experiment No. | SCV Cyanamide | $t_{10}$ [min] | $t_{50}$ [min] | $t_{200}$ [min] | TEAP [phr] |
|---|---|---|---|---|---|
| 35 | Didi-f [20] | 59 | 64 | 75 | — |
| 36 | Didi-n [21] | 56 | 61 | 70 | — |
| 37 | Didi-f [20] | 82 | 99 | 132 | 0.16 |

[20] Dyhard 100SH, cyanoguanidine (dicyandiamide), fine particles (from Degussa)
[21] Cyanoguanidine (dicyandiamide), normal particles (from Degussa)

It is evident that TEAP addition to cyanoguanidine gives rise to a significant improvement in the thermal stability ($t_{10}$=39%, $t_{50}$=55%, $t_{200}$=76%).

Tab. 7 (cont.)

| 38 | Mel-n [22] | 61 | 65 | 79 | — |
|---|---|---|---|---|---|
| 39 | Mel-f [23] | 49 | 53 | 65 | — |
| 40 | Mel-f [23] | 145 | 175 | 265 | 0.16 |
| 41 | ACEGA [24] | 31 | 35 | 44 | — |
| 42 | ACEGA [24] | 113 | 146 | 240 | 0.16 |

[22] Melamine - normal particles (ALDRICH)
[23] Melamine 003 fine-particle product (from DSM)
[24] Acetoguanamine (ALDRICH)

It is found that the inventive combination of aminotriazine/TEAP (Experiment 40), compared to the non-inventive formulation (Experiment 39), gives rise to a relevant improvement stimulus in the thermal stabilization ($t_{10}$=196%, $t_{50}$=230%, $t_{200}$=308%). In addition, it is evident that the combination of acetoguanamine/TEAP (Experiment 42), compared to Experiment 41 (without TEAP), is significantly more thermally stable ($t_{10}$=265%, $t_{50}$=317%, $t_{200}$=445%).

TABLE 8

| Experiment No. | SCV Epoxide | $t_{10}$ [min] | $t_{50}$ [min] | $t_{200}$ [min] | NaP [phr] | TEAP [phr] |
|---|---|---|---|---|---|---|
| 43 | BADGE [25] | 18 | 34 | 74 | — | — |
| 44 | BADGE [25] | 42 | 84 | 234 | — | 0.16 |
| 45 | BADGE [25] | 19 | 40 | 110 | 0.08 | — |
| 46 | BFDGE [26] | 16 | 30 | 68 | — | — |
| 47 | BFDGE [26] | 39 | 77 | 205 | — | 0.16 |
| 48 | BFDGE [26] | 22 | 44 | 115 | 0.08 | — |
| 49 | Epikote 828 [27] | 14 | 28 | 67 | — | — |
| 50 | Epikote 828 [27] | 68 | 124 | 276 | — | 0.16 |
| 51 | Epikote 828 [27] | 28 | 58 | 154 | 0.08 | — |
| 52 | Epikote 1002 [28] | 14 | 28 | 72 | — | — |
| 53 | Epikote 1002 [28] | 36 | 62 | 150 | — | 0.16 |
| 54 | Epikote 1002 [28] | 25 | 74 | 117 | 0.08 | — |
| 55 | Hexdge [29] | 35 | 52 | 92 | — | — |
| 56 | Hexdge [29] | 122 | 150 | 270 | — | 0.16 |
| 57 | Hexdge [29] | 46 | 66 | 133 | 0.08 | — |
| 57a | c-Hexdge [29a] | 128 | 153 | 246 | — | 0.16 |
| 57b | c-Hexdge [29a] | 25 | 43 | 101 | 0.08 | — |
| 58 | Glydi [30] | 40 | 57 | 89 | — | — |
| 59 | Glydi [30] | 103 | 130 | 201 | — | 0.16 |
| 60 | Glydi [30] | 37 | 61 | 127 | 0.08 | — |
| 61 | Glytri [31] | 25 | 44 | 82 | — | — |
| 62 | Glytri [31] | 70 | 100 | 186 | — | 0.16 |
| 63 | Glytri [31] | 37 | 60 | 128 | 0.08 | — |
| 64 | TEPC [32] | 64 | 100 | 156 | — | — |

TABLE 8-continued

| Experiment No. | SCV Epoxide | $t_{10}$ [min] | $t_{50}$ [min] | $t_{200}$ [min] | NaP [phr] | TEAP [phr] |
|---|---|---|---|---|---|---|
| 65 | TEPC [32] | 185 | 240 | 374 | — | 0.16 |
| 66 | TEPC [32] | 119 | 173 | 260 | 0.08 | — |
| 67 | LankL [33] [3.2 phr] | 17 | 37 | 93 | — | — |
| 68 | LankL [33] [3.2 phr] | 34 | 56 | 146 | — | 0.16 |
| 69 | LankL [33] [3.2 phr] | 24 | 44 | 116 | 0.08 | — |
| 70 | Lank07 [34] [3.2 phr] | 16 | 31 | 71 | — | — |
| 71 | Lank07 [34] [3.2 phr] | 31 | 56 | 151 | — | 0.16 |
| 72 | Lank07 [34] [3.2 phr] | 23 | 46 | 127 | 0.08 | — |
| 73 | Card [35] [3.2 phr] | 25 | 39 | 83 | — | — |
| 74 | Card [35] [3.2 phr] | 41 | 72 | 197 | — | 0.16 |
| 75 | Card [35] [3.2 phr] | 38 | 68 | 179 | 0.08 | — |

[25] Bisphenol A diglycidyl ether (ALDRICH)
[26] Bisphenol F diglycidyl ether (ALDRICH)
[27] Bisphenol A diglycidyl ether - liquid (from Resolution)
[28] Bisphenol A diglycidyl ether - solid (from Resolution)
[29] Hexanediol 1,6-diglycidyl ether (Grilonit RV 1812, from EMS - Primid)
[29a] 1,4-Cyclohexanedimethanol diglycidyl ether (POLYPOX R11, from UPPC-AG)
[30] Glycerol diglycidyl ether (ALDRICH)
[31] Glycerol triglycidyl ether (Glycidether 100, ROTH)
[32] Tris(2,3-epoxypropyl) isocyanurate (ALDRICH) - Triglycidyl isocyanurate
[33] Lankroflex L (from Akzo Nobel) - epoxidized linseed oil
[34] Lankroflex 2307 (from Akzo Nobel) - ESBO
[35] Cardura E10P (from Resolution) - Glycidyl neodecanoate It is found that all epoxy compounds, when TEAP is added, bring a significant improvement in the $t_{10}$ values of 144% (Experiment 46 vs. 47) to 189% (Experiment 64 vs. 65), in the $t_{50}$ values of 104% (Experiment 55 vs. 56) to 343% (Experiment 49 vs. 50), and in the $t_{200}$ values of 108% (Experiment 52 vs. 53) to 312% (Experiment 49 vs. 50).

2.1.3.2.3 Metal Soaps as SCV (Tab. 9-A)

TABLE 9-A

| Experiment No. | SCV Metal soaps | $t_{10}$ [min] | $t_{50}$ [min] | $t_{200}$ [min] | TEAP [phr] |
|---|---|---|---|---|---|
| 76-A | AldiSt [36] [3.2 phr] | 11 | 20 | 41 | — |
| 77-A | AldiSt [36] [3.2 phr] | 21 | 41 | 113 | 0.16 |
| 78-A | MgSt [37] [3.2 phr] | 14 | 26 | 65 | — |
| 79-A | MgSt [37] [3.2 phr] | 34 | 54 | 117 | 0.16 |
| 80-A | CaSt [38] [3.2 phr] | 24 | 37 | 70 | — |
| 81-A | CaSt [38] [3.2 phr] | 50 | 74 | 151 | 0.16 |
| 82-A | Ca/Zn-1 [39] | 13 | 15 | 26 | — |
| 83-A | Ca/Zn-1 [39] | 37 | 43 | 61 | 0.16 |
| 84 | Ca/Zn-2 [40] | 28 | 38 | 74 | — |
| 85 | Ca/Zn-2 [40] | 41 | 51 | 92 | 0.16 |

[36] Aluminium distearate (from Peter Greven Fettchemie)
[37] Magnesium stearate (from Nitika Chemicals)
[38] Calcium stearate (from Nitika Chemicals)
[39] Bäropan MC 8383 FP (from Bärlocher)
[40] Astab CZB (from Sun Ace)

As is evident, when commercially available stabilizer systems based on calcium/zinc soaps (mixed metals) are used, a significant improvement in the effects is achievable by virtue of addition of TEAP.

2.1.3 Effect of (A) as a PVC Stabilizer (in the Presence of Initial Colour Improvers—ICIs)—Tab. 9-B

TABLE 9-B

| Experiment No. | ICI Various | $t_{10}$ [min] | $t_{50}$ [min] | $t_{200}$ [min] | TEAP [phr] |
|---|---|---|---|---|---|
| 76-B | CADMU [44] | 37 | 65 | 162 | 0.16 |
| 77-B | CADMU [44] | 14 | 25 | 54 | — |
| 78-B | DMAU [43] | 30 | 58 | 137 | 0.16 |
| 79-B | DMAU [43] | 16 | 25 | 41 | — |

TABLE 9-B-continued

| Experiment No. | ICI Various | $t_{10}$ [min] | $t_{50}$ [min] | $t_{200}$ [min] | TEAP [phr] |
|---|---|---|---|---|---|
| 80-B | AC-1 [41] | 37 | 64 | 141 | 0.16 |
| 81-B | AC-1 [41] | 17 | 31 | 55 | — |
| 82-B | M-DHP-1 [46] | 46 | 58 | 130 | 0.16 |
| 83-B | M-DHP-1 [46] | 19 | 41 | 91 | — |

[41] 1,4-Butylene glycol bis-3-aminocrotonate (from Lonza)

It is clearly evident that the various initial colour improvers, by virtue of addition of TEAP, a performance improvement takes place, specifically a rise in the $t_{10}$, $t_{50}$ and $t_{200}$ values of 88-164%, 41-160% and 43-200%.

2.1.3.4 Effect of (A) as a PVC Stabilizer (in the Presence of SCV+ICI)

2.1.3.4.1 Inorganic (Mineral) Compounds as SCV (Tab. 10)

TABLE 10

| Experiment No. | SCV | ICI | $t_{10}$ [min] | $t_{50}$ [min] | $t_{200}$ [min] | NaP [phr] | TEAP [phr] |
|---|---|---|---|---|---|---|---|
| 86 | CaH (u)[5] | AC-1[41] | 46 | 56 | 70 | — | — |
| 87 | CaH (u)[5] | AC-1[41] | 119 | 145 | 213 | — | 0.16 |
| 88 | CaH (u)[5] | AC-2[42] | 106 | 131 | 197 | — | 0.16 |
| 89 | CaH (u)[5] | DMAU[43] | 30 | 37 | 50 | — | — |
| 90 | CaH (u)[5] | DMAU[43] | 67 | 84 | 122 | 0.08 | — |
| 91 | CaH (u)[5] | DMAU[43] | 119 | 158 | 260 | — | 0.16 |
| 92 | CaH (u)[5] | CADMU[44] | 29 | 37 | 50 | — | — |
| 93 | CaH (u)[5] | CADMU[44] | 117 | 148 | 226 | — | 0.16 |
| 94 | CaH (u)[5] | M-DHP-1[46] | 121 | 160 | 265 | — | 0.16 |
| 95 | CaH (u)[5] | M-DHP-2[47] | 93 | 146 | 317 | — | 0.16 |
| 96 | CaH (c)[6] | AC-1[41] | 52 | 59 | 71 | — | — |
| 97 | CaH (c)[6] | AC-1[41] | 107 | 126 | 160 | 0.08 | — |
| 98 | CaH (c)[6] | AC-1[41] | 161 | 188 | 244 | — | 0.16 |
| 99 | CaH (c)[6] | AC-2[42] | 51 | 58 | 68 | — | — |
| 100 | CaH (c)[6] | AC-2[42] | 156 | 182 | 238 | — | 0.16 |
| 101 | CaH (c)[6] | DMAU[43] | 34 | 39 | 49 | — | — |
| 102 | CaH (c)[6] | DMAU[43] | 75 | 90 | 124 | 0.08 | — |
| 103 | CaH (c)[6] | DMAU[43] | 133 | 176 | 283 | — | 0.16 |
| 104 | CaH (c)[6] | CADMU[44] | 121 | 155 | 228 | — | 0.16 |
| 105 | CaH (c)[6] | Naf[45] | 52 | 61 | 77 | — | — |
| 106 | CaH (c)[6] | Naf[45] | 142 | 218 | 406 | — | 0.16 |
| 107 | CaH (c)[6] | M-DHP-1[46] | 96 | 113 | 137 | — | — |
| 108 | CaH (c)[6] | M-DHP-1[46] | 135 | 198 | 345 | — | 0.16 |
| 109 | CaH (c)[6] | M-DHP-2[47] | 60 | 70 | 84 | — | — |
| 110 | CaH (c)[6] | M-DHP-2[47] | 86 | 130 | 262 | 0.08 | — |
| 111 | CaH (c)[6] | M-DHP-2[47] | 147 | 217 | 419 | — | 0.16 |

[42] Thiodiglycol bis-3-aminocrotonate (from Lonza)
[43] 1,3-Dimethyl-6-aminouracile
[44] N-Cyanoacetyl-N,N'-dimethylurea
[45] 2-Naphthol (ALDRICH)
[46] Monodihydropyridine (1,4-dihydro-2,6-dimethylpyridine-3,5-dicarboxylic acid dimethylester – Synthesis Example 1.2.1)
[47] Monodihydropyridine (Stavinor ® D507 - from Arkema)

Compared to experiments without ICI and without TEAP (Experiments 5 and 6), a positive influence on the thermal stability arises, which is manifested to a high degree especially in Experiments 91, 94, 121 and 100, 103, 106, 108 and 111.

CaH(u) and CaH (c) exhibit, in combination of ICI with TEAP, compared to the experiments without TEAP (87 vs. 86, 91 vs. 89, 93 vs. 92, 98 vs. 96, 100 vs. 99, 103 vs. 101, 106 vs. 105, 108 vs. 107 and 111 vs. 109), a drastic rise in the $t_{10}$, $t_{50}$ and $t_{200}$ values by 41-303%, 75-351%, and 152-478%. The TEAP combinations exhibit, compared to the sodium perchlorate combinations (NaP*H$_2$O) with the same numbers of moles (91 vs. 90, 98 vs. 97, 103 vs. 102 and 111 vs. 110), which correspond to the PA, likewise very significant rises in the $t_{10}$, $t_{50}$ and $t_{200}$ values, specifically by 50-78%, 49-96% and 53-128%.

Tab. 10 (continued)

| | | | | | | |
|---|---|---|---|---|---|---|
| 112 | Hytal[7] | AC-1[41] | 54 | 60 | 73 | — | — |
| 113 | Hytal[7] | AC-1[41] | 136 | 160 | 209 | — | 0.16 |
| 114 | Hytal[7] | AC-2[42] | 119 | 147 | 200 | — | 0.16 |
| 115 | Hytal[7] | DMAU[43] | 42 | 48 | 58 | — | — |
| 116 | Hytal[7] | DMAU[43] | 70 | 79 | 94 | 0.08 | — |
| 117 | Hytal[7] | DMAU[43] | 97 | 111 | 136 | — | 0.16 |
| 118 | Hytal[7] | CADMU[44] | 79 | 87 | 101 | 0.08 | — |
| 119 | Hytal[7] | CADMU[44] | 104 | 120 | 148 | — | 0.16 |
| 120 | Hytal[7] | Naf[45] | 107 | 143 | 273 | — | 0.16 |
| 121 | Hytal[7] | M-DHP-1[46] | 116 | 162 | 281 | — | 0.16 |
| 122 | Hytal[7] | M-DHP-2[47] | 102 | 137 | 233 | — | 0.16 |
| 123 | Pural[9] | Naf[45] | 110 | 142 | 266 | — | 0.16 |
| 124 | Pural[9] | M-DHP-2[47] | 75 | 83 | 100 | — | — |
| 125 | Pural[9] | M-DHP-2[47] | 113 | 139 | 220 | 0.08 | — |
| 126 | Pural[9] | M-DHP-2[47] | 131 | 161 | 251 | — | 0.16 |
| 127 | Sorbacid911[8] | AC-1[41] | 73 | 80 | 95 | — | — |
| 128 | Sorbacid911[8] | AC-1[41] | 107 | 119 | 146 | 0.08 | — |
| 129 | Sorbacid911[8] | AC-1[41] | 146 | 165 | 205 | — | 0.16 |
| 130 | Sorbacid911[8] | AC-2[42] | 142 | 162 | 205 | — | 0.16 |
| 131 | Sorbacid911[8] | Naf[45] | 103 | 129 | 220 | — | 0.16 |
| 132 | Sorbacid911[8] | M-DHP-2[47] | 61 | 65 | 76 | — | — |
| 133 | Sorbacid911[8] | M-DHP-2[47] | 107 | 134 | 218 | 0.08 | — |
| 134 | Sorbacid911[8] | M-DHP-2[47] | 137 | 170 | 270 | — | 0.16 |
| 135 | Sorbacid939[8] | AC-1[41] | 110 | 137 | 196 | — | 0.16 |
| 136 | Sorbacid939[8] | AC-2[42] | 101 | 129 | 192 | — | 0.16 |
| 136a | DASC 265[9a] | DMAU[43] | 99 | 119 | 143 | — | 0.16 |
| 136b | DASC 265[9a] | DMAU[43] | 81 | 101 | 175 | 0.08 | — |
| 136c | DASC 265[9a] | DMAU[43] | 34 | 42 | 53 | — | — |

In the Hytal system too, combinations of ICI with TEAP exhibit, compared to the experiments without TEAP (113 vs. 112, 117 vs. 115, 126 vs. 124, 129 vs. 127 and 134 vs. 132), a very significant rise in the $t_{10}$, $t_{50}$ and $t_{200}$ values by 75-152%, 94-167% and 116-255%.

Compared to the possible NaP combinations (117 vs. 116, 119 vs. 118, 126 vs. 125, 129 vs. 128 and 134 vs. 133), which correspond to the PA, the TEAP combinations likewise have a significant increase in the $t_{10}$, $t_{50}$ and $t_{200}$ values, specifically by 16-39%, 16-41% and 14-45%.

Tab. 10 (continued)

| | | | | | | |
|---|---|---|---|---|---|---|
| 137 | NaZA[10] | AC-1[41] | 40 | 51 | 71 | — | — |
| 138 | NaZA[10] | AC-1[41] | 91 | 117 | 185 | — | 0.16 |
| 139 | NaZA[10] | AC-2[42] | 83 | 110 | 178 | — | 0.16 |
| 140 | NaZA[10] | DMAU[43] | 31 | 39 | 52 | — | — |
| 141 | NaZA[10] | DMAU[43] | 75 | 99 | 131 | 0.08 | — |
| 142 | NaZA[10] | DMAU[43] | 81 | 110 | 158 | — | 0.16 |
| 143 | NaZA[10] | CADMU[44] | 37 | 46 | 58 | — | — |
| 144 | NaZA[10] | CADMU[44] | 67 | 87 | 131 | 0.08 | — |
| 145 | NaZA[10] | CADMU[44] | 81 | 109 | 161 | — | 0.16 |
| 146 | NaZA[10] | Naf[45] | 38 | 118 | 226 | — | 0.16 |
| 147 | NaZA[10] | M-DHP-1[46] | 52 | 77 | 119 | — | — |
| 148 | NaZA[10] | M-DHP-1[46] | 71 | 105 | 205 | 0.08 | — |
| 149 | NaZA[10] | M-DHP-1[46] | 91 | 124 | 220 | — | 0.16 |
| 150 | NaZA[10] | M-DHP-2[47] | 75 | 106 | 221 | — | 0.16 |

In the NaZA system too, combinations of ICI with TEAP, compared to experiments without TEAP (138 vs. 137, 142 vs. 140, 145 vs. 143 and 149 vs. 147), exhibit a very significant rise in the $t_{10}$, $t_{50}$ and $t_{200}$ values by 75-161%, 61-182 and 185-204%. The TEAP combinations have, compared to the NaP combinations with the same numbers of moles (142 vs. 141, 145 vs. 144 and 149 vs. 148), which correspond to the PA, likewise have a rise in the $t_{10}$, $t_{50}$ and $t_{200}$ values, specifically up to 28%, up to 25% and up to 23%.

Tab. 10 (continued)

| | | | | | | |
|---|---|---|---|---|---|---|
| 151 | MgH[11] | AC-1[41] | 52 | 73 | 120 | 0.08 | — |
| 152 | MgH[11] | AC-1[41] | 67 | 96 | 143 | — | 0.16 |
| 153 | MgH[11] | AC-2[42] | 44 | 63 | 115 | 0.08 | — |
| 154 | MgH[11] | AC-2[42] | 76 | 88 | 144 | — | 0.16 |
| 155 | MgH[11] | DMAU[43] | 42 | 59 | 106 | 0.08 | — |
| 156 | MgH[11] | DMAU[43] | 79 | 99 | 139 | — | 0.16 |
| 157 | MgH[11] | CADMU[44] | 48 | 70 | 105 | 0.08 | — |
| 158 | MgH[11] | CADMU[44] | 70 | 87 | 124 | — | 0.16 |
| 159 | MgH[11] | Naf[45] | 49 | 75 | 163 | — | 0.16 |
| 160 | MgH[11] | M-DHP-1[46] | 53 | 77 | 142 | — | 0.16 |
| 161 | MgH[11] | M-DHP-2[47] | 46 | 67 | 130 | — | 0.16 |
| 162 | MgAcac[13] | AC-1[41] | 90 | 98 | 115 | — | — |
| 163 | MgAcac[13] | AC-1[41] | 109 | 119 | 145 | 0.08 | — |
| 164 | MgAcac[13] | AC-1[41] | 121 | 130 | 154 | — | 0.16 |
| 165 | MgAcac[13] | AC-2[42] | 84 | 87 | 95 | — | — |
| 166 | MgAcac[13] | AC-2[42] | 89 | 95 | 111 | 0.08 | — |
| 167 | MgAcac[13] | AC-2[42] | 107 | 119 | 146 | — | 0.16 |
| 168 | MgAcac[13] | DMAU[43] | 89 | 101 | 128 | — | 0.16 |
| 169 | MgAcac[13] | CADMU[44] | 82 | 95 | 128 | — | 0.16 |
| 170 | MgAcac[13] | Naf[45] | 70 | 90 | 143 | — | 0.16 |
| 171 | MgAcac[13] | M-DHP-1[46] | 95 | 86 | 111 | — | — |
| 172 | MgAcac[13] | M-DHP-1[46] | 101 | 112 | 148 | 0.08 | — |
| 173 | MgAcac[13] | M-DHP-1[46] | 103 | 122 | 178 | — | 0.16 |
| 174 | MgAcac[13] | M-DHP-2[47] | 101 | 120 | 173 | — | 0.16 |
| 175 | CaAcac[12] | AC-1[41] | 49 | 64 | 76 | — | — |
| 176 | CaAcac[12] | AC-1[41] | 119 | 140 | 167 | 0.08 | — |
| 177 | CaAcac[12] | AC-1[41] | 132 | 167 | 236 | — | 0.16 |
| 178 | CaAcac[12] | AC-2[42] | 60 | 69 | 77 | — | — |
| 179 | CaAcac[12] | AC-2[42] | 116 | 131 | 152 | 0.08 | — |
| 180 | CaAcac[12] | AC-2[42] | 140 | 179 | 240 | — | 0.16 |
| 181 | CaAcac[12] | DMAU[43] | 98 | 137 | 240 | — | 0.16 |
| 182 | CaAcac[12] | CADMU[44] | 91 | 141 | 222 | — | 0.16 |
| 183 | CaAcac[12] | Naf[45] | 98 | 145 | 272 | — | 0.16 |
| 184 | CaAcac[12] | M-DHP-1[46] | 107 | 176 | 304 | — | 0.16 |
| 185 | CaAcac[12] | M-DHP-2[47] | 95 | 141 | 298 | — | 0.16 |

Here too, the rates of rise in the case of TEAP addition compared to experiments without TEAP very impressive; the rates of rise compared to NaP addition are considerable.

2.1.3.4.2 Organic Compounds as HCl Scavengers (Tab. 11 and 12)

Here too, the rates of rise are present (201 vs. 199 and 201 vs. 200); they are 78%, 75% and 97% for the $t_{10}$, $t_{50}$ and $t_{200}$ values, and 14% $t_{10}$ value.

Tab. 11 (continued)

| | | | | | | |
|---|---|---|---|---|---|---|
| 202 | Hexdge[29] | AC-1[41] | 66 | 73 | 86 | — | — |
| 203 | Hexdge[29] | AC-1[41] | 132 | 148 | 191 | — | 0.16 |
| 204 | Hexdge[29] | AC-2[42] | 64 | 71 | 83 | — | — |
| 205 | Hexdge[29] | AC-2[42] | 111 | 127 | 164 | 0.08 | — |
| 206 | Hexdge[29] | AC-2[42] | 133 | 148 | 182 | — | 0.16 |
| 207 | Hexdge[29] | DMAU[43] | 57 | 61 | 69 | — | — |
| 208 | Hexdge[29] | DMAU[43] | 125 | 134 | 155 | — | 0.16 |
| 208a | c-Hexdge[29a] | DMAU[43] | 130 | 140 | 164 | — | 0.16 |
| 209 | Hexdge[29] | CADMU[44] | 56 | 58 | 65 | — | — |
| 210 | Hexdge[29] | CADMU[44] | 119 | 134 | 184 | 0.08 | — |
| 211 | Hexdge[29] | CADMU[44] | 129 | 143 | 182 | — | 0.16 |
| 212 | Hexdge[29] | Naf[45] | 96 | 122 | 214 | — | 0.16 |
| 213 | Hexdge[29] | M-DHP-1[46] | 65 | 76 | 92 | — | — |
| 214 | Hexdge[29] | M-DHP-1[46] | 80 | 104 | 176 | 0.08 | — |
| 215 | Hexdge[29] | M-DHP-1[46] | 148 | 173 | 263 | — | 0.16 |
| 216 | Hexdge[29] | M-DHP-2[47] | 95 | 121 | 212 | — | 0.16 |

Here, likewise significant rates of rise are present (206 vs. 204 and 215 vs. 213) with values of 108-128%, 108-128% and 119-197%, and also, for 206 vs. 205 and 215 vs. 214, with values of 20-88%, 17-66% and 11-49%.

Tab. 11 (continued)

| | | | | | | |
|---|---|---|---|---|---|---|
| 217 | Glydi[30] | AC-1[41] | 52 | 74 | 86 | — | — |
| 218 | Glydi[30] | AC-1[41] | 115 | 133 | 163 | 0.08 | — |
| 219 | Glydi[30] | AC-1[41] | 161 | 173 | 204 | — | 0.16 |
| 220 | Glydi[30] | AC-2[42] | 144 | 158 | 193 | — | 0.16 |
| 221 | Glydi[30] | DMAU[43] | 70 | 73 | 80 | — | — |
| 222 | Glydi[30] | DMAU[43] | 115 | 131 | 155 | 0.08 | — |
| 223 | Glydi[30] | DMAU[43] | 128 | 139 | 166 | — | 0.16 |
| 224 | Glydi[30] | CADMU[44] | 72 | 75 | 82 | — | — |
| 225 | Glydi[30] | CADMU[44] | 130 | 141 | 167 | — | 0.16 |
| 226 | Glydi[30] | Naf[45] | 88 | 116 | 210 | — | 0.16 |
| 227 | Glydi[30] | M-DHP-1[46] | 64 | 101 | 124 | — | — |
| 228 | Glydi[30] | M-DHP-1[46] | 78 | 111 | 182 | 0.08 | — |

TABLE 11

| Experiment No. | SCV Epoxide | ICI | $t_{10}$ [min] | $t_{50}$ [min] | $t_{200}$ [min] | NaP [phr] | TEAP [phr] |
|---|---|---|---|---|---|---|---|
| 186 | TEPC[32] | AC-1[41] | 130 | 140 | 158 | — | — |
| 187 | TEPC[32] | AC-1[41] | 205 | 218 | 256 | — | 0.16 |
| 188 | TEPC[32] | AC-2[42] | 137 | 143 | 161 | — | — |
| 189 | TEPC[32] | AC-2[42] | 196 | 211 | 251 | — | 0.16 |
| 190 | TEPC[32] | DMAU[43] | 131 | 137 | 149 | — | — |
| 191 | TEPC[32] | DMAU[43] | 142 | 157 | 188 | — | 0.16 |
| 192 | TEPC[32] | CADMU[44] | 125 | 132 | 146 | — | — |
| 193 | TEPC[32] | CADMU[44] | 147 | 158 | 196 | 0.08 | — |
| 194 | TEPC[32] | CADMU[44] | 169 | 184 | 222 | — | 0.16 |
| 195 | TEPC[32] | Naf[45] | 85 | 97 | 118 | — | — |
| 196 | TEPC[32] | Naf[45] | 161 | 208 | 308 | 0.08 | — |
| 197 | TEPC[32] | Naf[45] | 182 | 216 | 318 | — | 0.16 |
| 198 | TEPC[32] | M-DHP-1[46] | 205 | 236 | 329 | — | 0.16 |
| 199 | TEPC[32] | M-DHP-2[47] | 115 | 138 | 175 | — | — |
| 200 | TEPC[32] | M-DHP-2[47] | 180 | 224 | 316 | 0.08 | — |
| 201 | TEPC[32] | M-DHP-2[47] | 205 | 241 | 345 | — | 0.16 |

-continued

Tab. 11 (continued)

| | | | | | | |
|---|---|---|---|---|---|---|
| 229 | Glydi[30] | M-DHP-1[46] | 140 | 167 | 240 | — | 0.16 |
| 230 | Glydi[30] | M-DHP-2[47] | 92 | 120 | 200 | — | 0.16 |

Here, the rates of rise (219 vs. 217, 223 vs. 221 and 229 vs. 227 and 219 vs. 218, 223 vs. 222 and 229 vs. 228) are with rates of rise of 83-210%, 65-134% and 94-137%, and also up to 79%, up to 50% and up to 32%.

Tab. 11 (continued)

| | | | | | | |
|---|---|---|---|---|---|---|
| 231 | DiGlAn[48] | AC-1[41] | 98 | 108 | 131 | — | 0.16 |
| 232 | DiGlAn[48] | AC-2[42] | 115 | 119 | 131 | — | 0.16 |
| 233 | DiGlAn[48] | DMAU[43] | 59 | 62 | 70 | — | — |
| 234 | DiGlAn[48] | DMAU[43] | 79 | 86 | 103 | 0.08 | — |
| 235 | DiGlAn[48] | DMAU[43] | 90 | 99 | 121 | — | 0.16 |
| 236 | DiGlAn[48] | CADMU[44] | 101 | 110 | 137 | — | 0.16 |
| 237 | DiGlAn[48] | Naf[45] | 97 | 107 | 133 | — | 0.16 |
| 238 | DiGlAn[48] | M-DHP-1[46] | 135 | 141 | 152 | — | 0.16 |
| 239 | DiGlAn[48] | M-DHP-2[47] | 100 | 109 | 130 | — | 0.16 |
| 240 | TriGlOxAn[49] | AC-1[41] | 103 | 112 | 133 | — | 0.16 |
| 241 | TriGlOxAn[49] | AC-2[42] | 121 | 125 | 139 | — | 0.16 |
| 242 | TriGlOxAn[49] | DMAU[43] | 82 | 85 | 94 | — | — |
| 243 | TriGlOxAn[49] | DMAU[43] | 104 | 110 | 125 | 0.08 | — |
| 244 | TriGlOxAn[49] | DMAU[43] | 116 | 121 | 135 | — | 0.16 |
| 245 | TriGlOxAn[49] | CADMU[44] | 119 | 125 | 142 | — | 0.16 |
| 246 | TriGlOxAn[49] | Naf[45] | 98 | 105 | 121 | — | 0.16 |
| 247 | TriGlOxAn[49] | M-DHP-1[46] | 116 | 121 | 134 | — | 0.16 |
| 248 | TriGlOxAn[49] | M-DHP-2[47] | 104 | 110 | 139 | — | 0.16 |

[48] N,N-Diglycidylaniline (ALDRICH)
[49] N,N-Diglycidyl-4-glycidyloxyaniline (ALDRICH)

Here, the rates of rise (235 vs. 233 and 244 vs. 242 and 235 vs. 234 and 244 vs. 243) are 41-53%, 42-40% and 44-73%, and also up to 14%, up to 15% and up to 17%.

Tab. 11 continued

| | | | | | | |
|---|---|---|---|---|---|---|
| 249 | BADGE[25] | AC-1[41] | 87 | 140 | 166 | — | — |
| 250 | BADGE[25] | AC-1[41] | 133 | 155 | 193 | — | 0.16 |
| 251 | BADGE[25] | AC-2[42] | 125 | 150 | 185 | — | 0.16 |
| 252 | BADGE[25] | DMAU[43] | 56 | 62 | 70 | — | — |
| 253 | BADGE[25] | DMAU[43] | 132 | 143 | 164 | — | 0.16 |
| 254 | BADGE[25] | CADMU[44] | 124 | 156 | 186 | — | 0.16 |
| 255 | BADGE[25] | Naf[45] | 46 | 84 | 202 | — | 0.16 |

Tab. 11 continued

| | | | | | | |
|---|---|---|---|---|---|---|
| 256 | BADGE[25] | M-DHP-1[46] | 89 | 142 | 323 | — | 0.16 |
| 257 | BADGE[25] | M-DHP-2[47] | 48 | 88 | 201 | — | 0.16 |
| 258 | BFDGE[26] | AC-1[41] | 61 | 112 | 131 | — | — |
| 259 | BFDGE[26] | AC-1[41] | 91 | 132 | 175 | 0.08 | — |
| 260 | BFDGE[26] | AC-1[41] | 154 | 166 | 193 | — | 0.16 |
| 261 | BFDGE[26] | AC-2[42] | 145 | 158 | 191 | — | 0.16 |
| 262 | BFDGE[26] | DMAU[43] | 63 | 67 | 74 | — | — |
| 263 | BFDGE[26] | DMAU[43] | 105 | 136 | 156 | 0.08 | — |
| 264 | BFDGE[26] | DMAU[43] | 128 | 140 | 164 | — | 0.16 |
| 265 | BFDGE[26] | CADMU[44] | 121 | 146 | 175 | — | 0.16 |
| 266 | BFDGE[26] | Naf[45] | 49 | 86 | 199 | — | 0.16 |
| 267 | BFDGE[26] | M-DHP-1[46] | 77 | 125 | 217 | — | 0.16 |
| 268 | BFDGE[26] | M-DHP-2[47] | 48 | 88 | 194 | — | 0.16 |

Here (260 vs. 258 and 264 vs. 262, and also 260 vs. 259 and 264 vs. 263), the rates of rise are 103-152%, 48-109% and 47-122%, and also up to 69%, up to 35% and up to 10%.

Tab. 11 (continued)

| | | | | | | |
|---|---|---|---|---|---|---|
| 269 | Epikote828[27] | AC-1[41] | 102 | 145 | 211 | — | 0.16 |
| 270 | Epikote828[27] | AC-2[42] | 118 | 153 | 203 | — | 0.16 |
| 271 | Epikote828[27] | DMAU[43] | 122 | 150 | 175 | — | 0.16 |
| 272 | Epikote828[27] | CADMU[44] | 54 | 60 | 67 | — | — |
| 273 | Epikote828[27] | CADMU[44] | 89 | 126 | 174 | — | 0.16 |
| 274 | Epikote828[27] | Naf[45] | 53 | 103 | 248 | — | 0.16 |
| 275 | Epikote828[27] | M-DHP-1[46] | 40 | 68 | 157 | — | 0.16 |
| 276 | Epikote828[27] | M-DHP-2[47] | 56 | 101 | 218 | — | 0.16 |
| 277 | Epikote1002[28] | AC-1[41] | 19 | 36 | 59 | — | — |
| 278 | Epikote1002[28] | AC-1[41] | 56 | 77 | 145 | — | 0.16 |
| 279 | Epikote1002[28] | AC-2[42] | 16 | 38 | 68 | — | — |
| 280 | Epikote1002[28] | AC-2[42] | 60 | 79 | 133 | — | 0.16 |
| 281 | Epikote1002[28] | DMAU[43] | 16 | 29 | 45 | — | — |
| 282 | Epikote1002[28] | DMAU[43] | 44 | 76 | 142 | — | 0.16 |
| 283 | Epikote1002[28] | CADMU[44] | 20 | 31 | 49 | — | — |
| 284 | Epikote1002[28] | CADMU[44] | 52 | 85 | 153 | — | 0.16 |
| 285 | Epikote1002[28] | Naf[45] | 19 | 31 | 55 | — | — |
| 286 | Epikote1002[28] | Naf[45] | 26 | 50 | 139 | — | 0.16 |
| 287 | Epikote1002[28] | M-DHP-1[46] | 22 | 46 | 100 | — | — |
| 288 | Epikote1002[28] | M-DHP-1[46] | 32 | 55 | 140 | — | 0.16 |
| 289 | Epikote1002[28] | M-DHP-2[47] | 20 | 38 | 74 | — | — |
| 290 | Epikote1002[28] | M-DHP-2[47] | 42 | 73 | 181 | — | 0.16 |

From this illustration too, the positive effect in the case of additional TEAP addition on the $t_{10}$ value is particularly evident (273 vs. 272, 278 vs. 277, 280 vs. 279, 282 vs. 281, 284 vs. 283 and 290 vs. 289).

TABLE 12

| Experiment No. | SCV Cyanamide | ICI | $t_{ind.}$[50] [min] | $t_{50}$ [min] | $t_{200}$ [min] | NaP [phr] | TEAP [phr] |
|---|---|---|---|---|---|---|---|
| 291 | Didi-f[20] | AC-1[41] | 75 | 78 | 87 | — | — |
| 292 | Didi-f[20] | AC-1[41] | 86 | 91 | 108 | 0.08 | — |
| 293 | Didi-f[20] | AC-1[41] | 113 | 119 | 146 | — | 0.16 |
| 294 | Didi-f[20] | AC-2[42] | 113 | 119 | 145 | — | 0.16 |
| 295 | Didi-f[20] | DMAU[43] | 69 | 73 | 80 | — | — |
| 296 | Didi-f[20] | DMAU[43] | 102 | 107 | 128 | 0.08 | — |
| 297 | Didi-f[20] | DMAU[43] | 125 | 131 | 159 | — | 0.16 |
| 298 | Didi-f[20] | CADMU[44] | 70 | 74 | 81 | — | — |

TABLE 12-continued

| Experiment No. | SCV Cyanamide | ICI | $t_{ind.}$[50] [min] | $t_{50}$ [min] | $t_{200}$ [min] | NaP [phr] | TEAP [phr] |
|---|---|---|---|---|---|---|---|
| 299 | Didi-f [20] | CADMU [44] | 82 | 89 | 111 | 0.08 | — |
| 300 | Didi-f [20] | CADMU [44] | 115 | 124 | 154 | — | 0.16 |
| 301 | Didi-f [20] | Naf [45] | 68 | 74 | 89 | — | — |
| 302 | Didi-f [20] | Naf [45] | 98 | 111 | 143 | 0.08 | — |
| 303 | Didi-f [20] | Naf [45] | 112 | 128 | 172 | — | 0.16 |
| 304 | Didi-f [20] | M-DHP-1 [46] | 83 | 86 | 95 | — | — |
| 305 | Didi-f [20] | M-DHP-1 [46] | 107 | 118 | 145 | 0.08 | — |
| 306 | Didi-f [20] | M-DHP-1 [46] | 126 | 142 | 185 | — | 0.16 |
| 307 | Didi-f [20] | M-DHP-2 [47] | 129 | 142 | 180 | — | 0.16 |

[50] Induction time

Here (293 vs. 291, 297 vs. 295, 300 vs. 298, 303 vs. 301 and 306 vs. 304, and also 293 vs. 292, 297 vs. 296, 300 vs. 299, 303 vs. 302 and 306 vs. 305), the rates of rise are 51-81%, 53-79% and 68-99%, and also 14-40%, 15-39% and 20-39%.

Tab. 12 (continued)

| 308 | Mel-f [23] | AC-1 [41] | 68 | 71 | 80 | — | — |
|---|---|---|---|---|---|---|---|
| 309 | Mel-f [23] | AC-1 [41] | 124 | 133 | 157 | 0.08 | — |
| 310 | Mel-f [23] | AC-1 [41] | 142 | 154 | 184 | — | 0.16 |
| 311 | Mel-f [23] | AC-2 [42] | 134 | 150 | 187 | — | 0.16 |
| 312 | Mel-f [23] | DMAU [43] | 67 | 70 | 76 | — | — |
| 313 | Mel-f [23] | DMAU [43] | 80 | 112 | 129 | 0.08 | — |
| 314 | Mel-f [23] | DMAU [43] | 136 | 149 | 169 | — | 0.16 |
| 315 | Mel-f [23] | CADMU [44] | 58 | 62 | 76 | — | — |
| 316 | Mel-f [23] | CADMU [44] | 100 | 115 | 148 | 0.08 | — |
| 317 | Mel-f [23] | CADMU [44] | 159 | 168 | 202 | — | 0.16 |
| 318 | Mel-f [23] | Naf [45] | 67 | 72 | 88 | — | — |
| 319 | Mel-f [23] | Naf [45] | 127 | 152 | 253 | 0.08 | — |
| 320 | Mel-f [23] | Naf [45] | 141 | 165 | 251 | — | 0.16 |
| 321 | Mel-f [23] | M-DHP-1 [46] | 76 | 79 | 90 | — | — |
| 322 | Mel-f [23] | M-DHP-1 [46] | 145 [51] | 187 | 270 | 0.08 | — |
| 323 | Mel-f [23] | M-DHP-1 [46] | 171 [51] | 214 | 298 | — | 0.16 |
| 324 | Mel-f [23] | M-DHP-2 [47] | 86 | 90 | 103 | — | — |
| 325 | Mel-f [23] | M-DHP-2 [47] | 149 | 164 | 248 | 0.08 | — |
| 326 | Mel-f [23] | M-DHP-2 [47] | 173 | 280 | 280 | — | 0.16 |

[51] $t_{10}$ value

Here (310 vs. 308, 314 vs. 312, 317 vs. 315, 320 vs. 318, 323 vs. 312 and 326 vs. 324, and also 310 vs. 309, 314 vs. 313, 317 vs. 316, 320 vs. 319, 323 vs. 322 and 326 vs. 325), the rates of rise are 101-174%, 113-171% and 122-231%, and also 11-70%, 9-46% and 10-36%.

2.1.3.4.3 Other IC Improvers as Cocomponent (Tab. 13)

TABLE 13

| Experiment No. | SCV CaH/Mel | ICI | $t_{i10}$ [min] | $t_{50}$ [min] | $t_{200}$ [min] | TEAP [phr] |
|---|---|---|---|---|---|---|
| 327 | CaH (c) [6] | B-DHP [52] | 129 | 171 | 277 | 0.16 |
| 328 | CaH (c) [6] | B-t-DHP [53] | 109 | 138 | 225 | 0.16 |
| 329 | CaH (c) [6] | P-DHP [54] | 148 | 204 | 334 | 0.16 |
| 330 | CaH (c) [6] | P-t-DHP [55] | 122 | 164 | 273 | 0.16 |
| 331 | Mel-f [23] | B-DHP [52] | 119 | 146 | 212 | 0.16 |
| 332 | Mel-f [23] | B-t-DHP [53] | 111 | 138 | 213 | 0.16 |
| 333 | Mel-f [23] | P-DHP [54] | 138 | 161 | 229 | 0.16 |
| 334 | TEPC [32] | Hyd [56] | 124 | 145 | 218 | 0.16 |
| 335 | CaH (c) [6] | Hyd [56] | 129 | 188 | 344 | 0.16 |
| 336 | Hytal [7] | Hyd [56] | 101 | 137 | 244 | 0.16 |
| 337 | Hexdge [29] | Hyd [56] | 83 | 112 | 209 | 0.16 |
| 338 | NaZA [10] | Hyd [56] | 85 | 89 | 193 | 0.16 |
| 339 | BADGE [25] | Hyd [56] | 35 | 66 | 172 | 0.16 |
| 340 | BFDGE [26] | Hyd [56] | 39 | 71 | 178 | 0.16 |

[52] Bisdihydropyridine (bis[1,4-dihydro-2,6-dimethylpyridine-3,5-dicarboxylic acid] 1,4-butanediol diester - Synthesis Example 1.2.2)
[53] Bisdihydropyridine (bis[1,4-dihydro-2,6-dimethylpyridine-3,5-dicarboxylic acid] thiodiethylene glycol diester - Synthesis Example 1.2.3)
[54] Polydihydropyridine (poly[1,4-dihydro-2,6-dimethylpyridine-3,5-dicarboxylic acid] 1,4-butanediol ester - Synthesis Example 1.2.4)
[55] Polydihydropyridine (poly[1,4-dihydro-2,6-dimethylpyridine-3,5-dicarboxylic acid] thiodiethylene glycol ester] - Synthesis Example 1.2.5)
[56] Hydantoin (ALDRICH)

Here too, it is evident that good effects are achievable.

2.2 Performance of the Static Heat Test (SHT)

2.2.1 Production of the Rolled Sheets 100 parts of the dry mixtures made up according to the following composition are plastified at 180° C. with addition of 0.5-0.8 part[57] of a paraffin-based lubricant on a Collin laboratory analysis roll mill[58]), in each case for 5 minutes. The films thus obtained (thickness 0.3 mm) are sent to further measurements.

[57] According to adhesive tendency
[58] BJ: 92; Roll temp. (front) 182° C., (back): 184° C.; roll diameter; 150 mm; roll circumference; 0.417 m; rotational speed—mixing: 15 [rpm].

100.0 parts of Vinnolit S3160 (PVC K value=60)

0.4 part of initial colour improver (ICI)

1.6 parts of HCl scavenger (SCV)

0.16 part of TEAP (Comp. A)

2.2.2 Performance of the Examination

Test strips (16 mm×300 mm) are cut out of the rolled sheets produced according to Example 2.2.1. They are stressed at 180° C. until they darken in colour (burn) in a Mathis thermotester (LTE type; feed: 5 mm, base time 5 or 45 min, cycle time 5 min). Thereafter, the YI (yellowness index) is determined to DIN 53381[12]) and compared to the YI of the unstressed rolled sheet (zero minute value). The results of a few representatives are compiled in Tab. 14. The higher the YI, the yellower (darker) the sample. The lower the YI, the lighter the sample and the better the result.

2.2.3 Examples (Yellowness Indices-YI, Tab. 14)

TABLE 14

| | DMAU (ICI) | | | | | Mono-DHP-1 (ICI) |
|---|---|---|---|---|---|---|
| | Example No. | | | | | |
| Minutes | 2.2.3.1 CaH(c) (SCV) + TEAP | 2.2.3.2 NaZA (SCV) + TEAP | 2.2.3.3 Mel (SCV) + TEAP | 2.2.3.4 NaZA (SCV) + NaP | 2.2.3.5 Mel (SCV) + NaP | 2.2.3.6 CaH(c) (SCV) + TEAP |
| 0 | n.d. | n.d. | n.d. | n.d. | n.d. | n.d. |
| 10 | 6.6 | 7.9 | 5.7 | 19.5 | 17.9 | 6.6 |
| 20 | 7.7 | 11.1 | 8.3 | 32.3 | 24.8 | 7.6 |
| 30 | 10.0 | 15.0 | 13.1 | 44.8 | 37.3 | 9.7 |
| 40 | 15.2 | 19.9 | 23.0 | 53.6 | 48.9 | 16.3 |
| 50 | 23.6 | 28.4 | 33.9 | 59.0 | 57.6 | 25.4 |
| 60 | 34.7 | 35.2 | 46.8 | 63.5 | 64.1 | 46.8 |
| 70 | 50.4 | 41.3 | 57.7 | 71.4 | 72.8 | 75.0 |
| 80 | 66.4 | 48.4 | 71.4 | 78.7 | 84.7 | 82.5 |
| 90 | 85.5 | 54.8 | 86.7 | 90.2 | 102.0 | 100 |

It is clearly evident that the overall performance can be vastly improved by adding TEAP (comp. A) instead of NaP. For instance, the rises in the case of the NaZA/DMAU/TEAP vs. NaZA/DMAU/NaP system (2 vs. 4) are an initial improvement in colour (ICI—10 min) of 147%, an improvement in the colour retention (CR—30 min) of 199% and an increase in the long-term stability (LTS—60 min) of 80%.

For the alternative Mel/DMAU/TEAP vs. NaZA/DMAU/NaP system (3 vs. 4), the improvements are 242% for the IC (10 min), 242% for the CR (30 min), and 36% for the LT (60 min).

In the case of the CaH (c)/DMAU/TEAP vs. NaZA/DMAU/NaP system (1 vs. 4), the rates of rise are 195% for the IC (10 min), 348% for the CR (30 min), and 87% for the LT (60 min).

For the likewise alternative CaH(c)/Mono-DHP-1/TEAP vs. NaZA/DMAU/NaP system (6 vs. 4), increases of 195% for the IC (10 min), of 362% for the CR (30 min), and of 37% for the LT (60 min) are recorded.

A drastic improvement in the performance is found.

The invention claimed is:

1. Composition comprising at least one synthetic polymer and at least one coordination-polymeric triethanolamineperchlorato(triflato)metal inner complex comprising the monomer unit of the formula (A):

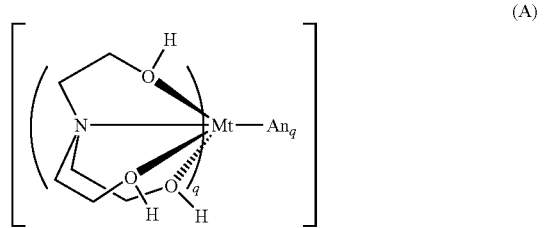

(A)

where
Mt=Li, Na, K, Mg, Ca, Sr, Ba and Zn;
An=OClO$_3$ or OS(O$_2$)CF$_3$;
q=1 or 2.

2. Composition according to claim 1, wherein the synthetic polymer is a halogenated polymer.

3. Stabilizer system for synthetic polymers, comprising a coordination-polymeric triethanolamineperchlorato(triflato) metal inner complex comprising the monomer unit of the formula (A):

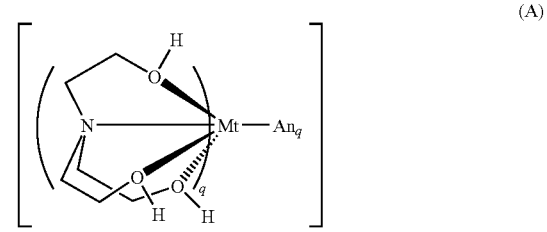

(A)

where
Mt=Li, Na, K, Mg, Ca, Sr, Ba and Zn;
An=OClO$_3$ or OS(O$_2$)CF$_3$;
q=1 or 2.

4. Stabilizer system according to claim 3, wherein additionally present is a linear and cyclic ureide (substituted cyanoacetylurea, substituted iminobarbituric acid, substituted aminouracil, hydantoin) and/or a 3-aminocrotonic ester and/or a dihydropyridinedicarboxylic ester of the formula (B-1), (B-2), (C-1) and (C-2)

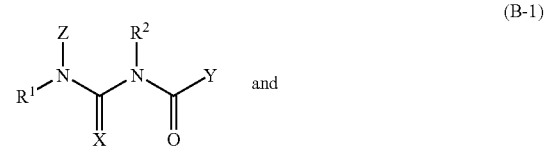

(B-1)

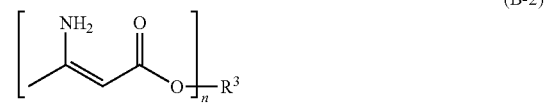

(B-2)

and

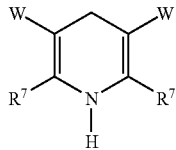
(C-1)

and

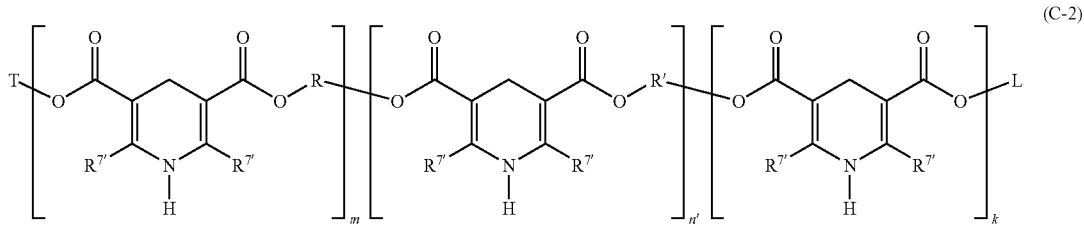
(C-2)

where
X=O or S; Y=CH₂CN, Z=H, or Y and Z form the bridging member CH₂—C=NH, CR⁵=C—NHR⁶ or R¹R²C;

R¹, R² are each independently H, C₁-C₂₂-alkyl, cyclohexyl, (meth)allyl, oleyl, phenyl, benzyl, phenethyl, (tetrahydro)naphthyl, meth(or eth)oxypropyl(or ethyl), CH₂—CHOH—R¹ᵃ, CH₂—CHOH—CH₂X'R¹ᵃ;

X'=O or S;

R¹ᵃ=H, C₁₋₂₂-alkyl, cyclohexyl, (meth)allyl, oleyl, phenyl, benzyl, phenethyl, (tetrahydro)naphthyl or meth(or eth)oxypropyl(or ethyl);

R³=unbranched or branched C₂-C₂₀-alkylene which may be interrupted by 1 to 4 oxygen or sulphur atoms and/or may be substituted by 1 to 4 OH groups, or dimethylolcyclohexane-1,4-diyl, polyethylene(or -propylene) glycol-α,ω-diyl (preferably, poly=tetra to deca), polyglyceryl-α,ω-diyl (preferably, poly=tetra to deca) or glyceroltriyl, trimethylolethane(or -propane)triyl, pentaerythritoltri(or -tetra)yl, bis(trimethylolethane(or -propane)tri(or -tetra)yl), diglyceroltri(or -tetra)yl, tetritoltetrayl, triglyceroltri(or -tetra, -penta)yl, pentitolpentayl, dipentaerythritolpenta(or -hexa)yl and hexitolhexayl;

n=2, 3, 4, 5 or 6;

R⁵=H or (C₃-C₁₀-alkylidene)₁/₂; where this alkylidene may be interrupted by up to 2 oxygen atoms or may have up to 2 substituents selected independently from the group consisting of OH, phenyl and hydroxyphenyl;

R⁶=H, hydroxy-C₂-C₄-alkyl, 3-C₁-C₁₀-alkoxy-2-hydroxypropyl, or mono- to trihydroxy-, mono- to tri-C₁-C₄-alkyl- or/and mono- to tri-C₁-C₄-alkoxyphenyl, allyl, mono- to trisubstituted phenyl;

R⁷, R⁷' are each independently branched and unbranched C₁-C₄-alkyl, phenyl, cyclohexyl;

W=CO₂CH₃, CO₂C₂H₅, CO₂''C₁₂H₂₅ or CO₂C₂H₄—S—''C₁₂H₂₅;

L, T=unsubstituted C₁₋₁₂-alkyl;
and m and n' are each integers of 0 to 20, k is 0 or 1 and R and R' are each independently ethylene, propylene, butylene or an alkylene- or cycloalkylenebismethylene group of the —(C$_p$H$_{2p}$—X''—)$_t$C$_p$H$_{2p}$— type where p is an integer of 2 to 8, t is an integer of 0 to 10 and X'' is oxygen or sulphur.

5. Stabilizer system according to claim 3, wherein additionally added is magnesium oxide or calcium oxide or magnesium hydroxide or calcium hydroxide and/or a magnesium soap or calcium soap and/or a Ca/Zn stabilizer and/or an (optionally Li— or titanium-containing) hydrotalcite and/or dawsonite and/or sodium zeolite A and/or a calcium aluminium hydroxo hydrogenphosphite and/or a glycidyl compound and/or an epoxidized fatty acid ester and/or a melamine and/or a phosphorous ester and/or 2-naphthol and/or a cyanamide of the formula (E)

(E)

where each R⁴ is independently H, nitrile, carbamoyl, R¹, R², R¹CO, R²CO, Na, K, Mg₁/₂ and Ca₁/₂, or R₂⁴=tetra-, penta- or hexamethylene, and o=1, 2 or 3.

6. Stabilizer system according to claim 3, wherein a sterically hindered amine (HALS) and/or an antioxidant and/or a UV absorber (benzotriazole derivative) and/or titanium dioxide and/or chalk is added.

7. Stabilizer system according to claim 6, wherein the sterically hindered amine (HALS) is an NOR-HALS compound.

8. Stabilizer system according to claim 7, wherein the NOR-HALS compound is a triazine-based NOR-HALS compound.

9. Stabilizer system according to claim 3, wherein it further comprises a glyceryl ether and/or ester, R⁸OCH₂CH(OH)CH₂OH or R⁸CO₂CH₂CH(OH)CH₂OH and/or a DEA derivative R⁹—[C(O)]$_d$—N(C₂H₄OH)₂ or R⁸OCH₂CH(OH)CH₂—[C(O)]$_d$—N(C₂H₄OH)₂ or R⁹—N(OH)(CH₂)₂(CH₂)₃—[C(O)]$_d$—N(C₂H₄OH)₂ and/or a paraffinsulphate(or -sulphonate) salt C₁₂-C₁₈-alkyl-(O)$_d$—SO₃ Na, Li, K and/or a polyoxyalkylene of the formula (F)

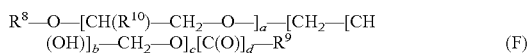
(F)

where
each R⁸ is independently H, C₁-C₂₄-alkyl, C₂-C₂₄-alkenyl, CH₂=CH—C(O) or CH₂=CCH₃—C(O);

each R⁹ is independently C₁-C₂₄-alkyl, C₂-C₂₄-alkenyl, (CH₂)₂OH, CH₂—COOH or N(C₁-C₈-alkyl)₃Hal, R¹⁰=H or CH₃, Hal=Cl, Br or I;

a=an integer greater than or equal to 2, b=an integer of 1 to 6, and c, d, d', d" are each independently 0 or 1.

10. Composition comprising a synthetic polymer and a stabilizer system according to claim 4.

11. Composition according to claim 10, wherein the synthetic polymer is a chlorinated polymer.

12. Composition according to claim 11, wherein the chlorinated polymer is rigid PVC, flexible PVC, suspension PVC or emulsion PVC.

13. Composition according to claim 10, wherein, based on 100 parts by weight of synthetic polymer, 0.001-1.0 part by weight of the inner complex (A) is present.

14. Composition according to claim 10, wherein 0.01-10 parts by weight of sterically hindered amine and/or NOR-HALS compound and/or UV absorber and/or titanium dioxide are present.

15. Composition according to claim 10, wherein the synthetic polymer is flexible PVC and the stabilizer system comprises 1,4-cyclohexanedimethanol diglycidyl ether.

16. Process for stabilizing synthetic polymers by adding a stabilizer system according to claim 5 to a synthetic polymer.

17. Process for stabilizing synthetic polymers according to claim 16, wherein the synthetic polymer is a chlorinated polymer.

18. Process for stabilizing chlorinated polymers according to claim 17, wherein the flexible PVC is suitable for the manufacture of floors, motor vehicle parts, wallpaper, flexible films, pipes, injection mouldings or preferably for wire sheathing (cables).

19. Process for stabilizing synthetic polymers according to claim 17, wherein the chlorinated polymer is rigid PVC.

20. Process for stabilizing chlorinated polymers according to claim 19, wherein the rigid PVC is suitable for the production of films, PVC pipes or profiles.

21. Useful articles comprising PVC, which also comprise a stabilizer system according to claim 5.

22. Antistat or antistat component for synthetic polymers, comprising a triethanolamineperchlorato(triflato)metal inner complex of the formula (A) as specified in claim 1.

23. Inner complex of the formula (A) as specified in claim 1, wherein Mt=Ca or Zn and q=2.

24. Inner complex of the formula (A) as specified in claim 1, where Mt=Li, Na or Ca and q=1 or 2.

25. Inner complexes according to claim 24, wherein Mt=Li or Na, q=1 and An=OClO$_3$.

26. Process for preparing an inner complex of the formula (A) as specified in claim 1, wherein the synthesis is effected in methanol, ethanol, propanol, triethanolamine or water, and the solvent and any water of reaction are removed by distillation.

27. Process according to claim 26, wherein the distillation residue is digested in a nonpolar solvent.

28. Process for preparing inner complexes of the formula (A) as specified in claim 1, wherein the synthesis is effected in an alcohol and the reaction product is removed by precipitation with a nonpolar solvent.

29. Composition according to claim 1, wherein the synthetic polymer is PVC.

30. Composition according to claim 10, wherein the synthetic polymer is PVC.

31. Process for stabilizing synthetic polymers according to claim 16, wherein the synthetic polymer is flexible PVC or PVC paste.

* * * * *